(12) United States Patent
Seibel et al.

(10) Patent No.: US 12,386,746 B2
(45) Date of Patent: Aug. 12, 2025

(54) TECHNIQUES FOR DESTAGING TRANSLATION TABLE UPDATES AND ACCESSING TRANSLATION TABLE ENTRIES IN A LOG-STRUCTURED SYSTEM

(71) Applicant: Dell Products L.P., Hopkinton, MA (US)

(72) Inventors: Christopher Seibel, Walpole, MA (US); Vamsi K. Vankamamidi, Hopkinton, MA (US); Andrew T. Feld, Keene, NH (US); Kamakshi Viswanadha, Lexington, MA (US)

(73) Assignee: Dell Products L.P., Hopkinton, MA (US)

( * ) Notice: Subject to any disclaimer, the term of this patent is extended or adjusted under 35 U.S.C. 154(b) by 17 days.

(21) Appl. No.: 18/421,390

(22) Filed: Jan. 24, 2024

(65) Prior Publication Data

US 2025/0238370 A1    Jul. 24, 2025

(51) Int. Cl.
*G06F 12/00*     (2006.01)
*G06F 12/0802*    (2016.01)

(52) U.S. Cl.
CPC ...... *G06F 12/0802* (2013.01); *G06F 2212/60* (2013.01)

(58) Field of Classification Search
None
See application file for complete search history.

(56) References Cited

U.S. PATENT DOCUMENTS

2019/0138458 A1\*   5/2019   Engh-Halstvedt ............. G06F 12/1045
2021/0390015 A1\*   12/2021   Armangau .......... G06F 11/2094

OTHER PUBLICATIONS

U.S. Appl. No. 17/239,021, filed Apr. 23, 2021, entitled System and Method for Implementing Mapper Metadata as a Log-Structured System, Vamsi K. Vankamamidi, et al.
U.S. Appl. No. 18/472,595, filed Sep. 22, 2023, entitled System and Method for Managing Metadata Access in a Log-Structured System, Christopher Seibel, et al.
U.S. Appl. No. 18/456,861, filed Aug. 28, 2023, entitled Log-Structured Architecture for Metadata, Vamsi K. Vankamamidi, et al.
U.S. Appl. No. 18/417,727, filed Jan. 19, 2024, entitled Techniques Using a Unified Cache for Storing and Accessing Translation Table Entries and Updates, Christopher Seibel, et al.

\* cited by examiner

*Primary Examiner* — Daniel D Tsui
(74) *Attorney, Agent, or Firm* — BainwoodHuang

(57) ABSTRACT

In at least one embodiment, processing can include: receiving, from a client, a request to access a metadata (MD) page, wherein the request specifies a lock type denoting a particular level of access to the MD page that is being requested by the request; and responsive to receiving the request, performing first processing including: locking the MD page and a corresponding translation table entry E1 for the MD page in accordance with the lock type denoting a particular level of access being requested, wherein E1 maps a logical address LA1 of the MD page to a physical storage or location PA1 on non-volatile storage where the MD page is stored; and subsequent to said locking, returning a response including the MD page to the client.

19 Claims, 34 Drawing Sheets

3180

3182 — A client or requester (e.g., thread or process) issues a request to access a MD page with a desired level of access. The requester is requesting that a copy of the MD page be returned so that the requester can subsequently perform any desired processing in the requester's workflow. The request can include a lock type denoting the particular level of access to the MD page that is being requested. The lock type can be one of a defined number of lock types including: a read or shared lock, and a write or exclusive lock. The request can be issued to a caching layer providing access to the MD page through the MD page cache.

3184 — The MD page access request is serviced by the caching layer. Processing is performed to lock the MD page and additionally lock the MD page's corresponding TT entry E11 (mapping the logical address LA1 of the MD page to a physical address PA1 of the MD page) in accordance with a level of access and lock type as specified in the request.

In at least one embodiment, the requested level of access or protection of the MD page and the corresponding TT entry E11 can be implemented using a single lock that is acquired in connection with both resources – the MD page and the TT entry E11. In such an embodiment, the single lock can be acquired when both of the resources are available with the requested level of access or lock type.

As a variation in at least one embodiment, the requested level of access or protection of the MD page and corresponding TT entry E11 can be implemented using two locks. A first lock with the requested level of access can be acquired in connection with the MD page. A second lock with the requested level of access can be acquired in connection with the TT entry E11.

After locking the MD page and the TT entry E11 in accordance with the requested lock type and level of access, the MD page is obtained and returned to the client or requester. If the MD page is not already in the MD page cache, servicing the request can include processing to obtain and load the MD page into the MD page cache.

3186 — The client or requester receives the MD page and performs any desired processing using the MD page and/or its corresponding TT entry E11.

3188 — The MD page and the corresponding TT entry E11 are unlocked/released. The one or more locks previously acquired on the MD page and TT entry E11 are released.

FIG. 27

TECHNIQUES FOR DESTAGING TRANSLATION TABLE UPDATES AND ACCESSING TRANSLATION TABLE ENTRIES IN A LOG-STRUCTURED SYSTEM

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving, from a client, a request to access a metadata (MD) page, wherein the request specifies a lock type denoting a particular level of access to the MD page that is being requested by the request; and responsive to receiving the request, performing first processing including: locking the MD page and a corresponding translation table (TT) entry E1 for the MD page in accordance with the lock type denoting a particular level of access being requested, wherein E1 maps a logical address LA1 of the MD page to a physical storage or location PA1 on non-volatile storage where the MD page is stored; and subsequent to said locking, returning a response including the MD page to the client.

In at least one embodiment, the first processing can include: determining whether the MD page is stored in a cache; responsive to determining the MD page is stored in the cache, performing said returning the MD page to the client, wherein the MD page returned is a copy of the MD page obtained from the cache. responsive to determining that the MD page is not stored in the cache, performing second processing including: determining whether E1 is stored in the cache; responsive to determining that E1 is stored in the cache, performing third processing including: using PA1 of E1, as read from the cache, to read the MD page from non-volatile storage; storing the MD page as read from non-volatile storage in the cache; and performing said returning the MD page to the client, wherein the MD page is as read from non-volatile storage; responsive to determining that E1 is not stored in cache, performing fourth processing including: reading E1 from non-volatile storage; using PA1 of E1, as read from non-volatile storage, to read the MD page from non-volatile storage; performing said returning the MD page to the client, wherein the MD page is as read from non-volatile storage; and storing E1, as read from non-volatile storage, in the cache. Determining whether E1 is stored in the cache includes: determining whether E1 is stored in a TT cache of clean TT entries; and determining whether E1 is stored in a TT log of dirty TT entries that have not yet been flushed or destaged to a persisted TT stored on non-volatile storage.

In at least one embodiment, determining whether E1 is stored in the cache can include: determining whether E1 is stored in a unified cache accessed using a unified hash table (UHT), including querying a unified hash table (UHT) in accordance with a logical address LA1 of the MD page to determine whether the UHT includes an existing UHT entry mapping LA1 to PA1 of where the MD page is stored on non-volatile storage. The TT entry E1 can be included in a first region of a TT as stored on non-volatile storage, and processing can include destaging a frozen TT log of updates to TT entries comprising: reading a source version of the first region from a source location into a buffer; applying relevant updates of the frozen TT log to the first region as stored in the buffer to generate a revised version of the first region; and storing the revised version of the first region from the buffer to a target location.

In at least one embodiment, reading E1 from non-volatile storage in said fourth processing can include: determining a current state of the first region with respect to said destaging the frozen log; and reading E1 from one of the source location and the target location based on the current state of the first region with respect to said destaging the frozen log. The current state of the first region can be one of: a pre-converted state, a converting state, or a converted state. If the first region is in the pre-converted state, no corresponding updates from the frozen TT log may have been destaged for the first region. If the first region is in the converting state, destaging corresponding updates from the frozen TT log may have commenced but may not have completed for the first region. If the first region is in the converted state, destaging corresponding updates from the frozen TT log may have completed for the first region such that the revised version of the first region is stored at the target location. If the first region is in the pre-converted state or the converting state, E1 can be read from the source location. If the first region is in the converted state, E1 can be read from the target location.

In at least one embodiment, the TT log can be partitioned into a plurality of regions including the first region, wherein each of the plurality of regions can have a corresponding source location on a source tier and a corresponding target location on a target tier. The updates of the TT log can be destaged on a region by region basis in accordance with contiguous physical locations of the plurality of regions in the source tier and target tier. The lock type can be one of a defined set of lock types including: a shared or read lock; and an exclusive or write lock. The request can be issued as part of MD log destaging of updates to the MD page, wherein the lock type of the request can be the exclusive or write lock, and wherein E1 can be automatically locked for exclusive or write access in connection with the request to access the MD page for exclusive or write access. The lock type of the request can be the shared or read lock, and wherein E1 can be automatically locked for shared or read access in connection with the request to access the MD page for shared or read access. The shared or read lock can allow multiple clients to simultaneously read the MD page and/or E1, wherein any client holding the shared or read lock can block another client from acquiring the write or exclusive lock on the MD page and/or E1, and wherein the write or exclusive lock can exclude others from accessing the MD page and/or E1.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 21, 22, 25, 26, 27, 28A and 28B are flowcharts of processing steps that can be performed in at least one embodiment in accordance with the techniques of the present disclosure.

DETAILED DESCRIPTION OF EMBODIMENT(S)

Figure 1:
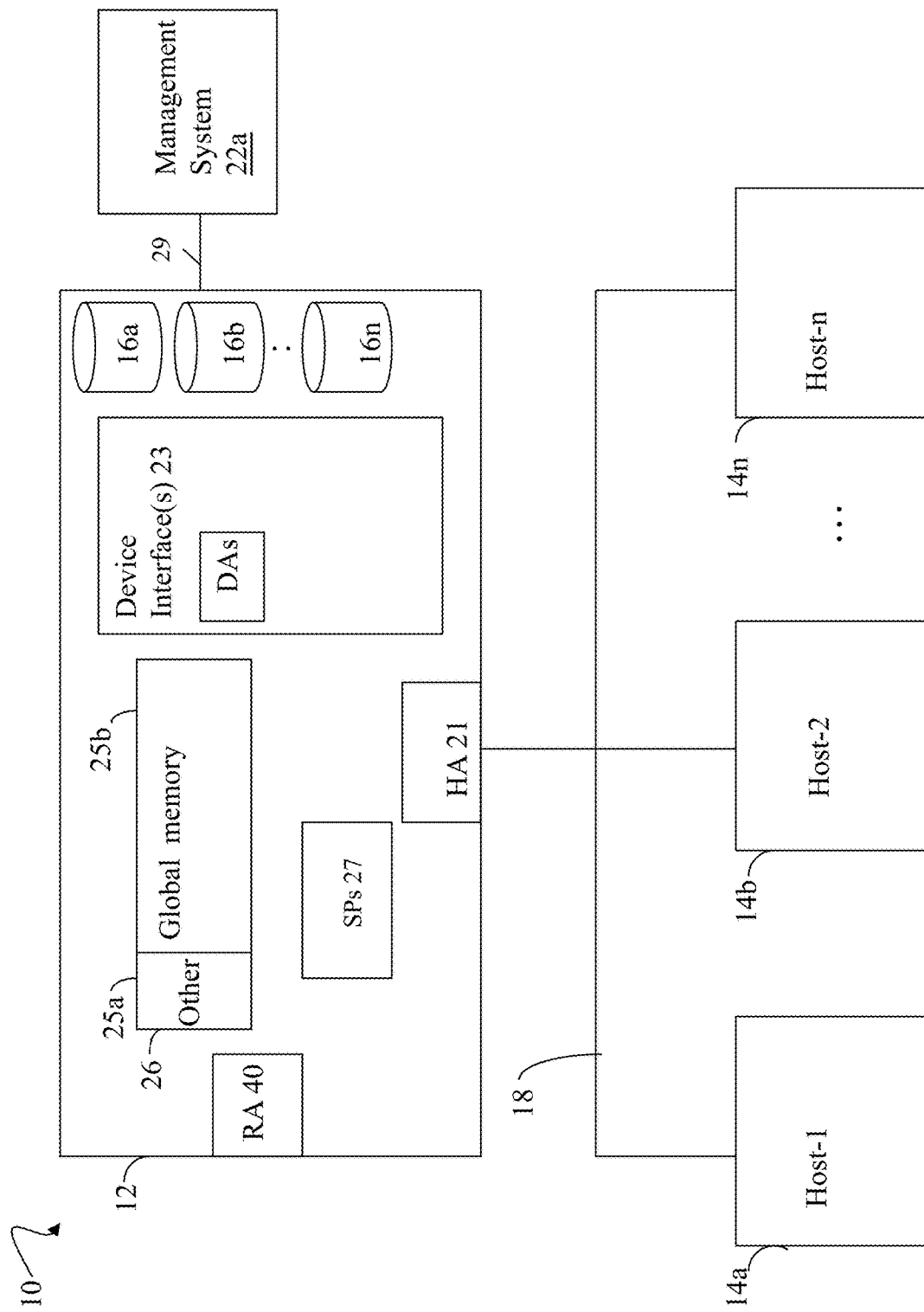
FIG. 1 is an example of components that may be included in a system in accordance with the techniques of the present disclosure.

A data storage system can use a log for recording user or client updates, and can also use a metadata log for recording updates to metadata pages. The metadata (MD) pages can be used in connection with chains of mapping information that map logical addresses to storage locations including content stored at the logical addresses.

An entry from the log of user or client updates (sometimes referred to as the UD (user data) log) can be an update, such as a client write I/O, to a logical address (e.g., LUN or logical device and LBA or logical block address) which writes content to a UD page. Flushing the entry from the UD log can include writing the updated UD page to a backend storage location on non-volatile storage (e.g., BE (back end) PD (physical storage device) location). Additionally, flushing the entry from the UD log can include updating the corresponding MD pages which map the logical address to its corresponding BE PD location including the content stored at the logical address. In at least one existing system, the mapping information including MD pages can thus be updated. For example, such updating of the mapping information can include updating a chain of MD pages used in connection with mapping the logical address to the BE PD location including the content stored at the logical address.

Updating the corresponding mapping information and MD pages can include loading all the MD pages into the cache if any such MD pages are not already in cache. The MD pages of the mapping information can be characterized as a chain forming an access sequence including a top MD page, a mid MD page, a leaf MD page, and a VLB (virtual or virtualized layer block) page, where each page in the foregoing sequence is accessed serially and also in the strict sequential order of the sequence.

The data storage system can maintain the user data or client data as a log structured system (LSS) which can be characterized by typically not performing in place updates which overwrite existing content. In the LSS for user data, flushing one or more UD log entries of updates to a UD page stored at an existing physical storage location (e.g., on BE PDs) can include determining an updated version of the UD page and storing the updated version of the UD page at a new physical storage location that is different from the existing physical storage location. Thus, the physical storage location of the UD page (as stored persistently on the BE PDs) can move or change each time an updated version of the UD page is written to the BE PDs, where such updated version of the UD page can be the result of flushing one or more entries from the UD log which update the same UD page, and then persistently storing the updated version of the UD page on the BE PDs.

The MD pages used in connection with mapping information as noted above can be stored persistently using in-place updates or overwrites such that processing overwrites the existing version of a MD page as stored at a physical storage location on the BE PDs with an updated version of the MD page. The physical storage location (e.g., on BE PDs) of each MD page can thus remain static or fixed so that in-place updates overwrite the same existing persistent physical storage location of the MD page. With mapping information including a chain of MD pages that reference each other using such physical storage locations, such in-place updates or overwrites of MD pages can be desirable where each MD page remains in the same physical storage location on BE storage.

As an alternative, the persistent or non-volatile physical storage, such as on the BE PDs, used for storing the MD pages can be maintained as a LSS in a manner similar to the LSS storing user data or content. With a LSS for MD pages, an updated MD page can be determined as a result of applying one or more entries of the metadata log which update the MD page. A current version of the MD page (before applying the updates) can be stored at an existing physical storage location on non-volatile persistent storage (e.g., on BE PDs). The updated version of the MD page can be determined and then rewritten or stored at a new physical storage location that is different from the existing physical storage location. Thus, with a LSS for metadata, the physical storage location or address of the MD page can move or change each time an updated version of the MD page is written to the BE PDs, where such updated version of the MD page can be the result of flushing one or more entries from the metadata log which update the same MD page, and then persistently storing the updated version of the MD page at the new physical storage location on the BE PDs. Persistent physical storage for a MD page can be allocated at a physical address from the BE PDs.

In at least one embodiment in accordance with the techniques of the present disclosure providing for storing updated MD pages at new physical storage locations in a LSS rather than performing overwriting or in-place updates, logical addresses of MD pages can be used to reference the MD pages as opposed to referencing MD pages, and entries thereof, using physical storage locations or addresses. In at least one embodiment, the logical address of a MD page can be an indirect pointer or indirect address of the corresponding physical storage location or address of the persistently stored MD page. In at least one embodiment, a logical address of a MD page can be mapped to the physical address or storage location on the BE PDs where the MD page is stored. Thus, as the MD page is updated and its corresponding physical storage location changes over time, the logical address of the MD page can remain the same and the physical storage location or address on the BE PDs storing the persisted MD page can be allowed to change. When the logical address of the MD page is used to reference the MD page from the BE PDs, the logical address of the MD page can be translated or mapped to its current physical storage location on the BE PDs. Thus, designing an LSS for storing the MD pages can generally include some form of dynamic translation of logical to physical addresses or locations for the MD pages.

In at least one embodiment in accordance with the techniques of the present disclosure, a translation table (TT) can be used to map or translate a logical address of a MD page to its current physical storage location or address such as on BE PDs providing non-volatile storage. In at least one embodiment, as the physical storage location of a MD page changes from a first physical storage location or address PA1 to a second physical storage or address PA2, the TT used to map the MD page's logical address to the new physical storage location can also be updated. In at least one embodiment, the TT can be updated to reference the new physical storage location PA2 of the MD page rather than the prior physical storage location PA1. In at least one embodiment, the logical addresses of the MD pages can remain the same even though the physical addresses or storage locations of persistently stored versions of the MD pages can change as the MD pages are updated and rewritten to new physical addresses or storage locations in accordance with the LSS.

In at least one system not using the techniques of the present disclosure, the TT itself can be stored on non-volatile storage such as the BE PDs, where the TT can be subject to in-place updates or overwrites. In such a system not in accordance with the techniques of the present disclosure, the TT is not managed as an LSS. In at least one embodiment, one or more TTs can be characterized as another form of MD used in connection with the LSS for MD pages including top, mid, leaf MD pages and also including VLB (virtual or virtualized layer block) pages of mapping information.

Accordingly, described in the following paragraphs are techniques of the present disclosure which include managing and maintaining TTs as a LSS. In at least one embodiment, updates to a TT can be stored in a TT log in a manner similar to the metadata log used for recording updates to metadata pages. Updates to the TT can be flushed from the TT log, and then applied to a current persistent copy of the TT stored on non-volatile storage to generate an updated version of the TT. The updated version of the TT can then be stored persistently on non-volatile storage in a new storage location that is different from the existing storage location of the current persistent copy of the TT (as just prior to updating). Thus in at least one embodiment, flushing the TT updates of the TT log can include rewriting or storing the entire TT persistently at the new storage location. In at least one embodiment, multiple instances of the most recent consecutive versions of the TT can be maintained on non-volatile storage. In this manner in such an embodiment, each time the TT log is flushed, the oldest version of the multiple persisted TT copies or instances can be replaced with a most recent version of the TT.

In this manner, the techniques of the disclosure in at least one embodiment provide a LSS approach for use with various types of metadata further including the TT itself.

Use of the TT for MD page logical address translation or resolution to corresponding physical storage locations adds an additional level of redirection within the metadata address space. Additionally, introduction of such redirection introduces the inherent risk of further contention between operations that can add overall latency.

Access to MD pages requires some level of locking. In at least one embodiment, a holder of a read or shared lock on a MD page can prevent another from acquiring a write or exclusive lock on the same MD page such that read access to the MD page prevents simultaneous or concurrent write access but where there can be shared multiple readers (e.g., each holding a read or shared lock) to the same MD page. In at least one embodiment, a holder of a write or exclusive lock on the MD page can provide the holder with exclusive access to the MD page such that there is no simultaneous read or write access to the same MD page. During updates and destaging of these MD pages in at least one embodiment, MD page access can be exclusive. Furthermore, updates to these MD pages, such as during MD log destage, can necessitate that the MD pages be loaded into cache and remain in cache until destaging of the MD page is complete where the updated version of the MD page is written out to non-volatile storage.

Considering the TT as another type of metadata and, in particular, as a series of pages, each TT page of TT entries can be used in managing hundreds of MD page redirections or logical to physical address translations. Access to a particular TT page of TT entries can be random with respect to the particular MD pages having corresponding TT entries in a single TT page. Using only page level locks in connection with TT pages can adversely increase contention, for example, between two operations that each need to access only a different TT entry of the same TT page. As such in at least one embodiment, the techniques of the present disclosure provide for using TT entry-level locking rather than TT page level locking. In at least one embodiment, when a requester acquires a lock on a MD page having a logical address, the requester can also automatically also acquire a lock on a corresponding TT entry mapping the MD page's logical address to the MD page's physical address or location. In at least one embodiment, the TT entry lock can be acquired automatically as a result of the request by the requester to acquire the lock on the MD page. The lock acquired on the corresponding TT entry for the MD page can be acquired implicitly in at least one embodiment as a result of requesting the MD page lock without the requester further explicitly requesting the corresponding TT entry lock. Thus in at least one embodiment, acquiring an exclusive or write lock on a MD page can also include implicitly acquiring an exclusive or write lock on a corresponding TT entry mapping the logical address of the MD page to the current physical address or location of the MD page. Similarly in at least one embodiment, acquiring a shared or read lock on a MD page can also include implicitly acquiring a shared or read lock on a corresponding TT entry mapping the logical address of the MD page to the current physical address or location of the MD page.

In at least one embodiment rather than have two separate locks on both a MD page and its corresponding TT entry, a single lock can be used that locks both the MD page and its corresponding TT entry. In such an embodiment, acquiring the single lock through a single request can effectively lock the two related resources—the MD page and its corresponding TT entry. In at least one embodiment, a requester can request and acquire a single write or exclusive lock on the two related resources thereby providing the requester with exclusive access to both resources, the MD page and its corresponding TT entry, by making a single request. In at least one embodiment, a requester can request and acquire a single read or shared lock on the two related resources thereby providing the requester with shared or read access to both resources, the MD page and its corresponding TT entry, by making a single request.

Additionally, destaging a dirty TT page in connection with destaging relevant updated TT entries from a TT log in some implementations not using the techniques of the present disclosure can include acquiring a write or exclusive lock at the TT page granularity level. Such exclusive TT page access can incur considerable lock contention by blocking all other read and write operations requiring access to the TT page. As such in at least one embodiment, the techniques of the present disclosure provide for journaling and destaging the TT into log-structured physical tiers while reducing access contention and consumption of cache resources.

In at least one embodiment, TT entries can be stored in a TT cache included in a volatile memory cache, and TT log entries included in an in-memory TT log can also be stored in the volatile memory cache. Rather than maintaining two separate access structures for the TT cache and in-memory TT log, at least one embodiment of the techniques of the present disclosure provide for use of a single unified access structure including both TT cache entries and TT log entries where the single unified access structure can be queried to obtain the current physical address or location of a MD page based on the logical address of the MD page. In at least one embodiment, the current physical address of the MD page can be included in either a TT log entry or a TT cache entry of the single unified access structure. In at least one embodiment, the unified access structure can be a unified hash table including TT cache entries and TT log entries stored in the unified cache.

In at least one embodiment, TT log entries can be dirty TT entries denoting updates or changes to TT log entries that have not yet been flushed or destaged and are thus not preemptable and cannot be evicted from the volatile memory cache. In at least one embodiment, TT cache entries can be clean TT entries that have already been destaged or flushed and thus can be preempted or evicted from the volatile memory cache.

In at least one embodiment, rather than use the single unified access structure included in the volatile memory cache where the single structure provides access to both dirty TT entries of the TT log that need to be flushed or destaged as well as clean TT entries of the TT cache, separate structures for TT cache entries (e.g., clean TT entries) and TT log entries (e.g., dirty TT entries) can be maintained and accessed during processing as may be needed. In at least one embodiment using such multiple structures rather than the single unified access structure, a first hash table or other access structure can be managed and used with TT log entries (e.g., dirty TT log entries) stored in the volatile memory cache, and a second hash table or other access structure can be managed and used with clean TT entries of the TT cache.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, ISCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2A:
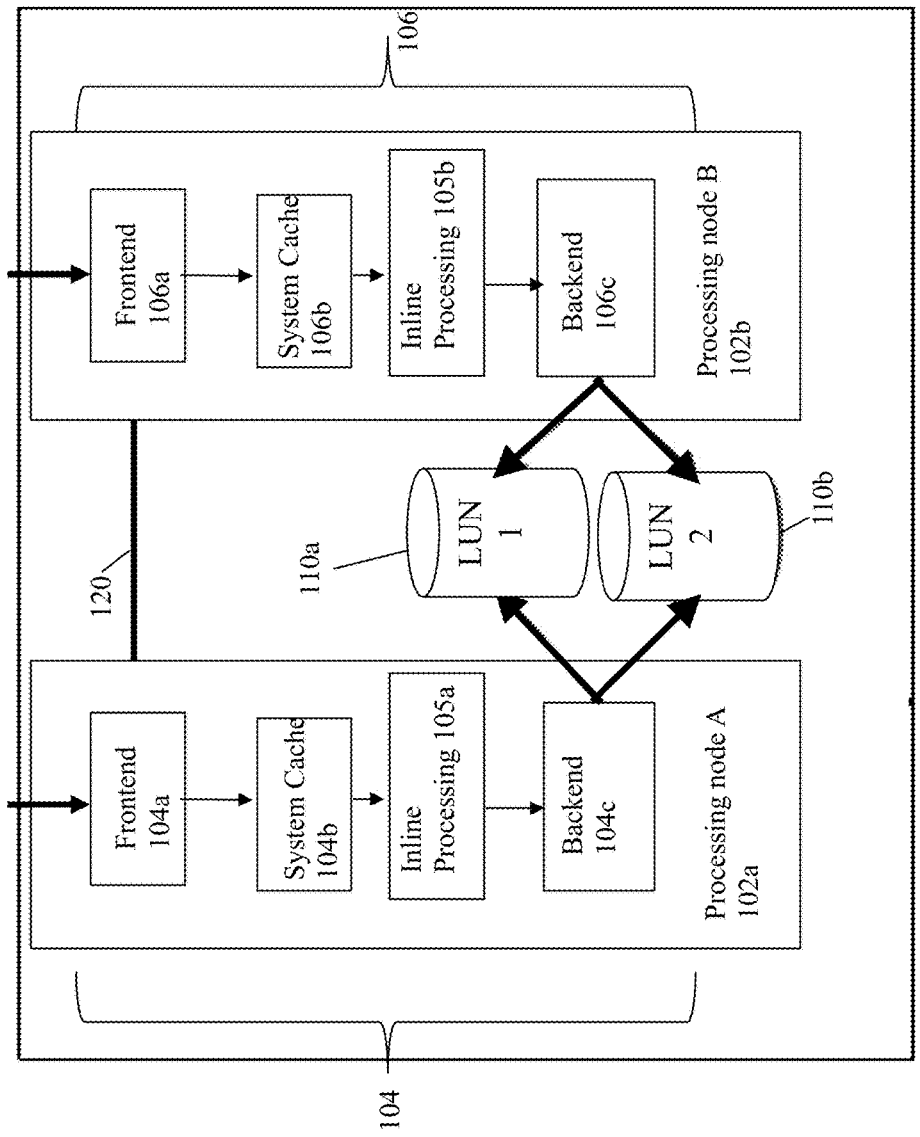
FIG. 2A is an example illustrating the I/O path or data path in connection with processing data in at least one embodiment in accordance with the techniques of the present disclosure.

With reference to the FIG. 2A, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2A is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102a-b in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2A, for write operations, latency can be affected by the amount of time taken to store the write data in the log where the write data is visible to both nodes or controllers of the system.

Consistent with other discussion herein, the log file used to log user operations, such as write I/Os, can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein. The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
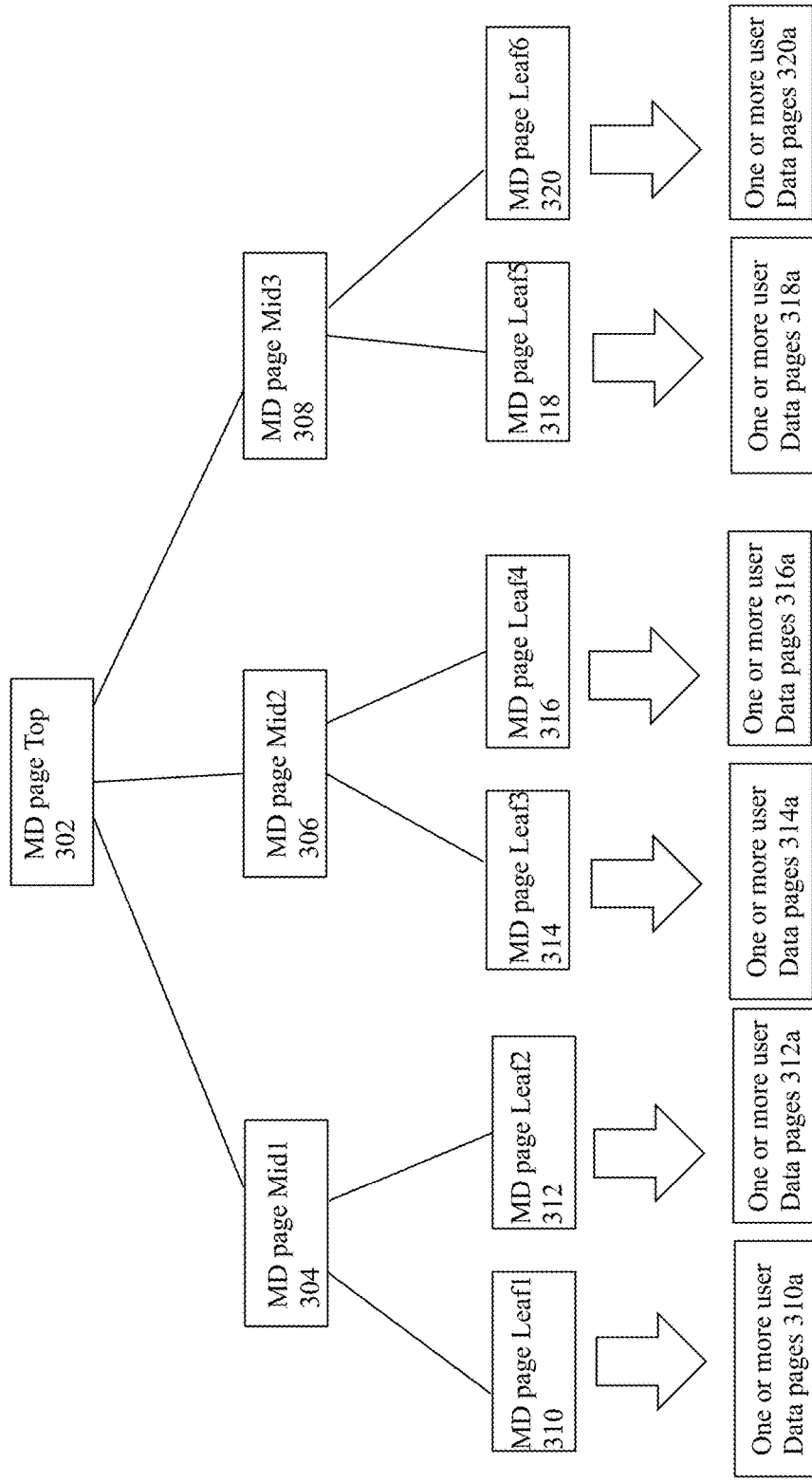
FIGS. 3, 4 and 5 are examples of mapping information in the form of a metadata structure that can be used in connection with mapping logical addresses to physical addresses or storage locations in at least one embodiment in accordance with the techniques of the present disclosure.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Before describing in more detail the mapping information of MD pages that can be used in an at least one embodiment to map a logical address to a corresponding physical storage location or address, further details are described in connection with using a log for logging user or client operations, such as write I/Os.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
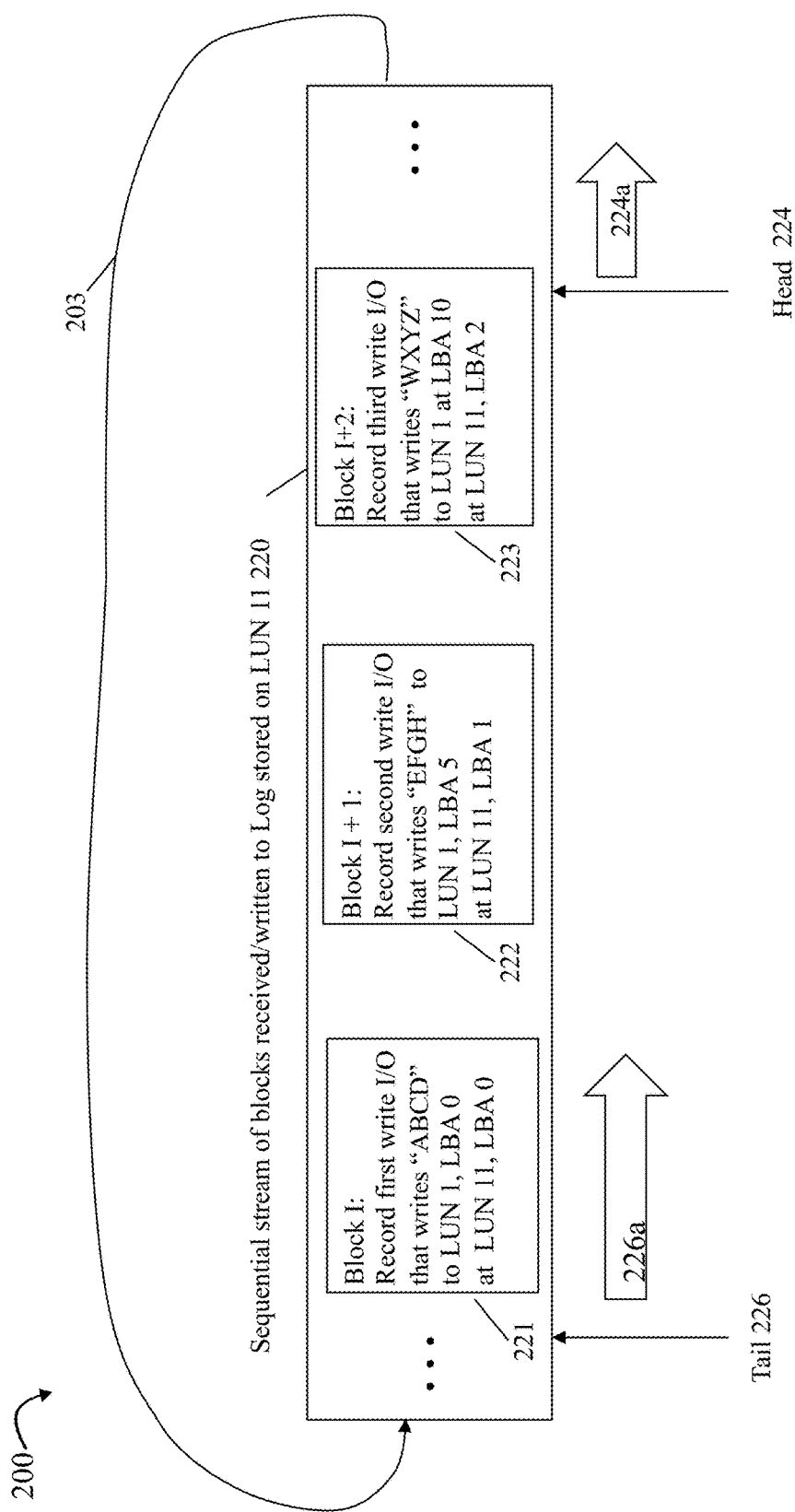
FIGS. 2B, 2C and 2D are examples illustrating use of a log or journal recording client operations in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation.

The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224*a* to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226*a* sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
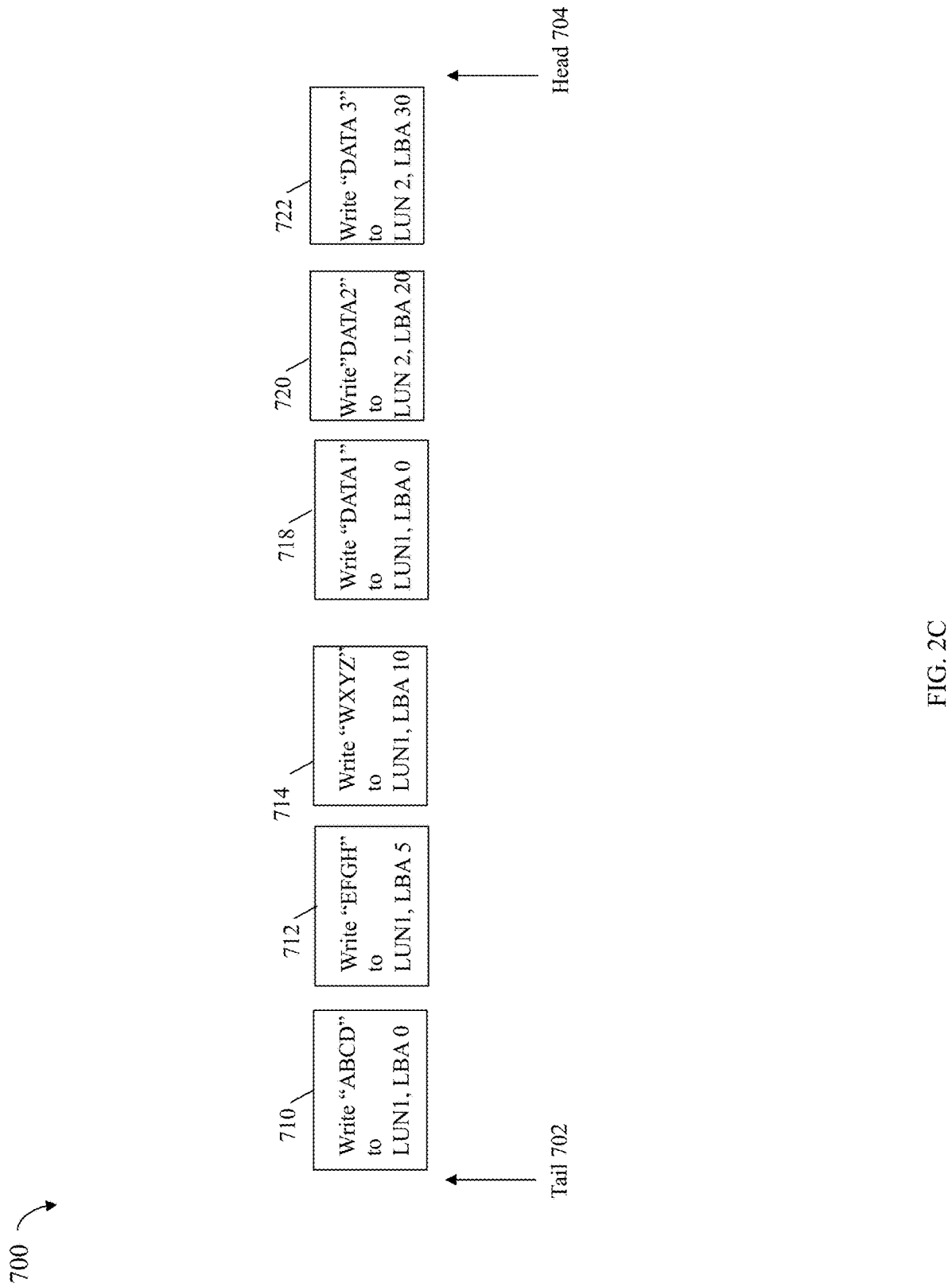

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
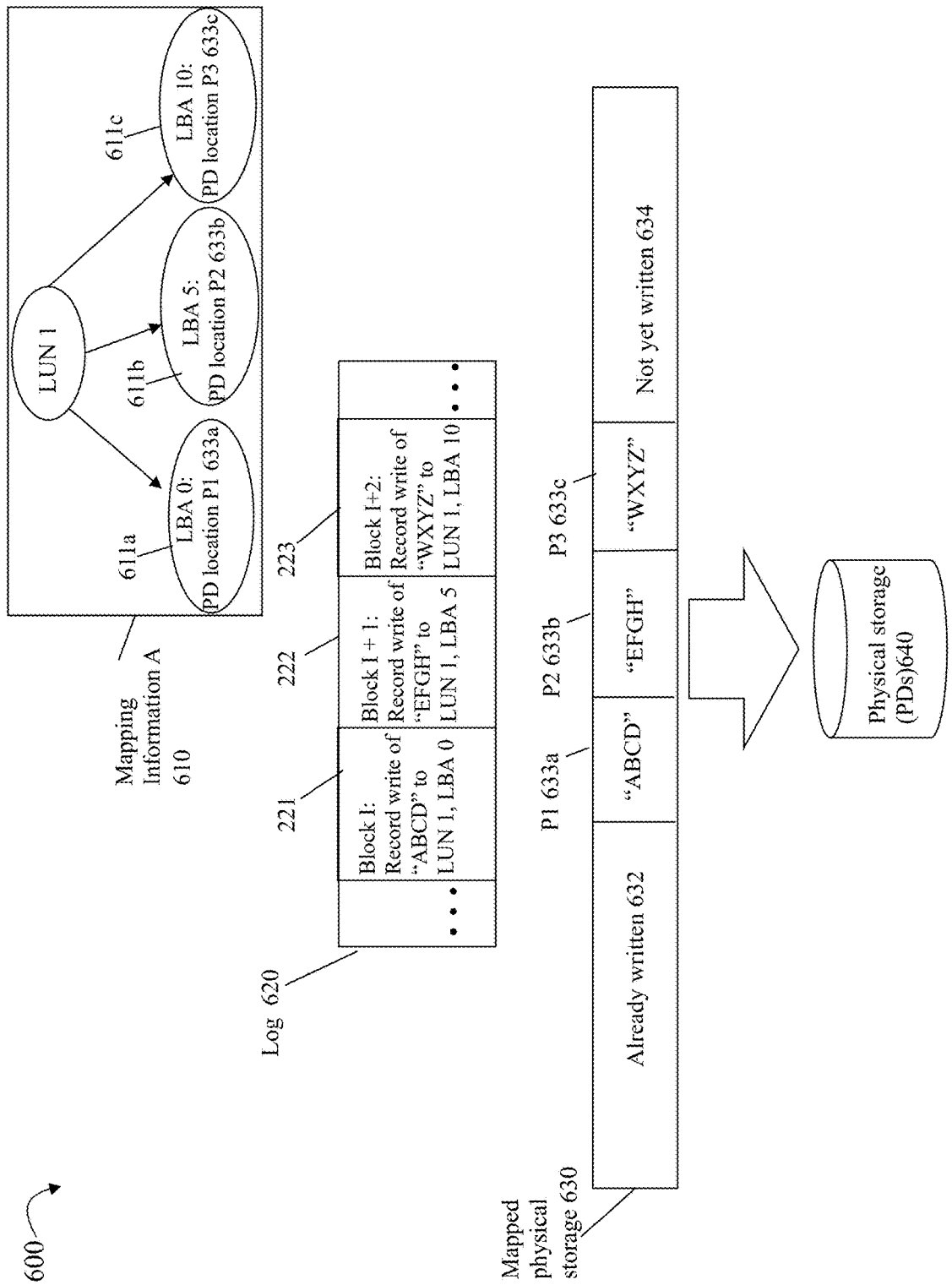

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611*a-c* denoting the mapping information, respectively, for the 3 target logical address of the 3 recorded write I/O operations in the log records 221, 222, and 223. The element 611*a* of the mapping information denotes the mapping information for the target logical address LUN1, LBA 0 of the block 221 of the log 620. In particular, the block 221 and mapping information 611*a* indicate that the user data "ABCD" written to LUN 1, LBA 0 is stored at the physical location (PD location) P1 633*a* on the physical storage 640. The element 611*b* of the mapping information denotes the mapping information for the target logical address LUN1, LBA 5 of the block 222 of the log 620. In particular, the block 222 and mapping information 611*b* indicate that the user data "EFGH" written to LUN 1, LBA 5 is stored at the physical location (PD location) P2 633*b* on the physical storage 640. The element 611*c* of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633*c* on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

Referring to FIG. 3, shown is an example 300 of a tree of MD pages that can be used in an embodiment in accordance with the techniques herein. The example 300 includes a tree of MD pages denoting the mapping structure as discussed above with 3 levels-a top or root level, level 1, including a single MD TOP page; a single mid or middle level, level 2, of MD MD pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
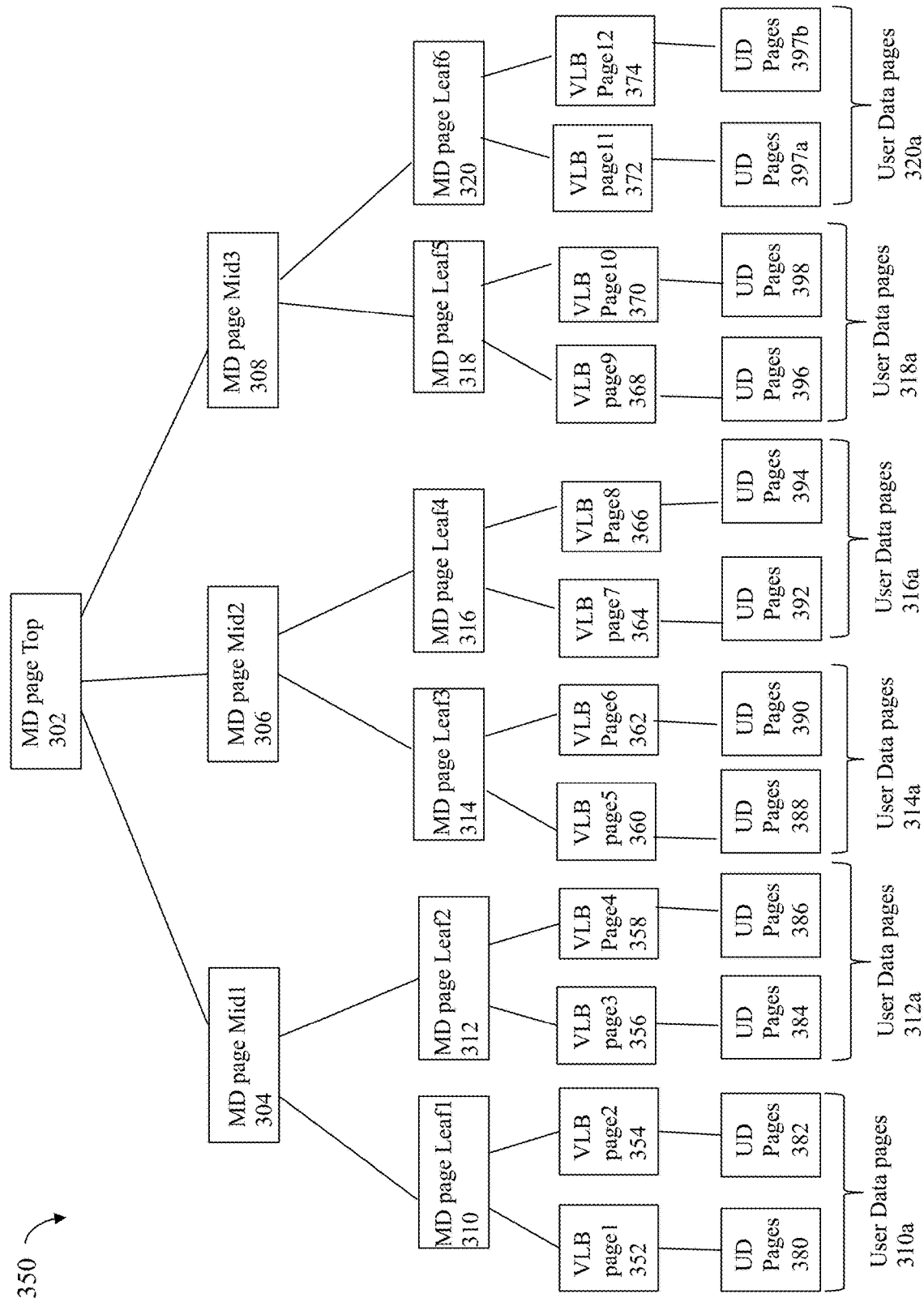

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of a VLB (virtualization layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages-MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559. The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
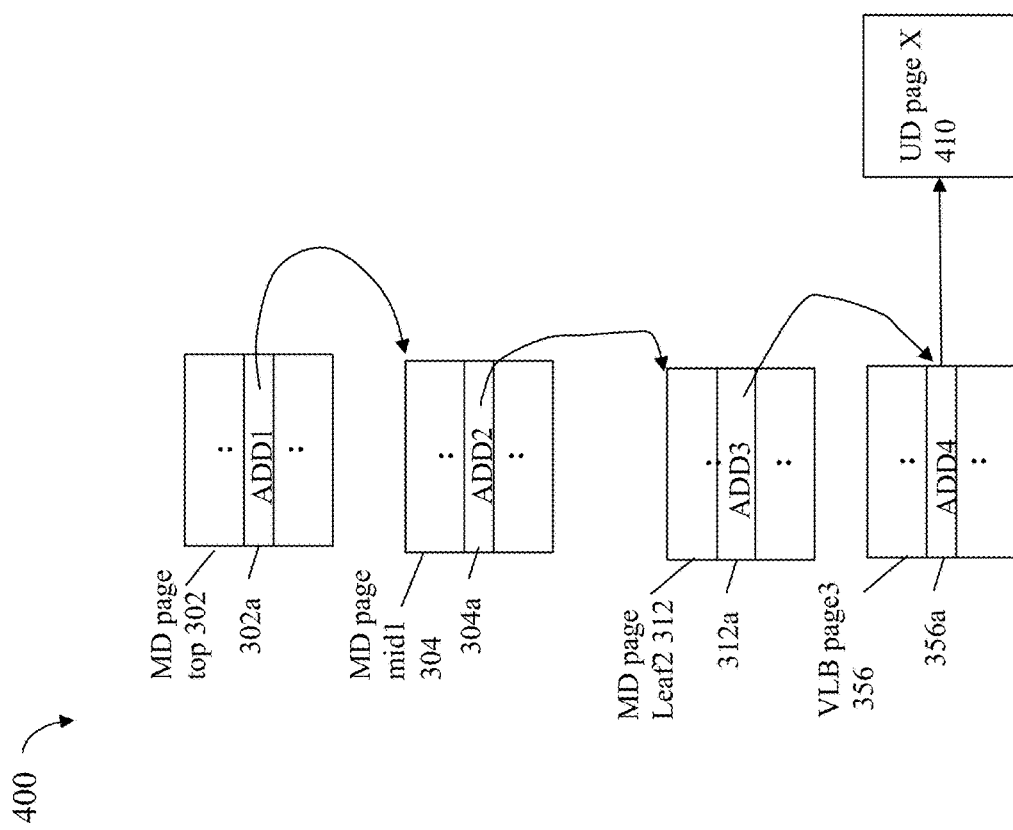

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the particular mid level MD page, such as MD page mid1 304, that is accessed next in the sequence.

Continuing with the example 400, the MD page mid1 304 can be accessed where the location 304a is read to obtain the address or pointer ADD2 from location 304a. In at least one embodiment, the particular entry or offset 304a of the MD mid1 page can be determined based on the logical address being mapped. The address or pointer ADD2 can then be used to identify the particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies the MD page leaf 2 312. If the MD page 312 is not already in cache, the on-disk copy of the MD page 312 on a PD can be read to obtain the content of location 312a. In at least one embodiment, the particular desired entry or offset 312a of the MD leaf2 page 312 can be determined based on the logical address being mapped. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

In at least one embodiment, each VLB can be a VLB page or node as described herein including multiple entries, such as 512 entries, where each such VLB entry can include one or more fields of information such as the address or pointer to a physical storage location of stored content or data. Additionally in at least one embodiment, each VLB entry pointing to or associated with stored content or data can also include a reference count denoting a number of references or logical addresses that store the content or data. In at least one embodiment, multiple MD leaf entries corresponding to multiple logical addresses of used data or content can all reference or point to the same VLB entry thereby denoting that such multiple logical addresses all store the same content or data associated with the VLB entry.

The reference count of a VLB entry can be updated in connection with deduplication processing and/or as used data or content stored at various logical addresses changes. For example, deduplication processing can be performed on new data written to a target logical address by a write I/O operation. Deduplication processing can determine that the new data is a duplicate of existing data stored in a data block. Rather than store another copy of the same data in another data block, deduplication processing can include alternatively having the target logical address reference the single existing copy of the data as stored in the data block. As part of deduplication processing, the reference count associated with the single existing copy of the data block can be incremented as each additional reference to the same data block is made. In a similar manner, the reference count can be decremented as content of a particular logical address is modified or deleted to no longer be considered a duplicate of the single existing copy of the data block.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-5.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-5.

In at least one embodiment, the MD or mapping information used in connection with stored user data can be stored on non-volatile storage, such as on the BE PDs of the appliance or data storage system. At least some of the MD pages of mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at new subsequent physical storage locations on the BE PDs. Additionally, the MD or mapping information corresponding to the logged writes being flushed can also be accordingly updated to reference the new subsequent physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-5.

In at least one embodiment, updates or modifications to the MD pages of the MD or mapping structure described in connection with the FIGS. 3-5 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-5 can be persistently stored in a MD page store on the BE PDs of the system. In some contexts herein, the copy of a MD page as stored in the MD page store on the BE PDs can also be referred to herein as the on-disk copy of the MD page.

In some existing implementations, when an update is made to a MD page, the entire resulting MD page with the update applied can be stored in the metadata log file. In such implementations, an excessive amount of storage can used in connection with the metadata log file in that each MD page update can include storing an entire updated MD page in the metadata log file. Additionally, excessive amounts of node-local volatile memory of the nodes can be used in connection with node-local cached copies of portions of the metadata log file.

In at least one implementation, many read and write operations performed with respect to a MD page may only need, respectively, to read or update one field or value of the MD page. For example, a MD update to a MD page can require only updating a relatively small number of bytes, such as 4 bytes or 8 bytes, of a much larger MD page, such as a 4K byte MD page. However, as noted above, existing workflows for some implementations to perform reads and writes to the MD page can include loading the entire MD page into the cache or volatile memory of a node, if the MD page is not already in the cache or volatile memory of the node.

In this manner, existing implementations and workflows such as noted above can consume an excessive of amount of system resources, such as memory and CPU or processor execution time, resulting in performance degradation.

To improve upon the foregoing in at least one embodiment, a metadata log architecture can be used which includes a metadata log where updates to MD pages are recorded using only the changes, updates or "deltas" made to the MD pages. For example, many updates to a MD page can be an update or write of a relatively small number of bytes, such as 4 bytes or 8 bytes, of a much larger MD page, such as a 4K byte MD page.

In at least one embodiment in accordance with the techniques of the present disclosure, the metadata updates, changed content, changes or "deltas" made to MD pages (rather than complete updated MD pages) can be recorded in a metadata log as stored on a log tier of non-volatile memory. Additionally, in at least one embodiment in accordance with the techniques of the present disclosure, the metadata updates, changes or deltas made to at least some of the MD pages can also be stored in local volatile memories of the nodes of the system. The node local in-memory copy of the metadata changes, updates or deltas made to MD pages as stored on each of the nodes can also sometimes be referred to herein as the in-memory log, in-memory delta log or in-memory metadata log used by each node in connection with performing processing in accordance with the techniques of the present disclosure.

In at least one embodiment, each metadata update, change or delta made to a MD page may be expressed in the form of a tuple represented as (LI, EI, T, V) where:

LI denotes the logical index of the MD page. The LI can be a unique index of the MD page that is updated. The LI can be used to uniquely identify the MD page in the MD or mapping structure such as described elsewhere herein (e.g., FIGS. 3-5). In at least one embodiment, the LI can denote or can be the logical address, offset or location of the MD page. In at least one embodiment, the logical address, offset or location of the MD page can also be or denote the physical address, location or offset of the MD page as stored persistently on non-volatile storage, such as of the BE PDs of the data storage system.

EI denotes the entry index denoting a particular entry, offset or location in the MD page denoted by LI.

T denotes the type of metadata update. For example, in at least one embodiment there can be multiple predefined types or allowable values for T. For example, the predefined types or values for T may include one or more of: IDP denoting an update to an address or indirect pointer used to reference a data block (e.g., the indirect pointer may be point to, or be the address of, a VLB entry that further includes an address of, or pointer to, the data block containing user data); INCREF denoting an update to increment by 1 a reference count of a VLB entry associated with a data block containing content that may be stored at one or more logical addresses; DECREF denoting an update to decrement by 1 a reference count of a VLB entry associated with a data block containing content that may be stored at one or more logical addresses. Generally, an embodiment can include any suitable number of predefined types that may vary with the supported metadata updates or changes.

V denotes the updated value to be stored.

It should be noted that the particular value of T denoting a particular type can also denote the size of the data payload V or updated value V of the tuple. For example, a type for T denoting an address can indicate that the size of V is the size or number of bytes or bits of an address or pointer. As another example, a type of T denoting an integer count or counter can indicate that the size of V is the size of an integer, such as 32 or 64 bits. In some instances, the value of the type T can imply performing an operation such as increment a counter by 1, or decrement a counter by 1, as noted above. In such cases and in some embodiments, the value for V of the tuple can be implied and omitted when T indicates to perform an increment or decrement operation of a field since such an increase or decrease can be with respect to a current or existing value of the counter.

In at least one embodiment, the metadata changes, updates or deltas made to MD pages as recorded in the in-memory metadata logs of the nodes can be in the form of tuples. In at least one embodiment, the metadata changes, updates or deltas made to MD pages as recorded in the metadata log stored on NVRAM can also be in the form of tuples.

Figure 6:
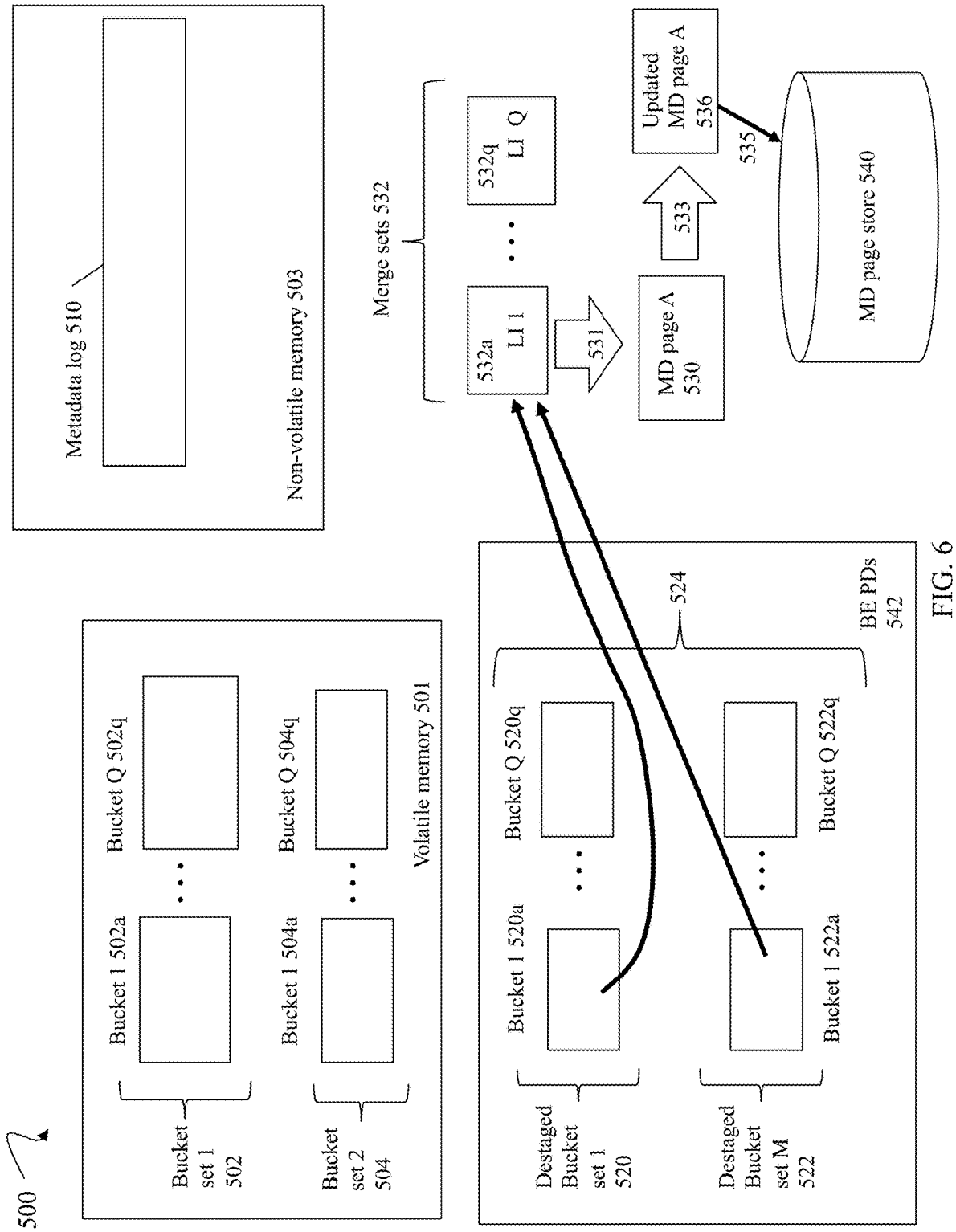
FIGS. 6, 7, 9, 10, 12A, 12B, 13, 14, 15, 16A, 16B, 17, 18, 19, 20, 23 and 24 are examples illustrating structures and data flows in at least one embodiment in accordance with the techniques of the present disclosure.

Referring to FIG. 6, shown is an example 500 illustrating structures and associated data flow in at least one embodiment in accordance with the techniques of the present disclosure.

The example 500 includes volatile memory 501, non-volatile memory 503 and non-volatile storage on the BE PDs 542. The volatile memory 501 can denote a volatile memory as included in each node of the appliance or system which includes node local in-memory structures and cached data that can be used in connection with the techniques herein. In particular, the volatile memory 501 includes bucket sets 502, 504 of logged metadata changes, updates or deltas. The non-volatile memory (e.g., NVRAM) 503 includes the metadata log 510 of metadata updates, changes or deltas. Consistent with other discussion herein, the non-volatile memory 503 can be accessible to both nodes of the system.

Collectively, the structures or bucket sets 502, 504 can denote the in-memory metadata log or in-memory delta log including the recorded metadata updates or deltas to MD pages for a particular node. Thus, each node in a dual node appliance can include an instance of the volatile memory 501 and associated structures or bucket sets 502, 504.

In at least one embodiment in accordance with the techniques herein, metadata changes, updates or "deltas" made to MD pages can be recorded and stored in a volatile memory structure in the volatile memory 501 of each node of the system. In this manner, an individual write or update to a MD page can be recorded as a single metadata update or entry in the volatile memory structure. For example, a write that updates only a 4 byte or 8 byte field of a 4K byte MD page can be recorded in the volatile memory structure as a single metadata update. Each metadata update can be represented as a tuple as discussed elsewhere herein in more detail. In at least one embodiment, each tuple can be relatively small in comparison to the size of each MD page.

The volatile memory 501 of each node can include volatile memory structures 502, 504. In at least one embodiment, the structures 502, 504 can denote two bucket sets 502, 504 where at any point in time, one of the two buckets sets 502, 504 can be designated as the active set and the remaining bucket set can be designated as the destaging, frozen, or inactive set. Each metadata update to a MD page can be added to a corresponding one of the buckets of the active bucket set that is uniquely associated with the MD page. For example at a first point in time, the bucket set 1 502 can be active and the bucket set 2 504 can be inactive, where received metadata updates are stored in the bucket set 502. As described in more detail in the following paragraphs, the roles of active and inactive or destaging can be alternated or switched between the two bucket sets 502, 504 in a continuous manner as the currently active set is deemed full or ready for destaging to the BE PDs 542.

The bucket set 1 502 includes the buckets 502a-502q, and the bucket set 2 504 includes the buckets 504a-504q, where there are "q" metadata pages. In each of the bucket sets 502, 504, each bucket can correspond uniquely to a different MD page. The metadata updates of a particular bucket are the recorded metadata updates to the MD page associated with the particular bucket of each bucket set. For example, MD page A can be uniquely associated with, and mapped to, the first buckets 502a, 504a, respectively, in each of the bucket sets 502, 504. In this manner, the bucket 1 502a includes the metadata updates made to the MD page A when the bucket set 502 is the active set; and the bucket 1 504a includes the metadata updates made to the MD page A when the bucket set 504 is the active set.

Each of the bucket sets 502, 504 in at least one embodiment can be further organized as a hash table of buckets where each MD page is mapped to a particular bucket using a hash function. The hash function can map the logical index (LI) uniquely identifying a MD page to a corresponding bucket of metadata updates for the MD page. In at least one embodiment, each of the bucket sets 502, 504 can denote a hash table of buckets implemented as an array, where the hash value HV1 of the LI of a MD page denotes the index of the array and the bucket associated with the MD page. Within each bucket associated with a MD page, the metadata updates can be sorted in a time order, from oldest to newest, based on when the metadata updates are received in the system. In at least one embodiment, each bucket (e.g., 502a) of metadata updates for a MD page can be organized in a binary tree. The metadata updates can be represented as nodes or entries in the binary tree. The metadata updates or nodes of the binary tree can be sorted, at least in part, based on the time order of when the metadata updates are received by the system. The increasing time order can indicate the order in which the metadata updates or changes are applied to the MD page associated with the bucket or binary tree.

More generally, an embodiment in accordance with the techniques herein can use any suitable volatile memory structure(s) and organization to store the metadata updates, changes or deltas to the MD pages.

In at least one embodiment, when a new metadata update U1 is made to a MD page, the metadata update U1 can be represented as a tuple. The metadata update U1 can be inserted into the active bucket set as follows. The hash function H is used to calculate a hash value HV of the LI of the MD page (e.g., H(LI)=HV). The HV can denote the bucket uniquely associated with the MD page being updated. For example, assume the bucket set 502 is the active set and assume that the MD page A is being updated with the new metadata update U1. The MD page A can have an LI that generates a hash value=1 mapping to the first bucket, bucket 1 502a, of the bucket set 502. The bucket 502a can be a binary tree including metadata updates to the MD page A. The metadata update U1 can be inserted into the sorted binary tree of 502a based, at least in part, on when the metadata change U1 was received.

Consistent with other discussion herein, the volatile memory 501 can include 2 sets of buckets 502, 504. At a first point in time T1, a first set of buckets, such as 502, can be designated as the active set and the second set of buckets 504 can be designated as the inactive set of buckets. Consistent with other discussion herein, each bucket in a set includes the metadata updates or changes for a particular one of the MD pages associated with the bucket. Thus, metadata changes received for a particular MD page are located in the bucket associated with the MD page. The role assignments of active and inactive can be continuously switched between the two bucket sets 502, 504 of a node at subsequent points in time as the currently designated active set becomes full. In at least one embodiment, the role assignment switching between the two sets of buckets can be performed when at least one bucket in the active set becomes full, or more generally reaches a predefined maximum size limit. In some implementations, each data container can have a predefined data limit before the data container is considered "full". For example, metadata updates to a MD page associated with each bucket can be written to the BE PDs of the system as a separate page (e.g., 4 KB). In this example, the page size can determine the predefined data limit of a bucket. In other words, once a bucket includes a page-worth of metadata changes, processing can determine that the data container is "full".

To further illustrate, at a second point in time T2 subsequent to T1, the first set of buckets 502 currently designated as the active set becomes full and, in response, the second set of buckets 504 can be assigned as the active set and the first set 502 can be assigned as the inactive set. At the second point in time, metadata updates can be destaged from the inactive first set of buckets 502 in volatile memory to the BE PDs 542 such as, for example, in the first phase of destaging as mentioned elsewhere herein. New metadata updates received subsequent to T2 while the bucket set 502 is inactive or destaged are stored in the set of buckets 504 designated as the currently active set of buckets. At a third point in time T3 subsequent to T2, the second set of buckets 504 currently designated as the active set becomes full, and in response, the first set of buckets 502 can be assigned as the active set and the second set 504 assigned as the inactive set. Metadata updates can now be destaged from the second set 504 designated as the inactive set while subsequent metadata updates are now stored in the first set 502 designated as the active set. The foregoing switching of roles of active and inactive between the two sets of buckets 502, 504 can be repeatedly performed in an ongoing manner where new metadata updates are stored in the currently designated active set and where metadata updates of the other currently designated inactive set are destaged from the volatile memory 501 to the BE PDs 542.

In at least one embodiment in accordance with the techniques herein, one or more sets of the metadata updates for the MD pages can be destaged in a first phase of MD log destaging from the volatile memory 501 to the BE PDs 542 providing non-volatile backend storage. As mentioned above, metadata updates can be destaged in the first phase of destaging from the particular one of the bucket sets 502, 504 designated as the inactive set. Over time, multiple bucket sets 524 can be destaged from the volatile memory 501 (e.g., of each of the nodes) to the BE PDs 542 in the first phase of destaging. The destaged bucket sets 524 in this example include M destaged bucket sets indicating that M sets of Q buckets have been destaged from the volatile memory 501 (e.g., as included in each of the nodes) to the BE PDs 542, where the M destaged bucket sets 524 are awaiting further processing in the subsequent second phase of destaging.

The destaged bucket sets 524 of metadata updates for the MD pages can be stored and organized on the BE PDs in any suitable structures and organization. For example, each destaged bucket set of metadata updates for MD pages can be organized into buckets of bucket pages, where each bucket can correspond or map uniquely to a single MD page. For example, the bucket 1 520*a* of the destaged bucket set 1 520 can include metadata updates for the MD page A as noted above. The bucket (e.g., 520*a*) of one or more bucket pages associated with a single MD page (e.g., MD page A) can include one or more metadata changes made to the MD page, where the metadata changes can be represented as tuples in the volatile memory structure (e.g., bucket sets 502, 504) of the volatile memory 501. The metadata changes in each bucket, such as 520*a*, of 524 can be sorted based on insertion time and therefore denote the sorted increasing time order in which the metadata changes are applied to the MD page. In at least one embodiment, the bucket pages of each bucket of 524 can be organized as a list rather than, for example, a binary tree structure as described above in connection with the organization of metadata updates in the volatile memory 501. In at least one embodiment as denoted by the element 524, there can be multiple sets of metadata updates for MD pages stored on the BE PDs 542, where each of the multiple destaged bucket sets of 524 can denote a set of metadata updates destaged from the buckets sets 502, 504 of volatile memory at a different point in time.

In a second phase of destaging, metadata changes, updates or "deltas" from the multiple destaged bucket sets 524 made to the same single MD page can be aggregated and combined into a working set (sometimes referred to as a data container working set) of metadata updates for the MD page. The second phase of destaging can aggregate and combine the metadata updates for each MD page across the multiple destaged sets (520, 522) of metadata updates as stored on the BE PDs in the first phase of destaging. Thus a working set or merge set of metadata updates for a single MD page can denote aggregated metadata updates to the MD page, where the metadata updates can be located in the multiple destaged sets of updates 524 stored on the BE PDs 542. An existing or current version of the MD page can be read from the BE PDs. The working set of metadata changes for the MD page can be applied to, or combined with, the current MD page to thereby result in an updated version of the MD page. The updated MD page can then be persistently stored on the BE PDs replacing the prior current or existing version of the MD page.

To further illustrate, consider the MD page A 530 having an associated LI=1 that maps to the first bucket (e.g., 520*a*, 522*a*) in each of the M destaged bucket sets of 524. The second phase of destaging can aggregate and combine the metadata updates for the MD page A 530 from the first buckets (e.g., 520*a*, 522*a*) across the multiple M destaged sets 524 of metadata updates as stored on the BE PDs 542 in the first phase of destaging. The element 532*a* can denote the merge set of aggregated updates from the first buckets 520*a*, 522*a* of the destaged sets 524 for the MD page A 530. Thus the merge set or working set 532*a* of metadata updates for the MD page 530 can denote aggregated metadata updates to the MD page, where the metadata updates can be located in the multiple destaged sets 524 of updates stored on the BE PDs. An existing or current version 530 of the MD page can be read from the BE PDs. The merge set or working set 532*a* of metadata changes for the MD page A can be applied to (531) the current MD page A 530 to thereby generate (533) an updated version of the MD page A 536. The updated MD page 536 can then be persistently stored (535) on the MD page store 540 of the BE PDs replacing the prior current or existing version of the MD page 530.

Generally, the element 532 denotes the merge sets of aggregated metadata updates for all the MD pages. In this example, there are Q MD pages, where each of the Q MD pages can be uniquely associated with a corresponding one of the merge sets 532*a-q* based on the LI of each of the Q MD pages.

In at least one embodiment in accordance with the techniques herein, the metadata changes, updates or deltas can be recorded in the metadata log 510 The metadata log 510 can be stored in the non-volatile memory 503, such as non-volatile Random Access Memory (NVRAM). In some implementations, the metadata log 510 can store metadata updates in time order (e.g., sorted oldest to newest). In some implementations, the metadata log 510 can be used to recover and reconstruct in-memory structures, such as structures of the volatile memories of the nodes of the data storage system. The metadata log 510 can be used to perform such recovery or reconstruction of the in-memory structures, for example, in response to a failure of the volatile memory of a node, or in response to a restart or reboot of a node or data storage system.

In some implementations and in response to destaging or writing the one or more metadata changes from the volatile memory 501 to the BE PDs 542 in the first phase of destaging, processing can be performed to release or free the corresponding part of the metadata log storing the destaged metadata changes. In at least one embodiment, the persisted metadata log 510 can be implemented as a ring buffer. Ring buffers are generally known in the art. A ring buffer can be represented as a logical ring of records or entries. The ring buffer can be maintained using pointers, such as a head pointer and a tail pointer, where new entries of the ring can always be allocated from the head and space reclamation can always be done from the tail. When an entry at the tail is flushed or destaged, the entry can be freed and thus reclaimed for reuse. The tail can be advanced as entries are flushed. In a similar manner, as entries are allocated, the head pointer is advanced. In at least one embodiment, entries from the metadata log 510 can be reclaimed as corresponding entries denoting the same metadata changes or deltas are destaged in the first phase of destaging from the in-memory metadata logs of the nodes (e.g., volatile memories 501 of the nodes) to the BE PDs 542. In such an embodiment, the destaging of metadata updates or changes as recorded in the in-memory metadata logs of the nodes can be synchronized with reclaiming corresponding entries from the persisted metadata log 510.

In at least one embodiment, when a single bucket set from volatile memory is destaged, corresponding entries from the persisted metadata log 510 stored in NVM 503 can also be reclaimed. In at least one embodiment, the destaging of an in-memory metadata log structure (e.g., such as a single bucket set 502) and reclaiming corresponding entries from the persisted metadata log 510 stored in NVM can be done atomically. In at least one embodiment, the metadata log 510 stored on the NVM can be a ring buffer as noted above where new metadata log 510 entries are added to the head and removed from the tail. In such an embodiment, the corresponding entries of the metadata log 510 can be reclaimed by moving the tail of the ring buffer to free the corresponding entries of the ring buffer. In such an embodiment, synchronization between the in-memory metadata logs of the nodes and the persisted metadata log 510 can be maintained so that flushing or destaging an in-memory metadata log in the first phase and reclaiming corresponding entries in the persisted metadata log 510 are done atomically. In particular in at least one embodiment, reinitializing or resetting the in-memory metadata log which has been destaged (e.g., in the first phase) can be performed atomically with movement of the tail of the metadata log 510 to reclaim corresponding entries for the destaged entries of the in-memory metadata log. It should be noted that in embodiments where a single entry of the persisted metadata log can be referenced across multiple bucket sets, the entry of the persisted metadata log cannot be reclaimed until all such references across the multiple bucket sets have been destaged or flushed in the first phase from volatile memory to the BE PDs 542.

It should be noted that destaging the in-memory metadata log can generally be performed in a single phase or other suitable manner. For example, destaging the metadata log can be performed by processing and merging bucket sets without intermediate storage on the BE PDs. Rather, destaging the metadata log can include determining the merge sets using destaged bucket sets and merge sets stored in volatile memory.

Consistent with other discussion herein in at least one embodiment, updates or modifications can be with respect to user data or stored content modified by client or host write I/Os as well as with respect to metadata, such as updates or modifications to the MD structure or mapping information described above. As noted above in at least one embodiment to increase performance, the updates to user data can be stored (e.g., persisted temporarily) in a log or journal logging client or host writes, and the updates to the MD or mapping information can be stored (e.g., persisted temporarily) in a metadata log. One characteristic of a log structured system, such as in connection with the metadata log and log of client updates or writes, is that updates or modifications (which are recorded in an associated log and then flushed to long term storage of the BE PDs) may not physically overwrite or update the same BE PD physical location storing the old data or existing content (e.g., no physical in place update). Rather, the newly written or updated data is typically written to a different physical location on the BE PDs. Thus, the BE PDs can retain the valid old data in the original physical location for some time before being reclaimed for reuse by garbage collection processing.

Garbage collection (GC) can be performed in connection with storage management of the BE PDs to reclaim and reuse free or invalidated physical storage as new data is written. In some cases, "holes" of storage storing old, unused or invalid content can be interspersed among portions of storage storing current valid content. Garbage collection can include performing processing which allows multiple holes of storage including unused or invalid data to be compacted into a single larger contiguous storage portion which can then be reused. Thus garbage collection processing can include moving first storage portions of valid data or content interspersed among holes of invalid content from a source to a target location to thereby make free or available a larger contiguous storage portion including the holes of invalid content.

Consistent with other discussion herein, an entry from the log of user or client updates (sometimes referred to as the UD (user data) log) can be an update to a logical address (e.g., LUN and LBA) which writes content to a UD page. Flushing the entry can include destaging the updated UD page to a backend storage location on non-volatile storage (e.g., BE PD location). Additionally, flushing and destaging the entry from the UD log can include updating the corresponding MD pages which map the logical address to its corresponding BE PD location including the content stored at the logical address. In at least one existing system, the mapping information including MD pages as described herein can thus be updated. For example, such updating of the mapping information can include updating MD of any of the top, mid, leaf, and VLB metadata pages used in connection with mapping the logical address to the BE PD location including the content stored at the logical address. In at least one existing implementation, updating the corresponding mapping information and MD pages can include loading all the MD pages into the cache if any such MD pages are not already in cache. The MD pages of the mapping information can be characterized as a chain forming an access sequence of top MD page, mid MD page, leaf MD page and VLB page, where each MD page in the sequence can be accessed serially and also in the strict consecutive order of the sequence since a first page of the sequence can reference a next consecutive page, or location thereof, in the sequence.

Consistent with other discussion herein, data storage systems have components whose responsibility is to map the user-visible logical address space to the internal physical address space, and implement various features such as, for example, snapshots, data compression, data deduplication, and the like. Such mapping and features may rely on different types of metadata to be implemented. This metadata can be typically stored persistently as, for example, 4K blocks of physical storage where different MD pages can reference each other by their physical block-addresses. In at least one embodiment, each MD page when allocated can be assigned a unique physical storage address, offset or location on non-volatile storage where the MD page is persisted. In a model or system using physical addresses or locations without corresponding logical addresses, there is generally no flexibility to move a MD page from an existing physical location to a new physical location since all MD pages referencing the to-be-moved MD page would have to be found and their references would need to be updated to reference the new physical location. Put another way, in at least one system not using the techniques of the present disclosure, the chain or MD pages of mapping information can include pages of metadata that reference other pages of metadata by their physical storage locations or addresses. As a result, metadata can be typically implemented as an in-place over-write system. In such a system, MD pages can remain in the same physical locations where updates to the MD pages are performed in-place and overwrite the same existing physical location. In such a system where MD pages can reference each other by their corresponding physical storage locations or addresses, if an updated version to a MD page is rewritten to a new physical location, all references to the MD page by other MD pages would also have to undesirably be updated to refer to the new physical location. Thus, the MD pages can be persistently stored at fixed physical addresses such as on non-volatile BE PDs of the storage system. The BE PDs used to store the metadata using overwrites or in-place updates can be configured as RAID-level storage of one or more RAID groups. For performance reasons, metadata may have to be stored in a mirrored RAID configuration, such as a RAID-1 configuration, which has a small write performance cost for such in-place updates in comparison to an alternative parity-based RAID configuration such as RAID-5 or RAID-6. However, although the mirrored RAID configuration for the metadata may have less write performance costs as compared to parity-based RAID configurations, the mirrored RAID configuration can generally result in excessive use of storage capacity in comparison to the RAID parity-based configurations. Additionally, because of MD pages referencing each other by physical addresses or physical storage locations, defragmentation and reclaiming of capacity allocated to metadata may become an intractable problem. Furthermore, in systems where the BE PDs or storage tier used to store the metadata are SSDs (solid state drives) such as flash-based storage, continually updating by overwriting to the same SSDs can result in exceeding a maximum number of allowed daily writes (writes per day or WPD) thereby leading to SSD wear out. The SSDs such as flash-based storage can be optimized for use in LSSs where writes to a logical storage object, such as a MD page, are written to a new physical location each time the MD page is updated. Thus, in systems where the MD pages are persistently stored on non-volatile SSDs as the BE PDs, the SSDs can implement an internal LSS where it can be further advantageous to implement a LSS of the metadata at the system level to further facilitate minimizing write amplification and reducing SSD wear.

Based on the foregoing, there exists motivation to implement the persistent metadata storage, such as on one or more storage tiers of the BE PDs, as a LSS which does not perform in place metadata updates and does not update an existing MD page stored at a physical address or location by overwriting current content of the physical storage address or location of the MD page with the new or updated content. Rather, in a LSS, updates to the metadata can be performed by writing the updated version of a MD page to a new physical location each time the MD page is updated.

However, use of a LSS metadata system where each updated version of a MD page is written to a new physical location creates new challenges. Since the MD pages can reference one another, it can be impractical and undesirable to have the MD pages reference each other by their physical storage locations since, for example, storing an updated version of a first MD page to a new physical location would require updating all other referencing MD pages to now refer to the new physical location. As a result, MD pages can reference each other using logical addresses which can then be mapped by an intervening layer or mechanism to corresponding physical addresses or physical locations. In at least one embodiment, the logical addresses of the MD pages, including top, mid, leaf and VLB metadata pages, can be indirect pointers or addresses that indirectly reference the physical storage addresses and locations of the MD pages through the intervening layer or mechanism. The intervening layer or mechanism can maintain a new type of mapping that, for MD pages, translates a logical address of a MD page to its current corresponding physical address or location. In this manner, a first MD page can reference a second MD page, or entry thereof, using a logical address of the second MD page. The new type of mapping can use a translation table, sometimes generally referred to herein as a TT, to map the logical address of the second MD page to its corresponding current physical location. When the second MD page is updated so that the updated version is stored at a new physical location, the TT can be updated to reference the new physical location of the second MD page and where the first MD page can continue to reference the second MD page using the logical address that is mapped, by the TT, to the new physical location. In at least one embodiment, each MD page can be assigned a logical address included in the TT where the logical addresses of the MD pages can remain fixed or the same for the lifetime of the MD pages, and where the physical storage locations or addresses of persistently stored copies of the MD paged can change over time as updated versions of the MD pages can be continually rewritten to new physical storage locations or addresses. The TT can translate a logical address, offset or location (LPA) of a MD page to its corresponding physical address, offset or location (PPA).

In at least one embodiment, as updated MD pages are stored in new physical addresses or storage locations over time, corresponding TT updates can be made to the TT to reflect the current physical address or storage location of MD pages at various points in time. In at least one embodiment, TT updates to the TT can also be managed and handled in accordance with a LSS where the TT itself can be characterized generally as another type of metadata.

In at least one embodiment, pages of metadata can be persistently stored in storage units denoted as PLBs (physical large blocks) in a metadata (MD) tier of non-volatile storage. Each PLB of metadata can have a corresponding PLB descriptor that generally describes content or data stored in the corresponding PLB. As a metadata page is updated and stored in a new physical address or storage location of a target PLB in accordance with a LSS, the target PLB's corresponding descriptors can also be updated to reflect the metadata page now stored in the target PLB. In at least one embodiment, such updates to a descriptor of the target PLB of metadata can also be managed and handled in accordance with an LSS.

Figure 7:
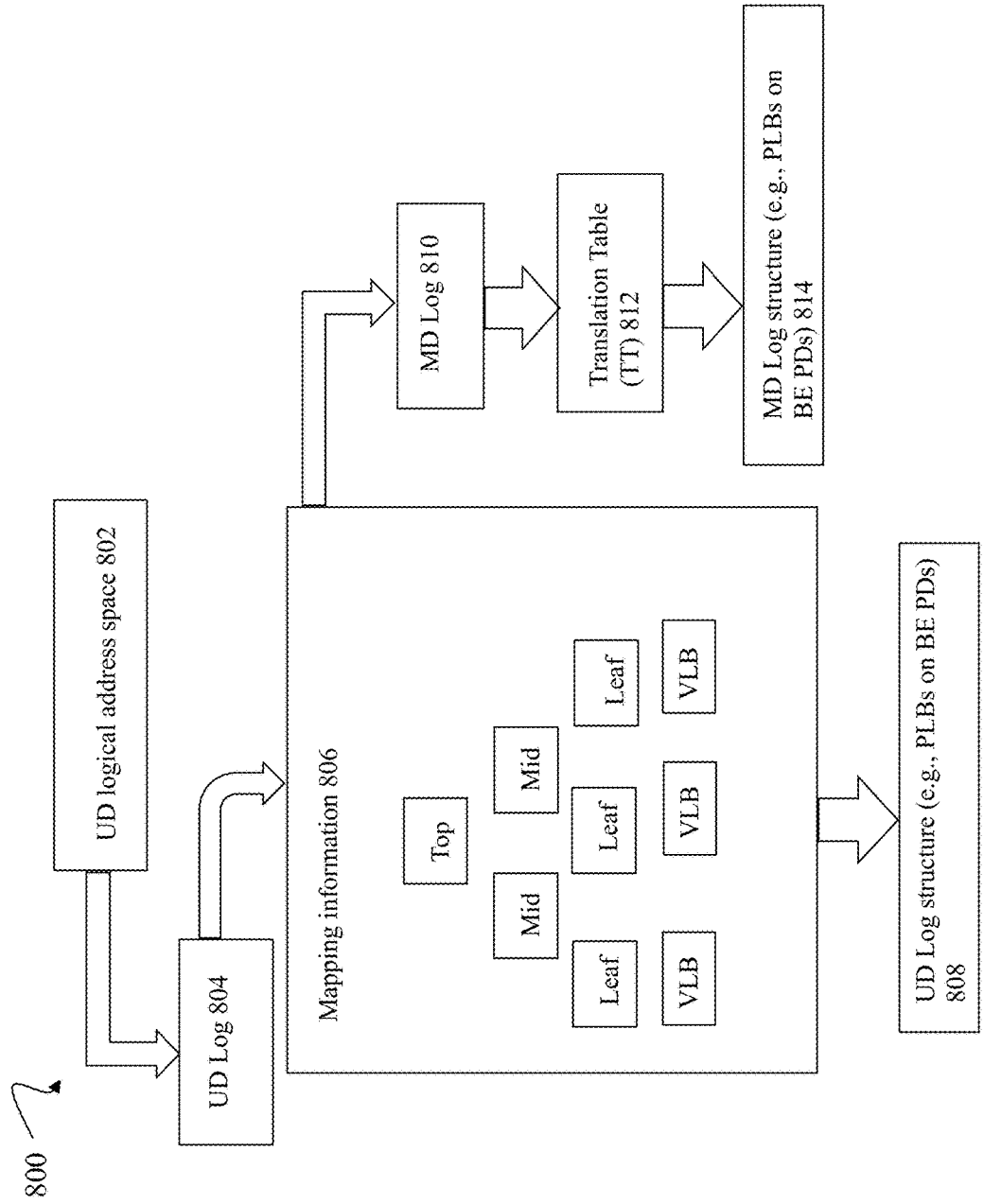

Referring to FIG. 7, shown is an example 800 illustrating components of a log structured MD architecture in at least one embodiment in accordance with the techniques of the present disclosure.

The example 800 provides a component level view of functionality regarding log structured mapping metadata can be include components in at least one embodiment in accordance with the techniques of the present disclosure. The example 800 includes UD logical address space 802, UD log 804, mapping information 806, UD log structure 808, MD log 810, translation table (TT) 812, and MD log structure 814. The UD log structure 808 can denote BE non-volatile storage, such as on BE PDs of the storage system, that persistently stores UD or content, for example, written by write operations. In at least one embodiment, the logs 804 and 810 can be persistently stored on a form of non-volatile storage such as on BE PDs. In at least one embodiment, the UD log structure 808 and the MD log structure 814 can have corresponding log structures as described elsewhere herein (e.g., such as in connection with FIGS. 2B-2D). In at least one embodiment consistent with other discussion herein, content persisted to each of the log structures 808, 814 can be written to consecutive sequential storage locations in an ongoing manner. In at least one embodiment, storage of 814 can be included a physical storage portion or tier sometimes referred to herein as the MD tier. In prior descriptions such as in connection with FIG. 6, the MD page store 540 can correspond to the MD tier.

As an example, assume a write W1 writes content C1 to a target logical address LA I included in the UD logical address space 802. Consistent with other discussion herein in at least one embodiment, the write W1 can be recorded persistently in the UD log 804. At a later point in time, the recorded write W1 can be flushed from the UD log 804, where such flushing can include creating and/or updating one or more corresponding MD pages of the mapping information 806 used to map LA1 to a physical storage location PA1 included in a new physical storage location of a physical large block (PLB) of storage of the UD log structure 808. Updates made to a page of MD (e.g., MD top, mid, or leaf, or a VLB page) included in the mapping information 806 can be stored persistently in entries of the MD log 810. Consistent with discussion herein, such metadata updates stored in the MD log 810 can be made, for example, in connection with flushing the recorded write W1 from the UD log 804. Recorded metadata updates of the MD log 810 can also be flushed or destaged. As a result of the metadata updates to a page of MD M1 that are flushed from the MD log 810, an updated version of the metadata page M1 can be generated and stored at a new physical storage location PA2 on a PLB of the MD log structure 814. Additionally, corresponding information of the TT 812 can be updated to now map a logical address of M1 to its new storage location PA2.

As another example, assume a subsequent read R1 requests to read content C1 from the UD logical address LA1 (e.g., where LA1 can be included in the UD logical address space 802). In at least one embodiment, the existing mapping information 806 used to map LA1 to PA2 where C1 is stored can be used to service R1. Logical addresses of pages of metadata (including top, mid, leaf and VLB metadata pages of the mapping information 806) can be used and referenced. For example, a MD top page can reference MD mid pages using their corresponding logical addresses; a MD leaf page can reference addresses of VLB pages using their corresponding logical addresses; and the like. Put another way, pages of metadata of mapping information 806 can reference other pages of metadata in accordance with their logical addresses. The TT 812 can operate to translate a logical address of a MD page, such as the logical address LI of MD page M1, to a corresponding physical address or location of the MD page, such as physical address PA1 of MD page M1, in the MD log structure 814.

In at least one embodiment, metadata pages can also be stored in volatile in-memory cache for faster access where the metadata page M1, if stored in the cache, can be accessed from the cache using M1's logical address L1. If M1 is not in cache when requested for reading such as when processing the read R1, a read cache miss results. Read cache miss processing in this example can include reading the MD page M1 from persistent storage, such as from its current physical storage location PA2 in the MD log structure 814.

To access a physical storage location of a metadata page in the MD log structure 814, the TT 812 can be used. In this manner in at least one embodiment read cache miss processing with respect to a metadata page that is not in cache, such as a volatile cache, can use the TT 812 to map the logical address LI of the MD page M1 to its corresponding storage location PA2 in the MD log structure 814.

The element 812 can generally denote use of one or more TTs. In at least one embodiment as discussed in more detail elsewhere herein, two TTs can be represented by the element 812 including: a first TT, MD TT, used for mapping or translating top, mid, and leaf MD pages; and a second TT, VLB TT, used for mapping or translating VLB pages. Thus although examples herein for illustration purposes can include the foregoing two TTs, an embodiment can alternatively use a single TT, or more generally, any suitable number of TTs including the same information.

Figure 8:
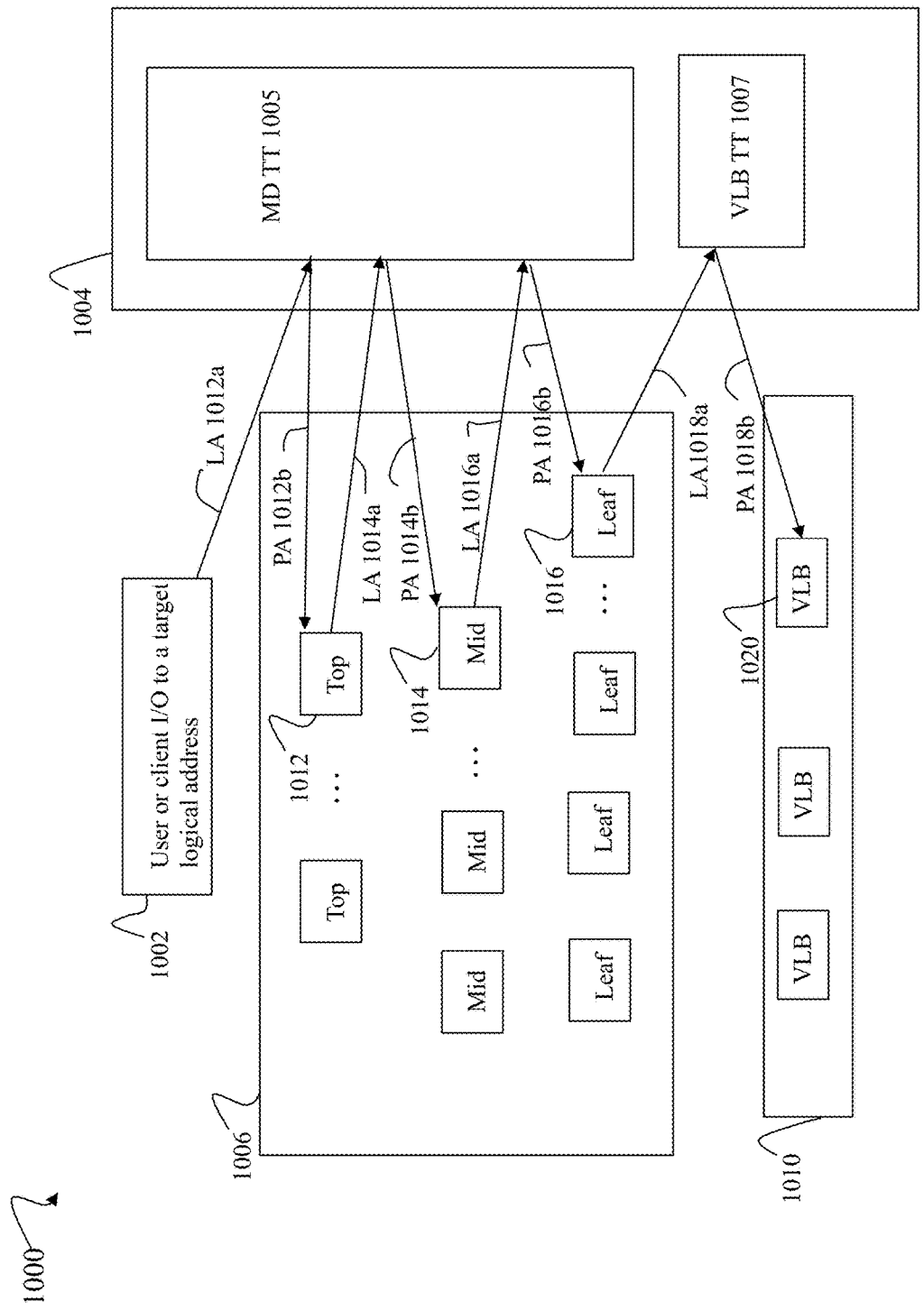
FIG. 8 is an example of illustrating logical to physical address translation of metadata pages included in a chain of mapping information.

Referring to FIG. 8, shown is an example 1000 illustrating further use of TTs in at least one embodiment in accordance with the techniques of the present disclosure.

In at least one embodiment, the elements 1004, 1006 and 1010 can denote different portions of non-volatile storage. The portion 1004 can persistently store the MD TT 1005 and the VLB TT 1007. The portion 1006 can persistently store top, mid and leaf MD pages. The portion 1010 can persistently store VLB pages. Element 1002 can denote a user or client I/O that includes a target logical address UD1 of the UD logical address space 802.

In at least one embodiment, TTs 1005, 1007 can include entries each mapping a logical address LA of a page of metadata to a corresponding physical address PA. To map an LA of a MD page to the corresponding PA where the MD page is persistently stored in the MD tier, processing can read the PA from a TT entry or element with the index LA, which can be represented as PA=TT [LA]. In at least one embodiment, the TTs 1005, 1007 can be structures maintained as set of MD pages of a new MD page type, such as a new type "TT".

In the example 1000, the element 1006 represents the non-volatile physical storage of the log structured system for persistently storing top, mid and leaf MD pages. The element 1010 represents a portion of the non-volatile storage used for persistently storing the VLB pages also considered metadata in at least one embodiment. The elements 1006 and 1010 can correspond to portions of the MD log structure 814 of example 800 and the MD page store 540 of FIG. 6 in at least one embodiment. Generally, the storage of 1004, 1006 and 1010 can be non-volatile storage, for example, of the MD tier that can include BE PDs of the storage system. The storage 1006 can be configured for storing a MD page to a new physical storage location each time the MD page is updated. The storage 1010 can be configured for storing a VLB page to a new physical storage location each time the VLB page is updated.

In at least one embodiment, the TTs 1005, 1007 can be accessed through cache (e.g., volatile memory) like other metadata pages. Consistent with discussion elsewhere herein in at least one embodiment, using the mapping information 806 of MD pages to map a user data or client target logical address to its corresponding physical location storing the content of the target logical address can require the mapping information of MD pages to be in cache. The mapping information can be characterized as forming a chain of MD pages including a top MD page, a mid MD page, a leaf MD page and a VLB page. A cached copy of a metadata page of the chain can be accessed in the cache based on its corresponding LA. If one of the MD pages of the mapping information is not stored in cache such as when servicing a read that reads the content from the target logical address, a cache miss results thereby triggering processing that loads the MD page from its current physical location on the non-volatile storage of 1006, 1010 into the cache for use in servicing the read. The TTs 1005, 1007 can be used to map a logical address or LA of a metadata page to its corresponding physical address or persistent storage location PA in connection with a cache miss of the MD page. The TTs 1005, 1007 can be cached in order to be used in connection with the foregoing mapping of LAs to corresponding PAs for metadata pages (e.g., top, mid, leaf and VLB pages) of the chain of mapping information.

For example, consider a read I/O 1002 to read data from a UD target logical address UD1. For the UD target logical address UD1, the logical address LA 1012a of the MD top page 1012 can be determined. If the MD top page 1012 is not in cache, cache miss processing can be performed where 1) the LA 1012a is then mapped by the MD TT 1005 to its corresponding physical address PA 1012b identifying the physical address or storage location of the MD top page 1012 in 1006; and then 2) the MD top page 1012 is loaded from its PA in 1006 into the cache and used to obtain the logical address LA 1014a of the next MD page, the mid MD page 1014, in the chain. Otherwise, if the MD top page 1012 is already in cache, the cached copy thereof can be used to obtain the LA 1014a of the next page, the mid MD page 1014, in the chain.

Processing can determine whether or not the mid MD page 1014 is in cache. If the mid MD page 1014 is not in cache, cache miss processing can be performed where 1) the LA 1014a is then mapped by the MD 1005 to its corresponding physical address PA 1014b identifying the physical address or storage location of the MD mid page 1014 in 1006; and then 2) the MD mid page 1014 is loaded from its PA in 1006 into the cache and used to obtain the LA 1016a of the next MD page, the MF leaf page 1016, in the chain. Otherwise if the MD mid page 1014 is already in cache, the cached copy thereof can be used to obtain the logical address LA 1016a of the MD leaf page 1016.

Processing can determine whether or not the MD leaf page 1016 is in cache. If the MD leaf page 1016 is not cache, cache miss processing can be performed where 1) the LA 1016a is then mapped by the MD TT 1005 to its corresponding physical address PA 1016b identifying the physical address or storage location of the MD leaf page 1016 in 1006; and then 2) the MD leaf page 1016 is loaded from its PA 1016b in 1006 into the cache and used to obtain the logical address LA 1018a to the VLB 1020 in the chain.

Processing can determine whether or not the VLB page 1020 is in cache. If the VLB page 1020 is not in cache, cache miss processing can be performed where 1) the LA 1018a is mapped by the VLB TT 1007 to its corresponding physical address PA 1018b identifying the physical address or storage location of the VLB page 1020; and then 2) the VLB page 1020 is loaded from its PA 1018b into cache and used to obtain the physical storage location where the requested content C1 for the target logical address UD1 is stored.

In connection with the foregoing, if a MD page of the mapping information chain is in the cache, the associated cache miss processing and thus associated TT mapping can be omitted. When a MD page, such as a top, mid or leaf MD page, is updated, the updated version of the page can be written to a new physical location, new PA, in the storage 1006. Additionally, when the MD page is updated and written to a new physical address PA, corresponding mapping information in the MD TT 1005 is also updated. In particular, the entry of the MD TT 1005 for the MD page is updated to now reference the new PA (e.g., MD TT 1005 is updated to map the MD page's fixed logical address to the new PA). When a VLB is updated, the updated version of the page can be written to a new physical location, new PA, in the storage 1010. Additionally, when the VLB page is updated and written to a new PA, corresponding mapping information in the VLB TT 1007 is also updated. In particular, the entry of the VLB TT 1007 for the VLB page is updated to now reference the new PA (e.g., the VLB TT 1007 is updated to map the VLB page's fixed logical address to the new PA).

Figure 9:
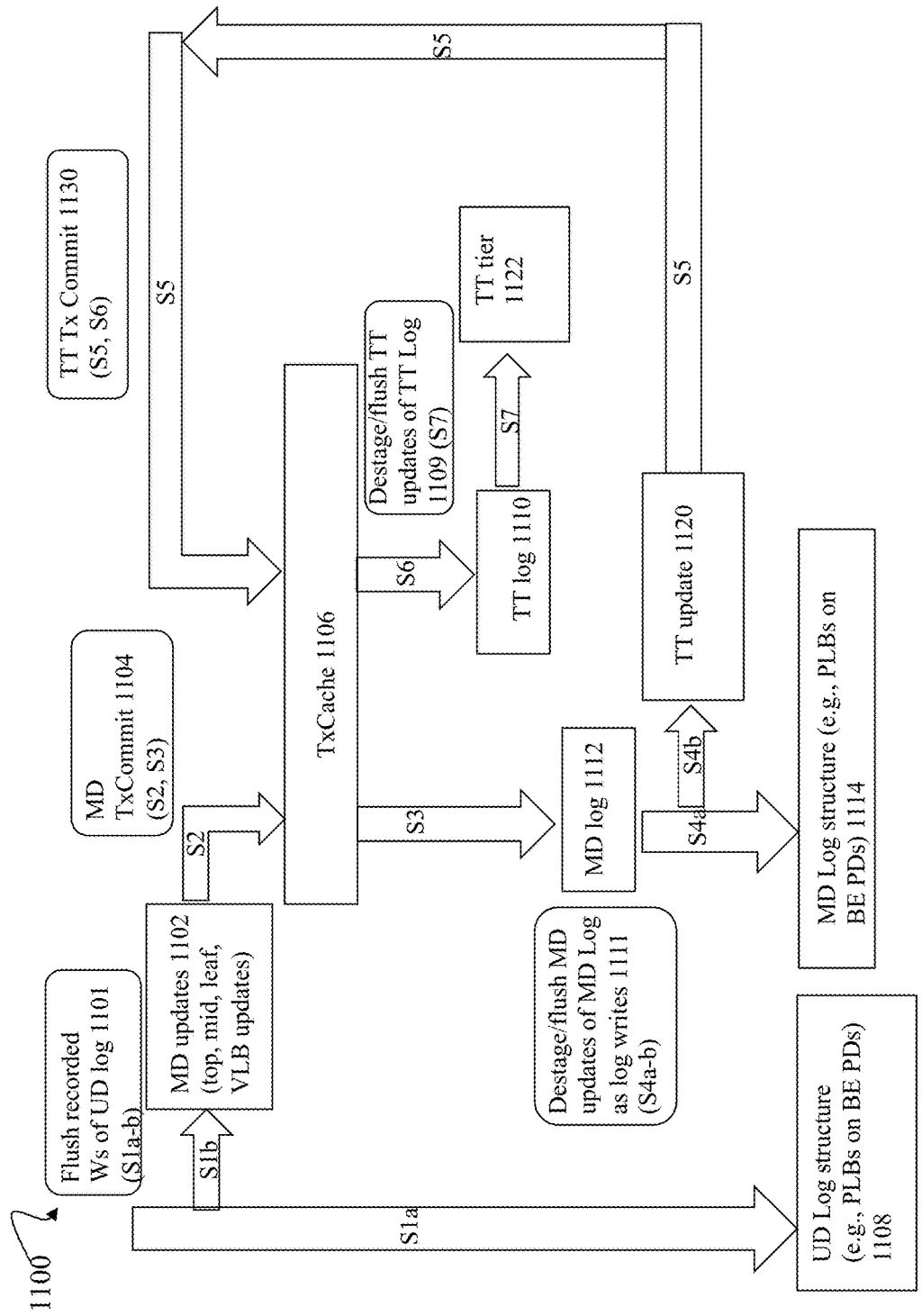

Referring to FIG. 9, shown is an example 1100 illustrating various processing or workflows in at least one embodiment in accordance with the techniques of the present disclosure.

The example 1100 includes a flush workflow or processing 1101 when flushing writes Ws as recorded in the UD log. Consistent with other discussion herein, flushing a recorded write W1 from the UD log (e.g., element 804 of the example 800), where W1 writes content C1 to UD logical address UD1, can include flows S1a-b. S1a can denote storing the written content C1 at a physical address of location PA1 in the UD log structure 1108 in a PLB of storage on the MD tier (e.g., stored on BE PDs). S1b can denote creating and/or updating one or more metadata pages of mapping information used to map UD1 to PA1, where PA1 currently includes the content C1 stored at UD1. Thus, S1b can include performing MD updates 1102 denoting top, mid, mid, leaf and/or VLB page updates. The MD updates 1102 (resulting from flushing the recorded write W1 from the UD log) can be included in a MD Tx (transaction) commit operation, workflow or processing 1104 where the MD updates 1102 to one or more pages are committed in the flow S2 to the Tx Cache 1106 and committed in the flow S3 to the MD log 1112. In at least one embodiment, the Tx Cache 1106 can denote a volatile memory cache. In at least one embodiment, the Tx Cache 1106 can include an in-memory or volatile memory copy of the MD log 1112, where the MD log 1112 can denote the persisted copy of the MD log stored on non-volatile storage.

In a manner similar to flushing entries of the UD log, recorded MD updates included in entries of the MD log 1112 (and also the in-memory copy in Tx Cache 1106) can be destaged or flushed as represented by element 1111. Destaging or flushing MD updates of the MD log as log writes 1111 can result in performing processing denoted by the flows S4a-b. S4a can denote applying one or more MD updates to a MD page to generate an updated version of the MD page, where the updated version of the MD page can be stored persistently at a new physical storage location of the MD log structure 1114. S4b can denote a TT update 1120 that needs to be made to a TT, where the TT update 1120 is in accordance with the new physical storage location. In particular in at least one embodiment, the TT update 1120 can include updating the TT to map the existing logical address of the updated MD page to the new physical storage location. In at least one embodiment, there can be a corresponding unique entry in the TT for each top, mid, leaf and VLB page of metadata such that each MD page updated results in updating the MD page's corresponding mapping entry of the TT with the MD page's new physical storage location or address.

One or more TT updates 1120 can be included in a TT Tx Commit operation, workflow or processing 1130, where the TT updates are committed in the flow S5 to the in-memory copy of the TT log as can be stored in the Tx Cache 1106, and committed in the flow S6 to the TT log 1110. In at least one embodiment, the Tx Cache 1106 can include an in-memory or volatile memory copy of the TT log 1110, where the TT log 1110 can denote the persisted copy of the TT log stored on non-volatile storage. The element 1109 can denote the workflow, processing or operation of destaging or flushing (in the flow S7) the TT updates from the TT log to a TT tier 1122. As discussed in more detail elsewhere herein in at least one embodiment, the TT tier can denote non-volatile storage storing persisted copies of the two most recent versions of the TT. In at least one embodiment, one or more TT updates can be applied to a current version of the TT to generate an updated version of the TT. The updated version of the TT can be a complete instance of the TT that is persisted to the TT tier. In at least one embodiment, the two most recent versions of the TT can be stored in the TT tier such that each time a new complete instance of the TT is destaged, it can replace the older of the two persisted TT instances of the TT tier 1122.

In at least one embodiment, the TT tier 1122 can also be log-based or have an associated log structure in that generally the multiple TT instances stored in the TT tier 1122 can be written sequentially. In particular, each TT instance can be written sequentially to the TT tier 1122. Additionally in at least one embodiment, the multiple TT instances stored in the TT tier 1122 can be logically sequential with respect to one another in accordance other discussion herein (e.g., such as in connection with FIGS. 2A-D). Furthermore, each time a new or updated version of a TT is written to the TT tier in accordance with the LSS, the new or updated version can be written to a new storage location that is different from an existing storage location or address storing the TT version prior to updating.

In at least one embodiment, multiple changes to the TT can be accumulated in the TT log. Subsequently, the multiple changes or updates to the TT can then be applied to a current or most recent version of the TT as stored in the TT tier to generate an updated version of the TT. The updated version of the entire TT can then be written out to the TT tier, such as replacing the older or oldest persisted version of the TT stored on the TT tier. Thus in at least one embodiment, the TT tier can generally persistently store multiple complete instances of the TT where such persisted instances can denote logically consecutive versions of the TT. In at least one embodiment as discussed in more detail herein, the most recent two versions of the TT can be persisted to the TT tier. However more generally any suitable number of complete copies of versions of the TT can be stored in the TT tier. In at least one embodiment, the updated version of the TT can be written sequentially and stored to a new location in the TT tier, thereby replacing the oldest persistent TT version of the TT tier.

In at least one embodiment, each instance of the TT can be relatively small in size which is the reason why the entire TT can be written out each time there is a set of updates or changes applied to the TT without adversely impacting performance of the system.

In at least one embodiment, the most current version of the entire TT can be stored in volatile memory such as in cache. The most current version of the TT can include the most recent persisted version of the TT stored in the TT tier with all TT updates of the TT log applied. In the event of a system failure or other event such as a reboot causing loss of the in-memory or cached copy of the most current version of the TT, the most current version of the TT can be restored as a result of reapplying the TT updates of the persisted TT log 1110 to the most recent persisted version of the TT stored in the TT tier 1122.

As described elsewhere herein, for example, such as in connection with FIGS. 3, 4, and 5, a first MD page, such as a MD MD page, can include multiple entries where each such entry can include a pointer, address, reference, offset, or index to a MD leaf page. In at least one implementation not in accordance with the techniques of the present disclosure, the foregoing pointer or address of a MD MD page entry can directly reference the MD leaf page, where the pointer or address can be the physical address or location of the MD leaf page as stored on BE non-volatile storage. Thus, if the referenced MD leaf page is stored in a new physical location, the entry of the MD MD page must be updated also to include the new physical location or address.

In contrast to the foregoing in at least one embodiment in accordance with the techniques of the present disclosure, the entry of the MD MD page can generally include a logical address LA of a MD leaf page that is mapped or translated by the MD TT 1204 to the physical storage location or address PA of the MD leaf page as stored in a PLB of the MD log structure of the MD tier. More generally in at least one embodiment in accordance with the techniques of the present disclosure, MD page entries can reference other MD and VLB pages by their logical addresses rather than physical addresses. For example, a MD MID page entry can reference a MD leaf page using the MD leaf page's logical address that can then be mapped or translated, such as using a MD TT, to the physical address of the MD leaf page.

When updates to a MD page are flushed from the MD log, such updates can be applied to a current version V1 of the MD page as persistently stored in the MD log structure to generate an updated version V2 of the MD page. In accordance with an LSS, the updated version V2 of the MD page can then be persistently stored as the most recent copy of the MD page of the MD log structure, where the updated version V2 of the MD page can be stored at a new physical storage location or address that is different from the existing physical storage location or address of V1 of the MD page. Thus, as a MD page is updated and then persistently stored as part of flushing or destaging the MD log, the physical storage location or address of the MD page will change and the changed physical storage location or address can be noted in the appropriate TT, such as the MD TT for top, mid and leaf MD pages and similarly in the VLB TT for VLB pages. In at least one embodiment, the logical addresses of the MD pages and the VLB pages can remain the same even though the physical storage locations or addresses of such MD pages as stored in the MD log structure can change.

In at least one embodiment, at least some of the entries of the MD TT and VLB TT can be stored in memory such as volatile cache memory. Consistent with other discussion herein, version V1 of a MD page leaf1 can be stored on the BE non-volatile storage at a physical or address or location PA1. Subsequently, flushing updates from the MD log that update MD page leaf1 from version V1 to version V2 result in storing MD page leaf1 V2 at a new current physical address or location PA3, and also trigger a corresponding update U12 to the MD TT, where U12 is added to the TT log. U12 can identify, for example, that update or change to the TT entry corresponding to MD page leaf1 to identify PA3 (rather than PA1) as the current physical storage location or address for MD page leaf1.

Figure 10:
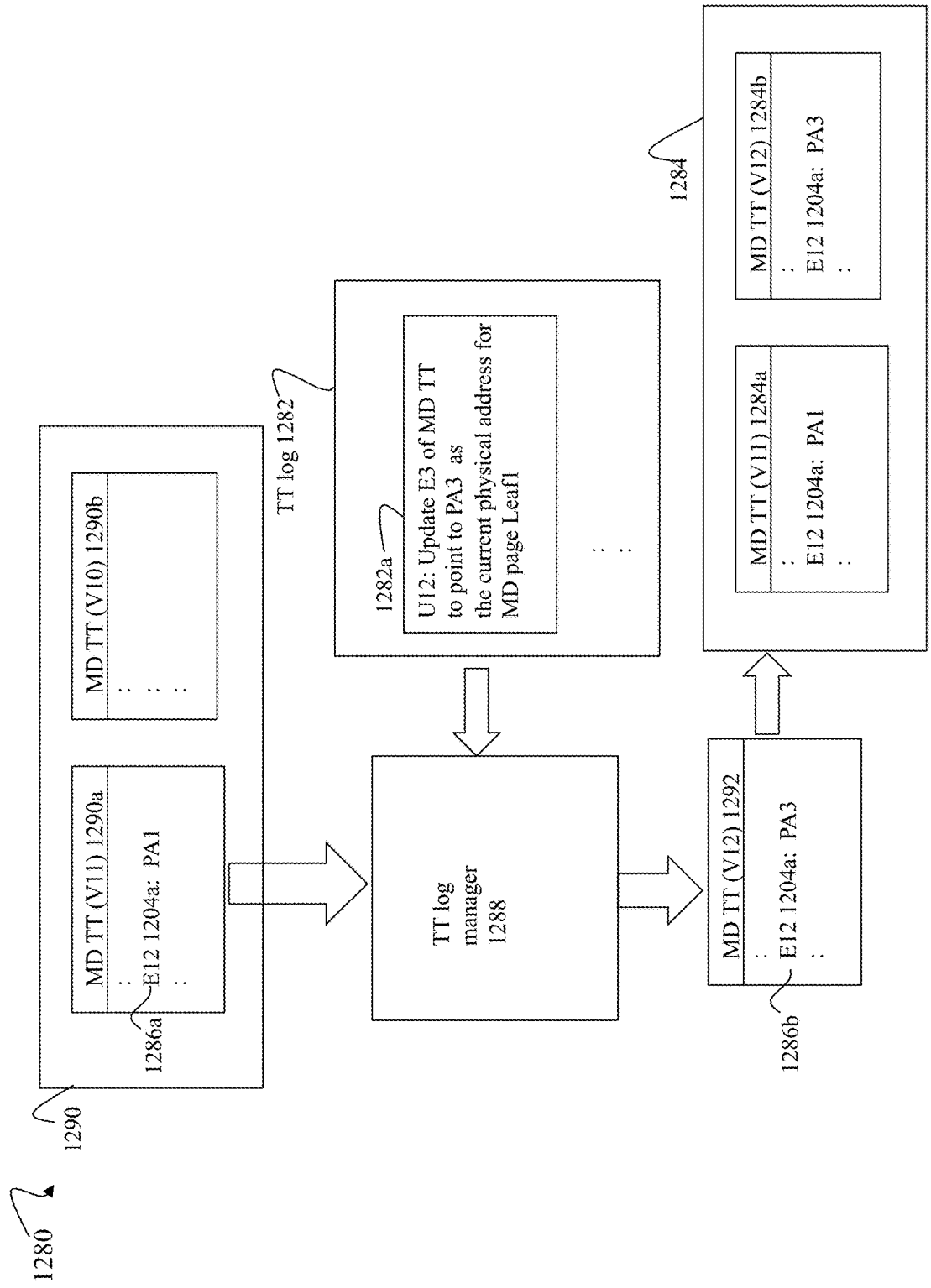

Referring to FIG. 10, shown is an example 1280 illustrating in further detail use of the TT log in connection with the foregoing update U12 for the MD TT in at least one embodiment.

As illustrated in the example 1280 of FIG. 10, an update U12 for the entry E12 1204a identifying PA3 as the current physical address or location of current version of the MD page Leaf1 can be recorded in the TT log. At a later point in time, U12 can be flushed from the TT log and applied to the most recent persistent copy of the MD TT.

To further illustrate the foregoing, reference is made to the example 1280 that includes element 1290 representing the two most recently persistently stored copies 1290a-b of the MD TT. In particular, element 1290a denotes the most recent persisted version V11 of the MD TT and element 1290b denotes the older persisted version V10 of the MD TT. In at least one embodiment, management of the persisted versions of the TTs, including the VLB TT and the MD TT, can be performed by a TT log manager component 1288.

At various points in time and responsive to the occurrence of one or more trigger conditions, the TT log manager 1288 can apply updates from the TT log 1282 to the most recent persisted copies of the VLB TT and MD TT to generate updated versions of the VLB TT and MD TT, where such updated versions can replace the older/oldest persisted copies of the VLB TT and MD TT. The example 1280 illustrates application of MD TT updates but similar processing can be performed in connection with application of VLB TT updates as also discussed elsewhere herein in more detail.

The TT log manager 1288 can receive inputs including the most recent persisted version of the MD TT, MD TT V11 1290a, and updates from the TT log 1282. The updates of the TT log 1282 can include update U12 1282a. In at least one embodiment, the update U12 1282a can be recorded as an entry in the TT log 1282 in a manner similar to that as described herein in connection with the MD log (e.g., as in connection with FIG. 6 elsewhere herein). The TT log manager can apply the update U12 1282a to the entry E12 1204a of the MD TT (V11) 1290a to generate an updated MD TT (V12) 1292. In this example, V11 of the entry E12 1286a of 1290a is updated to V12 of the entry E12 1286b of 1292. In particular, the MD TT (V12) 1292 can correspond to the in-memory version of 1204 of the example 1250. The MD TT (V12) 1292 can be persistently stored and can replace the older/oldest version V10 1290b. Element 1284 includes the two most recent versions V11 and V12 1284a-b of the MD TT as persistently stored in the MD tier by the TT log manager.

In the example 1280, 1290 denotes the two persisted versions 1290a-b of the MD TT before the TT log manager applied the above-noted updates and 1284 denotes the two persistent versions 1284a-b of the MD TT after the TT log manager applied the above-noted updates. As can be observed by comparing 1290 and 1284, the oldest version V10 1290b of 1290 is replaced with the updated version V12 1284b, and element 1290a and 1284a correspond to the same version V11 of the MD TT not replaced in connection with applying the updates of the TT log 1282.

Although only a single update is illustrated in connection with the example 1280, more generally, the TT log 1282 can be flushed or destaged where multiple updates of the TT log 1282 can be applied to both the most recently persistent version of the VLB TT and the MD TT.

Consistent with discussion herein in at least one embodiment, element 1292 can denote an updated version of the MD TT that can correspond to the current in-memory version of the MD TT, such as can be stored in a volatile memory cache. More generally in at least one embodiment, at any point in time, the current most up to date version of the MD TT can be constructed by reading the most recent persisted version of the MD TT from the MD tier and applying the MD TT updates of the TT log; and the current most up to date version of the VLB TT can be constructed by reading the most recent persisted version of the VLB TT from the MD tier and applying the VLB TT updates of the TT log.

The foregoing use of TTs, such as the MD TT for mapping logical addresses of top mid and leaf MD pages to corresponding current physical storage addresses or locations of such pages, can be generalized and applied for use in connection with any other type of suitable metadata such as VLB pages. Consistent with other discussion herein in at least one embodiment, VLBs can have their own logical address space, VLBAS, as well as corresponding VLB TT and VLBPS of the MD tier.

In at least one embodiment, the MD tier can be a parity protected tier that supports log structure writes. In at least one embodiment, the MD tier can include BE non-volatile PDs configured into RAID 5 or RAID 6 groups of PDs. In at least one embodiment, content can be stored in the persistent MD tier in PLBs where pages of metadata can be grouped and written into PLB structures that are, for example, each 2 MBs in size. As metadata is updated, the updated version of the metadata can be stored in a new location thereby producing holes of invalid or unused storage portions in the PLBs storing the old or prior metadata version. In at least one embodiment, the overall utilization of storage in each PLB storing valid content can be tracked and used for garbage collection to compact PLBs (e.g., copy valid content from multiple partially filled source PLBs to a single target PLB to thereby free the multiple source PLBs).

In at least one embodiment, metadata can be compressed as it is persistently stored. In at least one embodiment, a single MD tier can generally include all metadata physical storage (e.g., include MDPS as well as VLBPS). However in at least one embodiment, storage within the MD tier can be segregated by type at the PLB or other suitable storage unit level. For example, the MD tier can include the first group of metadata pages of types top, mid and leaf MD pages, where pages of the first group can be persistently stored in a first portion of the MD tier sometimes referred to herein as the MDPS. The MD tier can also include the second group of metadata pages of type VLB where pages of the second group can be persistently stored in a second portion of the MD tier sometimes referred to herein as the VLBPS.

Figure 11:
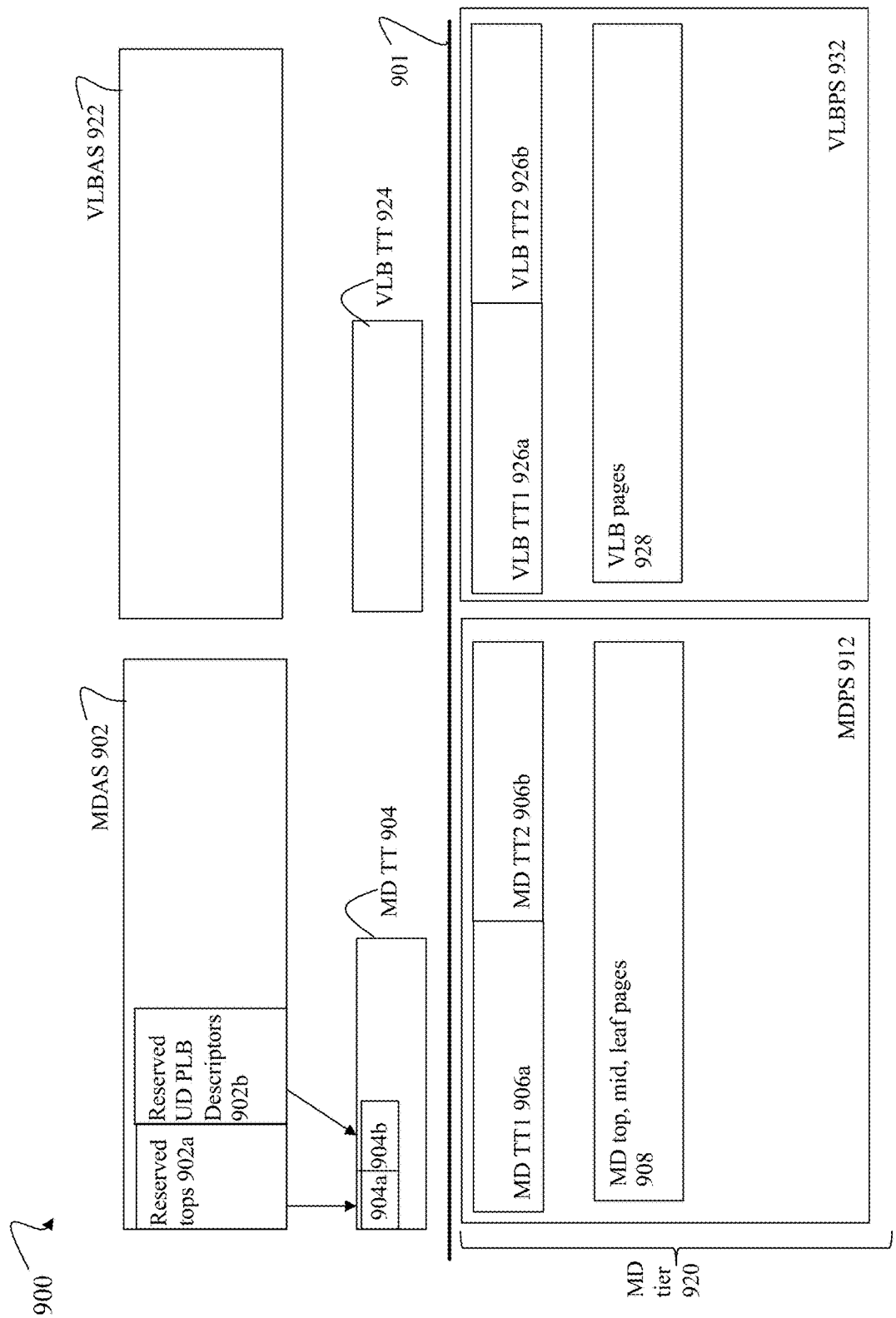
FIG. 11 is an example illustrating various logical and physical address spaces in at least one embodiment in accordance with the techniques of the present disclosure.

Referring to FIG. 11, shown is an example 900 illustrating the various in-memory logical address spaces and physical storage spaces in at least one embodiment in accordance with the techniques of the present disclosure.

The example 900 includes line 901 where components above the line 901 can denote the logical in-memory representations and where components below the line 901 can denote corresponding physical storage areas of the MD tier 920.

The in-memory logical representations can include the MDAS 902, MD TT 904, VLBs 922 and VLB TT 924.

In at least one embodiment consistent with other discussion herein, the mapping information of metadata pages can be partitioned into a first portion or group of metadata types including MD top, mid and leaf pages; and a second portion of a single metadata type including VLB pages. Generally although both VLB pages and MD top, mid and leaf pages can be considered metadata, in the example 900, the MDAS 902 and its associated MD TT 904 can represent logical in-memory representations related to the first group of MD pages; and the VLBAS 922 and its associated VLBTT 924 can represent logical in-memory representations related to the second group of VLB pages.

In at least one embodiment, other types of MD pages than those discussed specifically herein can used by other services and can be included generally in the MD tier 920. For example in at least one embodiment another type of MD page can be used to track free MD pages such as within the MD tier. In at least one embodiment, other supported types of MD than those specifically discussed herein can be included in the MDPS 912 and can be mapped or translated by the MD TT 904.

The MD tier 920 can include the MDPS 912 and the VLBPS 932. The MDPS 912 can include MD TT1 906*a*, MD TT2 906*b*, and top, mid and leaf MD pages 908 of the MD log structure 1114. The MD pages 908 can be stored in accordance with a log-based structure as described elsewhere herein in connection with the MD log structure 1114 of the example 1100. The VLBPS 932 can include the VLB TT1 926*a*, VLB TT2 926*b* and VLB pages 928 of the MD log structure 1114 of the example 1100. The VLB pages 928 can be stored in accordance with a log-based structure as described elsewhere herein in connection with the MD log structure 1114 of the example 1100.

Elements 906*a-b* can denote the two physical storage areas storing the most recently persisted two instances of MDTTs included in the MD tier 920. To illustrate, at a first point in time T11, MD TT1 906*a* can denote a first version V1 of a persisted MD TT and MD TT2 906*b* can denote a second version V2 of a persisted MD TT, where V2 can denote a more recent version than V1. At a second point in time T2 subsequent to T1, accumulated updates of the MD TT can be flushed from the TT log 1110 and applied to the most recent persisted version V2 of MD TT 906*b* to generate MD TT V3, where MD TT V3 can then replace the oldest/older persisted version V1 of 906*a*. At a third point in time T3 subsequent to T2, accumulated updates of the MD TT can again be flushed from the TT log 1110 and applied to the most recent persisted version V3 of MD TT 906*a* to generate MD TT V4, where MD TT V4 can then replace the current oldest/older persisted version V2 of 906*b*. Thus, at each of the foregoing points in time T2 and T3, the most persisted version can serve as a "source" to which flushed MD TT updates of the TT log are applied to generate a further updated version of the MD TT that is then stored at a "target" or "destination" physical storage location replacing the oldest/older persisted version of the MD TT. At consecutive points in time when MD TT updates are flushed and applied as noted above, the roles of "source" and "target" with respect to the physical storage locations of 906*a-b* can switch.

Elements 926*a-b* can denote the two physical storage areas storing the most recently persisted two instances of VLBTTs included in the MD tier 920. To illustrate, at a first point in time T11, VLB TT1 926*a* can denote a first version V1 of a persisted VLB TT and VLB TT2 926*b* can denote a second version V2 of a persisted MD VLB, where V2 can denote a more recent version than V1. At a second point in time T2 subsequent to T1, accumulated updates of the VLB TT can be flushed from the TT log 1110 and applied to the most recent persisted version V2 of VLB TT 926*b* to generate VLB TT V3, where VLB TT V3 can then replace the oldest/older persisted version V1 of 926*a*. At a third point in time T3 subsequent to T2, accumulated updates of the VLB TT can again be flushed from the TT log 1110 and applied to the most recent persisted version V3 of VLB TT 926*a* to generate VLB TT V4, where VLB TT V4 can then replace the current oldest/older persisted version V2 of 926*b*. Thus, at each of the foregoing points in time T2 and T3, the most persisted version can serve as a "source" to which flushed VLB TT updates of the TT log are applied to generate a further updated version of the VLB TT that is then stored at a "target" or "destination" physical storage location replacing the oldest/older persisted version of the VLB TT. At consecutive points in time when VLB TT updates are flushed and applied as noted above, the roles of "source" and "target" with respect to the physical storage locations of 926*a-b* can switch.

In at least one embodiment, the elements 902, 904, and 906*a-b* can grow, or generally vary, with the number of pages in 908; and the elements 922, 924 and 926*a*0*b* can grow, or generally vary, with the number of pages in 928.

In at least one embodiment, the MD top, mid, leaf pages 908 and VLB pages 928 can be stored in a single log structure as denoted by the MD log structure 1114 (e.g., the example 1100 of FIG. 9) where metadata can be stored in PLBs by the various metadata types. For example in at least one embodiment, pages of the metadata types top, mid and leaf 908 can be stored in the same PLB but not with VLB pages; and VLB pages 928 can be stored in the same PLB but not with pages of types top, mid and leaf. Such segregation at the PLB level can vary with embodiment based, at least in part, on the types of metadata, associated uses, expected frequency of updates, and the like.

In at least one embodiment, a portion of the MD TT 904 can be statically allocated and reserved for well-known metadata addresses such as reserved MD top pages and reserved UD PLB descriptors. Element 902*a* can denote the logical addresses of the reserved MD top pages that are mapped by corresponding entries 904*a* of the MD TT 904. Element 902*b* can denote the logical addresses of reserved UD PLB descriptors that are mapped by corresponding entries 904*b* of the MD TT 904. In at least one embodiment, each PLB of UD (e.g., such as included in the UD log structure 1108 of FIG. 9) can have an associated PLB descriptor with a corresponding MDAS logical address where the PLB descriptor can be included in the MD tier 920 (e.g., MDPS 912).

It should be noted that the example 900 and related discussion herein generally illustrates an embodiment including two address spaces, the MDAS 902 and the VLBAS 922, along with two types of TTs, the MD TT and the VLB TT. More generally, depending on the types of metadata, an embodiment in accordance with the techniques of the present disclosure can also include one or more additional address spaces and corresponding TTs both associated, respectively, with one or more additional types of metadata that can be included in an embodiment.

Figure 12A:
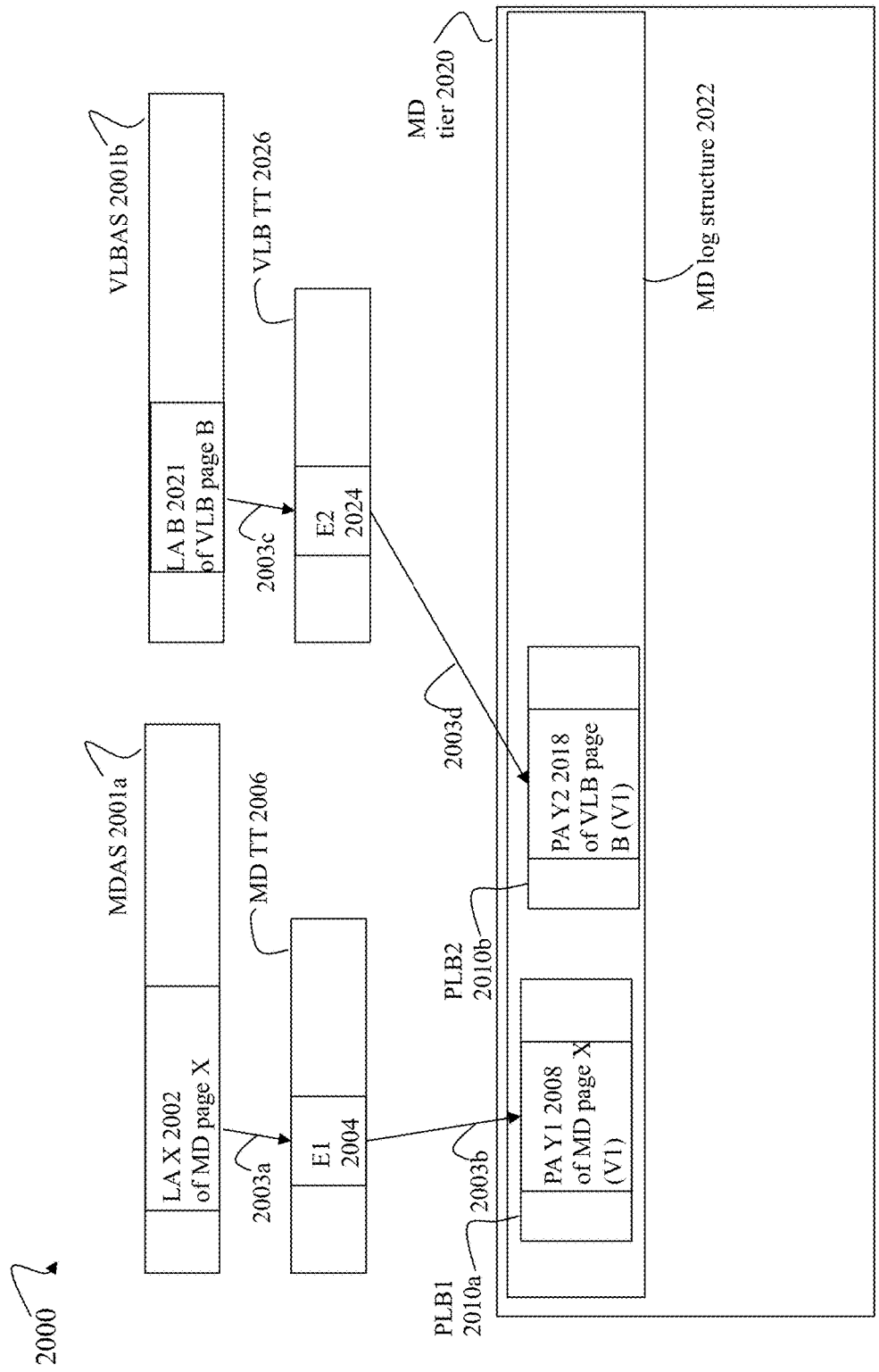
Figure 12B:
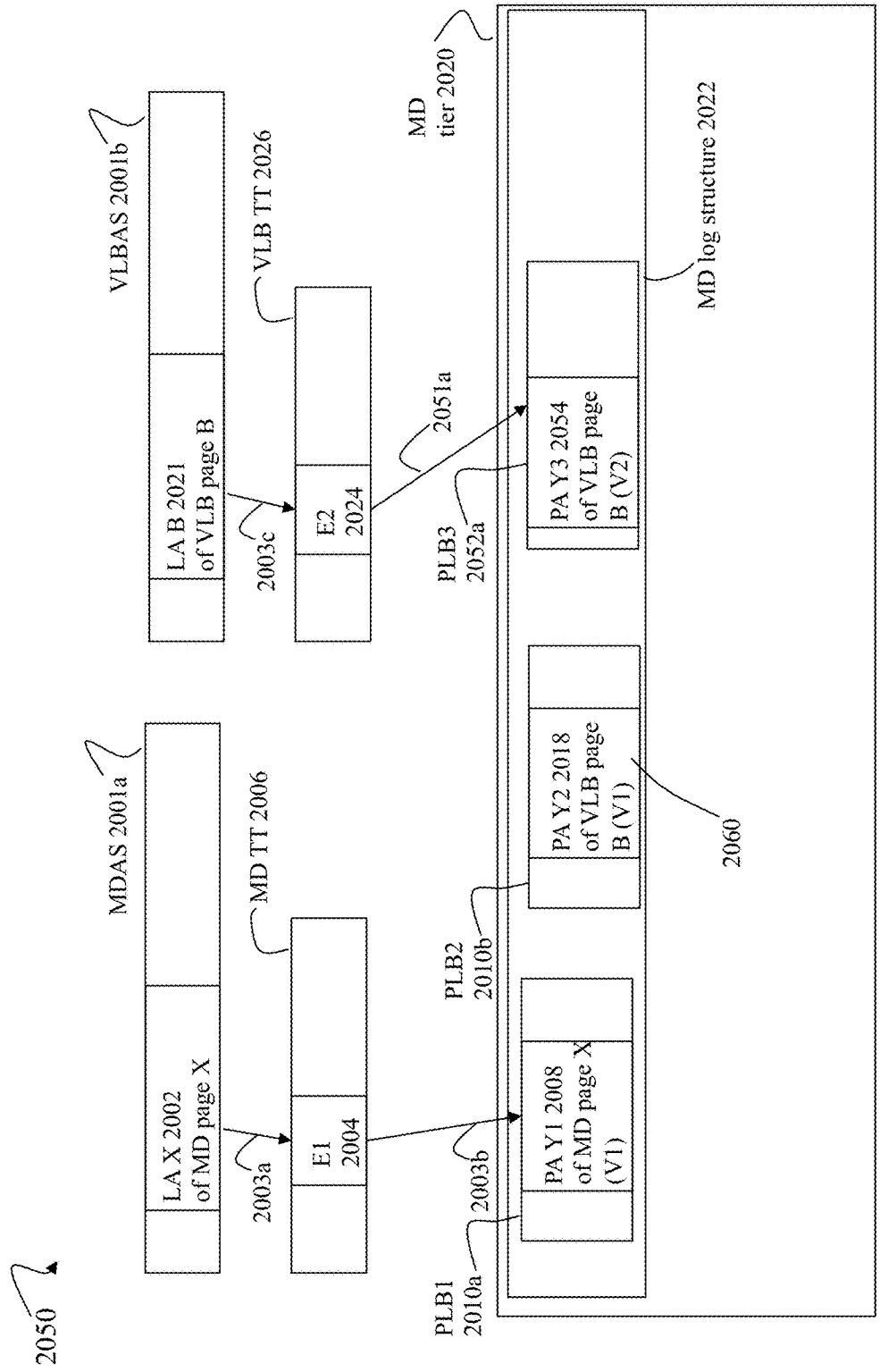

Referring to FIGS. 12A and 12B, shown are examples illustrating in more detail use of the MD TT and VLB TT in at least one embodiment in accordance with the techniques of the present disclosure.

FIG. 12A is an example 2000 that illustrates the state of structures and storage of the system at a first point in time T1; and FIG. 12B is an example 2050 that illustrates the state of the structures and storage of the system at a second point in time T2 subsequent to T1.

With reference to FIG. 12A, the example 2000 includes MDAS 2001*a*, MD TT 2006, VLBAS 2001*b* and VLB TT 2026. Elements 2001*a-b* denote the logical address spaces that are mapped, respectively, by the TTs 2006, 2026, to corresponding physical storage addresses or locations in the MD log structures 2022 of the MD tier 2020.

Consistent with other discussion herein, the TTs 2006, 2026 can be characterized as providing a layer of indirection between logical addresses, respectively, of 2001*a-b* and corresponding physical addresses or locations stored in the MD log structure 2022 of the MD tier 2020.

In the example 2000, the MDAS 2001*a* can include logical address LA X 2002 of MD page X that is mapped (2003*a*) to a corresponding entry E1 2004 of MD TT 2006 that is further mapped (2003*b*) to a corresponding current physical address or location PA Y1 2008 currently storing V1 of MD page X. PA Y1 2008 can be included in PLB 2010*a* of the MD log structure 2022.

In the example 2000, the VLBAS 2001*b* can include logical address LA B 2021 of VLB page B that is mapped (2003*c*) to a corresponding entry E2 2024 of VLB TT 2026 that is further mapped (2003*d*) to a corresponding current physical address or location PA Y2 2018 currently storing V1 of VLB page B. PA Y2 2018 can be included in PLB 2010*b* of the MD log structure 2022.

In at least one embodiment, the VLB TT 2026 can denote the in-memory current version of the VLB TT at time T1 that can represent a combination of the VLB TT updates as currently stored in the TT log and applied to the most recent persisted copy or version of the VLB TT of the MD tier.

At the second point in time T2 subsequent to T1, updates to VLB page B can be flushed from the MD log and applied to the current persistently stored version V1 of VLB page B as stored at PA Y2 2018 of PLB 2 2010*b* to generate an updated version, VLB page B V2. As illustrated in the example 2050 of FIG. 12B, the VLB page B V2 can be stored at a new physical address or location PA Y3 2054 of the PLB3 2052*a* of the MD log structure 2022. Accordingly, the entry E2 2024 of the VLB TT 2026 can be updated to now point or reference (2051*a*) the new physical address or location PA Y3 2054 (rather than point to or reference PA Y2 2018).

Figure 13:
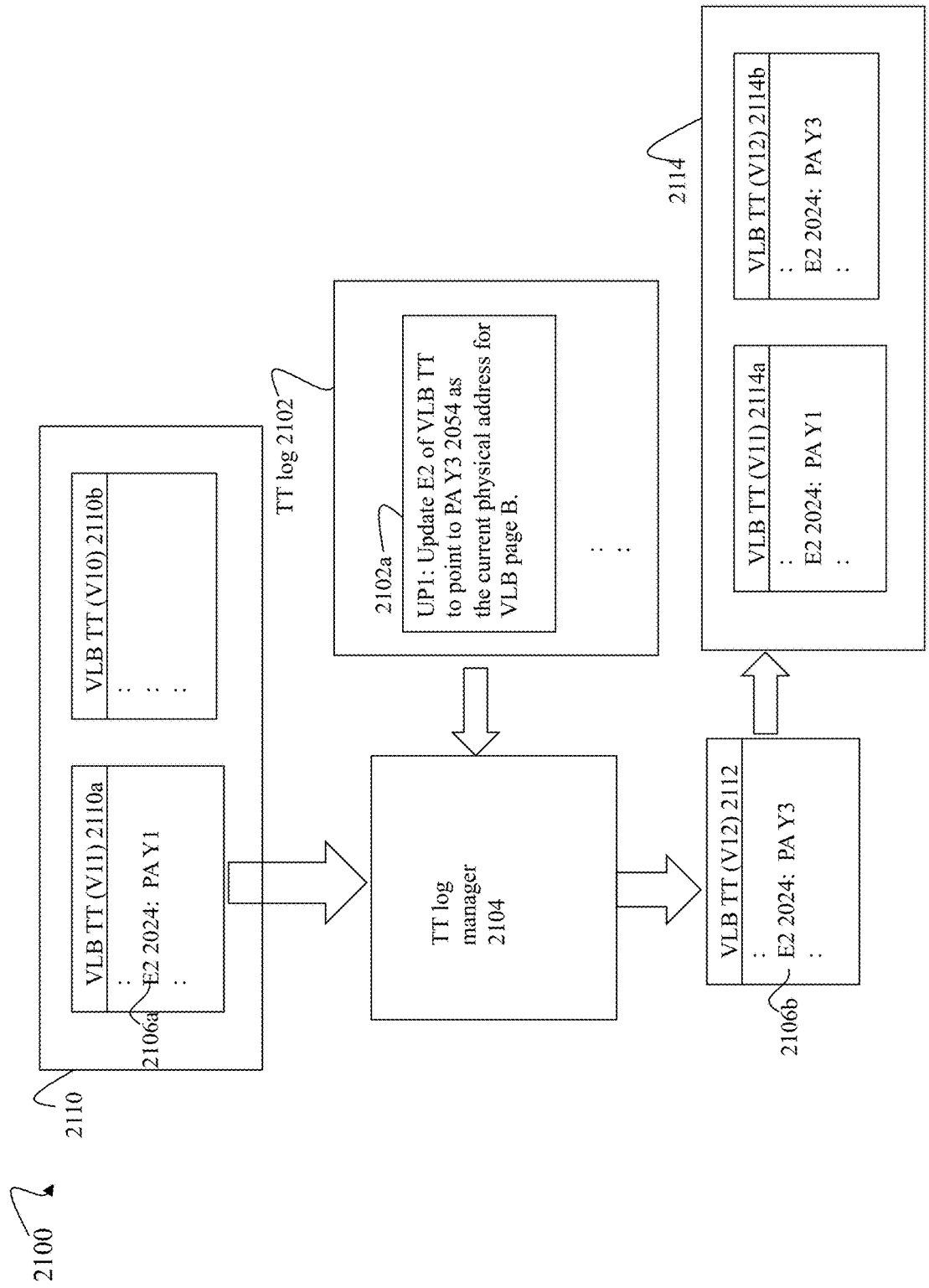

Additionally at the second point in time T2 as illustrated in the example 2100 of FIG. 13, an update UP1 for the entry E2 2024 identifying PA Y3 2054 as the current physical address or location of current VLB page B V2 can be recorded in the TT log. At a later point in time T3 subsequent to T2, UP1 can be flushed from the TT log and applied to the most recent persistent copy of the VLB TT.

To further illustrate the foregoing, reference is made to the example 2100 that includes element 2110 representing the two most recently persistently stored copies 2110*a-b* of the VLB TT. In particular, element 2110*a* denotes the most recent persisted version V11 of the VLB TT and element 2110*b* denotes the older persisted version V10 of the VLB TT. In at least one embodiment, management of the persisted versions of the TTs, including the VLB TT and the MD TT, can be performed by a TT log manager component 2104. At various points in time and responsive to the occurrence of one or more trigger conditions, the TT log manager 2104 can apply updates from the TT log to the most recent persisted copies of the VLB TT and MD TT to generate updated versions of the VLB TT and MD TT, where such updated versions can replace the older/oldest persisted copies of the VLB TT and MD TT. The example 2100 illustrates application of VLB TT updates but similar processing can be performed in connection with application of MD TT updates.

The TT log manager 2104 can receive inputs including the most recent persisted version of the VLB TT, VLB TT V11 2110*a*, and updates from the TT log 2102. The updates of the TT log 2102 can include update UP1 2102*a*. In at least one embodiment, the update UP1 2102*a* can be recorded as an entry in the TT log 2102 in a manner similar to that as described herein in connection with the MD log (e.g., as in connection with FIG. 6 elsewhere herein). The TT log manager 2104 can apply the update UP1 2102*a* to the entry E2 2106*a* of the VLB TT (V11) 2110*a* to generate an updated VLB TT (V12) 2112. In this example, V11 of the entry E2 2106*a* of 2110*a* is updated to V12 of the entry E2 2106*b* of 2112. In particular, the VLB TT (V12) 2112 can correspond to the in-memory version of 2026 of the example 2050. The VLB TT (V12) 2112 can be persistently stored and can replace the older/oldest version V10 2110*b*. Element 2114 includes the two most recent versions V11 and V12 2114*a-b* of the VLB TT as persistently stored in the MD tier by the TT log manager.

In the example 2100, 2110 denotes the two persisted versions 2110*a-b* of the VLB TT before the TT log manager applied the above-noted updates and 2114 denotes the two persistent versions 2114*a-b* of the VLB TT after the TT log manager applied the above-noted updates. As can be observed by comparing 2110 with 2114, the oldest version V10 2110*b* of 2110 is replaced with the updated version V12 2114*b*, and element 2110*a* and 2114*a* correspond to the same version V11 of the VLB TT not replaced in connection with applying the updates of the TT log 2102.

Although only a single update is illustrated in connection with the example 2100, more generally, the TT log 2102 can be flushed or destaged where multiple updates of the TT log 2102 can be applied to both the most recently persistent version of the VLB TT and the MD TT.

Consistent with discussion herein in at least one embodiment, element 2112 can denote an updated version of the VLB TT that can correspond to the current in-memory version of the VLB TT, such as can be stored in a volatile memory cache (e.g., TxCache 1106). More generally in at least one embodiment, at any point in time, the current most up to date version of the VLB TT can be constructed by reading the most recent persisted version of the VLB TT from the MD tier and applying the VLB TT updates of the TT log; and the current most up to date version of the MD TT can be constructed by reading the most recent persisted version of the MD TT from the MD tier and applying the MD TT updates of the TT log.

Consistent with discussion above, and with reference back to FIG. 6, in the following paragraphs the non-volatile metadata log 510 or the persisted metadata log or journal may also sometimes be referred to as an RDL or raw persisted or non-volatile MD data log; and a single bucket set, such as each of 502 and 504, of the volatile in-memory metadata log, may also be referred to an HBSB (hash-based sorted buckets). Thus, consistent with discussion above such as with reference back to FIG. 6, each node can have an active HBSB, such as bucket set 502, and an inactive or destaging HBSB, such as bucket set 504. A pair of HBSBs including an active bucket set and an inactive or destaging bucket set, may in some contexts also be referred to collectively as the in-memory or volatile memory MD logs or instances. Thus, as shown in FIG. 6, a storage node can write copies of delta updates as tuples to both the active in-memory MD log and also the RDL. The RDL can persistently store the respective tuples, deltas or MD updates in a time order sequence such as from older to newest. In contrast, MD updates, deltas or tuples stored in an in-memory MD log local to a storage node can be organized in a different manner to facilitate efficient and quick retrieval organized in hash buckets as discussed elsewhere herein. Within an HBSB, each hash bucket including MD updates for a single corresponding MD page, the MD updates, deltas or tuples can be organized in a time order sequence based on when the MD updates are received at the storage node.

Figure 14:
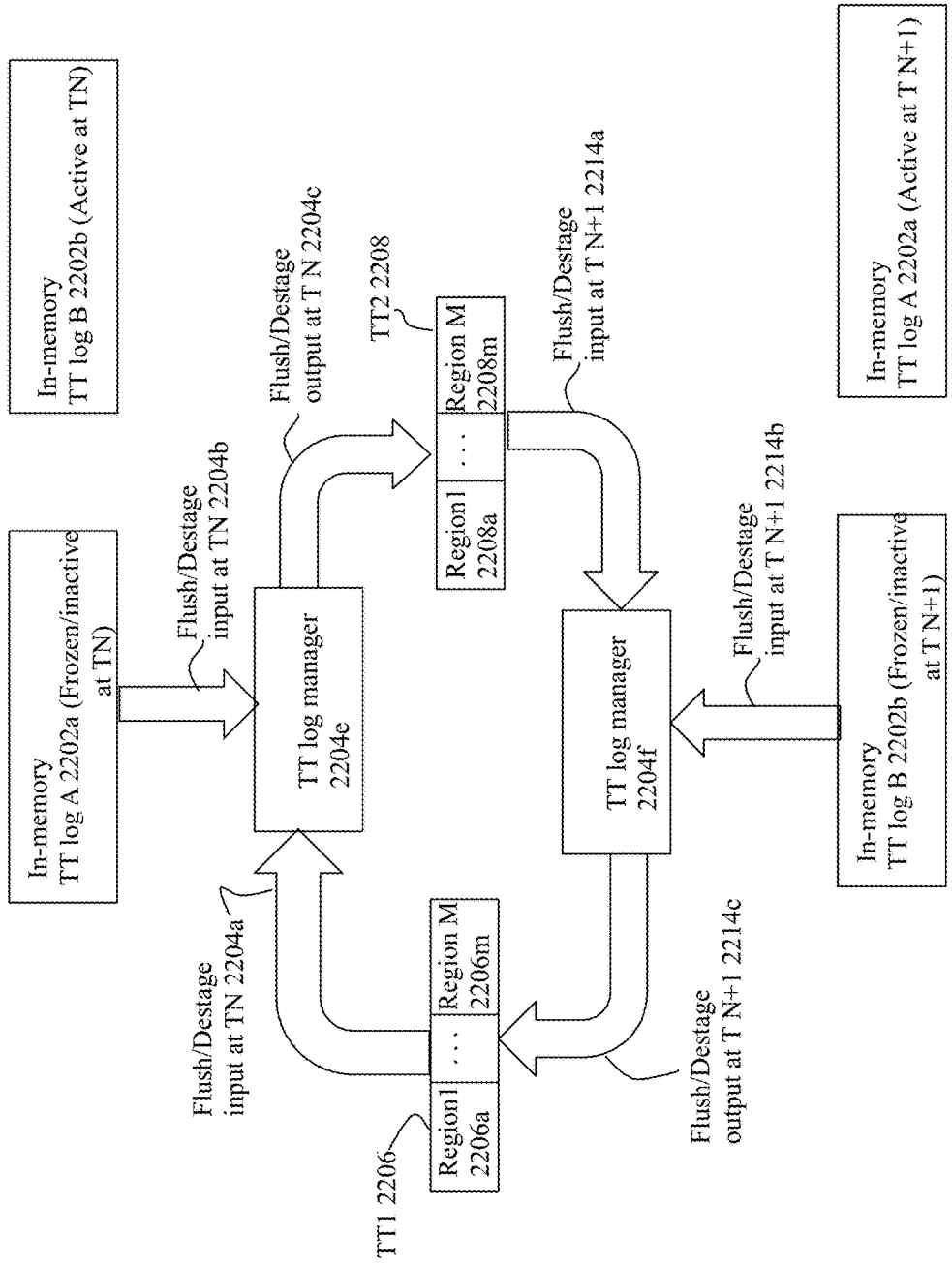

Referring to FIG. 14, shown is an example 2200 illustrating in more detail management, layout and destaging or flushing in connection with TT logs in at least one embodiment in accordance with the techniques of the present disclosure.

In at least one embodiment, TT logs can be stored both in-memory (e.g., in a volatile memory cache such as in the form of HBSBs) and on persistent non-volatile storage (e.g., NVRAM such as an RDL). In at least one embodiment, two instances of the in-memory TT log (e.g., active and frozen or inactive HBSBs) can be used in a manner similar to that as described elsewhere in connection with the MD log such as, for example, in connection with FIG. 6. The TTs 2206, 2208 in the example 2200 can generally denote the persisted two TTs that can refer to two versions of VLB TTs or two versions of MD TTs.

The example 2200 includes in-memory TT logs 2202a-b that can be used in connection with destaging or flushing. At any point in time, a first of the TT logs 2202a-b can be frozen or inactive and the other remaining one can be active, where entries of the frozen TT log instance can be in the process of being flushed or destaged and where TT updates are recorded in the active TT log instance (but not the frozen instance).

The example 2200 also includes two persisted instances of two versions of the TT 2206, 2208. At a point in time N when the TT log 2202a is flushed or destaged, TT1 2206 can denote the most recent persisted version with respect to 2206 and 2208, and TT2 2208 can denote the oldest persisted version with respect to 2206 and 2208.

In the example 2200, TT log manager 2204e and TT log manager 2204f can both denote the same instance of the TT log manager but at two different respective points in time, N and N+1, discussed below. In particular, TT log manager 2204c can denote the TT log manager described below in connection with processing performed when flushing the currently frozen instance of TT logs 2202a at time N; and TT log manager 2204f can denote the TT log manager described below in connection with processing performed when flushing the current frozen instance of TT log 2202b at time N+1.

At the point in time N, the TT log manager 2204e can receive as a first input 2214a the current most recent persisted version TT1 2206 and as a second input 2204b updates as stored in the frozen TT log A 2202a. As an output 2204c at time N, the TT log manager 2204e can generate an updated version of the TT that is stored at the target location 2208. At time N, TT updates can be recorded in the active TT log B 2202b while the frozen TT log A 2202a is being flushed or destaged. In at least one embodiment, the TT log manager 2204c can process TT updates recorded in frozen TT log A 2202a in a sequential consecutive region by region basis. In at least one embodiment, the TT1 2206 can be partitioned into logically sequentially consecutively stored regions 1-M. Each of the foregoing M regions of 2206 can include a particular sequential consecutively stored portion of mapping entries used for mapping corresponding metadata pages. During flushing or destaging of the frozen TT log A 2202a at time N in at least one embodiment, the TT log manager 2204e can process updates of the TT log 2202a related to mapping entries of region 1 by reading the current persistently stored version of region 1 2206a, applying the relevant updates of the frozen TT log A 2202a to mapping entries of region 1 2206a to generate an updated version of region 1, and then outputting or writing the updated version of region 1 to a corresponding target location 2208a. In a similar manner, subsequently sequential regions of 2206 can be processed consecutively in accordance with their logically consecutive ordering within TT 2206. In at least one embodiment, the updated regions 1-M can be written out in sequential consecutive logical order to their respective corresponding target regions 2208a-M.

At a point in time N+1 subsequent to time N, the roles of the in-memory TT logs 2202a-b can be switched where the in-memory TT log A 2202a transitions from frozen to active; and the in-memory TT log B 2202b transitions from active to frozen or inactive.

In at least one embodiment, such switching of roles between active and frozen or inactive TT log instances can occur in response to any one of a defined number of trigger conditions that can include a time-based trigger and/or a fullness trigger. For example in at least one embodiment, transitioning a TT log from the active to frozen state can occur when the active TT log reaches a specified threshold level of fullness such as when the active TT log includes a threshold number of entries or updates. In at least one embodiment, transitioning a TT log from active to frozen can occur after a maximum amount of time has elapsed since the particular TT log instance has been active. Put another way, the foregoing maximum amount of time can be a time-based trigger ensuring that each active TT log does not accumulate updates for more than the maximum amount of time without being flushed or destaged.

More generally, in at least one embodiment, any log discussed herein (e.g., MD log, TT log, and/or NBT (new boot tier) log discussed elsewhere herein) can use any suitable ones of time-based triggers, fullness-based triggers and/or a threshold number of logged updates/changes to trigger flushing a particular log.

In the example 2200 at the time N+1, the in-memory TT log B 2202b is now the frozen or inactive instance being flushed, and the in-memory TT log A 2202a is now the active instance to which TT updates are recorded. At time N+1, the TT version stored in 2208 is now considered the most recent persisted TT version with respect to 2206 and 2208; and the TT version stored in 2206 is now considered the older/oldest TT version with respect to 2206 and 2208.

At the time N+1, the TT log manager 2204f can receive as a first input 2214a the current most recent persisted version TT2 2208 and as a second input 2214b updates as stored in the frozen TT log B 2202b. As an output 2214c at time N+1, the TT log manager 2204f can generate an updated version of the TT that is stored at the target location 2206 thereby replacing the current oldest/older persisted TT version 2206. At time N+1, TT updates can be recorded in the active TT log A 2202a while the frozen TT log B 2202b is being flushed or destaged. In at least one embodiment, the TT log manager 2204f can process TT updates recorded in frozen TT log B 2202b in a sequential consecutive region by region basis as discussed above in connection with time N with respect to 2206.

In at least one embodiment, the TT 2208 can be partitioned into logically sequentially consecutively stored regions 1-M. Each of the foregoing M regions of 2208 can include a particular sequential consecutively stored portion of mapping entries used for mapping corresponding metadata pages. During flushing or destaging of the frozen TT log B 2202b at time N+1 in at least one embodiment, the TT log manager 2204f can process updates of the TT log 2202b related to mapping entries of region 1 by reading the current persistently stored version of region 1 2208a, applying the relevant updates of the frozen TT log B 2202b to mapping entries of region 1 2208a to generate an updated version of region 1, and then outputting or writing the updated version of region 1 to a corresponding target location 2206a. In a similar manner, subsequently sequential regions of 2208 can be processed consecutively in accordance with their logically consecutive ordering within TT 2208.

In at least one embodiment, the updated regions 1-M can be written out in sequential consecutive logical order to their respective corresponding target regions 2206a-M.

In at least one embodiment, when an updated version of a TT replaces the older/oldest persisted version of the TT in the MD tier, storage currently allocated for the replaced older/oldest persisted version of the TT can be unmapped and thus deallocated. When storing the updated version of the TT in at least one embodiment, storage can be allocated and mapped. In this manner in at least one embodiment, the updated version of the TT may not overwrite the same physical storage location of the replaced older/oldest version of the TT to thereby avoid continuously overwriting the same underlying physical storage.

In at least one embodiment consistent with other discussion herein, the VLB TT and the MD TT can each be managed and maintained separately or in the aggregate. The example 2200 generally refers to generic instances of TTs. However in at least one embodiment, the processing and components described in the example 2200 can be performed separately for the VLB TT and MD TT where, for example, the processing of the example 2220 can be performed with respect to the VLB TT (e.g., where each reference to TT can refer to VLB TT) and can also be independently performed with respect to the MD TT (e.g., where each reference to TT can refer to MD TT). As a variation in at least one embodiment, the VLB TT and MD TT can be managed and maintained in the aggregate where the example 2200 processing can be performed with respect to the VLB TT and the MD TT maintained and managed as a single TT.

With reference back to FIGS. 9 and 11 in at least one embodiment, each PLB of UD stored in the UD log structure 1108 can have an associated PLB descriptor that generally describes that particular PLB. The PLB descriptor describing a UD PLB can sometimes be referred to as a UD PLB descriptor. In at least one embodiment, PLB descriptors such as UD PLB descriptors can be characterized as another type of metadata. In at least one embodiment, the UD PLB descriptors can be stored in the MD tier and can have corresponding logical addresses in the MDAS 902. In such an embodiment, changes or updates to UD PLB descriptors can be recorded as entries in the MD log. The UD PLB descriptor updates of the MD log can be flushed or destaged in a manner similar to other recorded MD updates of the MD log. In at least one embodiment, pages of UD PLB descriptors can be stored in the MD tier 920 where such pages can be mapped and translated by corresponding mapping entries of the MD TT 904 to their current corresponding physical storage locations in the MD tier. As with other pages of metadata stored in the MD tier, the pages of UD PLB descriptors can be stored in the MD log structure (e.g., stored in a log-structure manner) such that updates to a UD PLB descriptor can be recorded in the MD log and when flushed, result in an updated UD PLB descriptor written to a new physical location in the MD log structure of the MD tier rather than perform in-place updates.

In at least one embodiment in accordance with the techniques of the present disclosure, each PLB stored in the MD tier can generally be referred to as a MD PLB (e.g., thus different types of metadata such as pages of top, mid and leaf MD pages as well as VLB pages and TTs can be stored in MD PLBs). Each MD PLB of the MD tier can have a corresponding PLB descriptor that can be referred to herein as a MD PLB descriptor. Each PLB descriptor associated with a corresponding PLB can generally describe the corresponding PLB. For example, a PLB descriptor can include information describing the content or data stored in the PLB (e.g., locations and sizes of the various stored content stored in the PLB), indicate when the PLB was most recently updated, include a physical address or location of storage mapped to the PLB, track a reference count of the total number of pages stored in the PLB, and the like.

In at least one embodiment in accordance with the techniques of the present disclosure, it can be desirable and advantageous to store and manage the MD PLB descriptors in accordance with techniques of a LSS. In at least one embodiment, the MD PLB descriptors themselves cannot be included in the MD tier, and changes or updates to such MD PLB descriptors cannot be made using the MD log as used with recording changes to the content stored in PLBs of the MD tier. Put another way, the MD PLB descriptors in at least one embodiment are located external to the MD tier and can have their updates recorded in a different log than the MD log of updates for the MD tier. In at least one embodiment, MD PLB descriptors can be stored in a new boot tier (NBT) with its own associated NBT log, where the NBT tier and NBT log can be separate from, respectively, the MD tier and the MD log.

Figure 15:
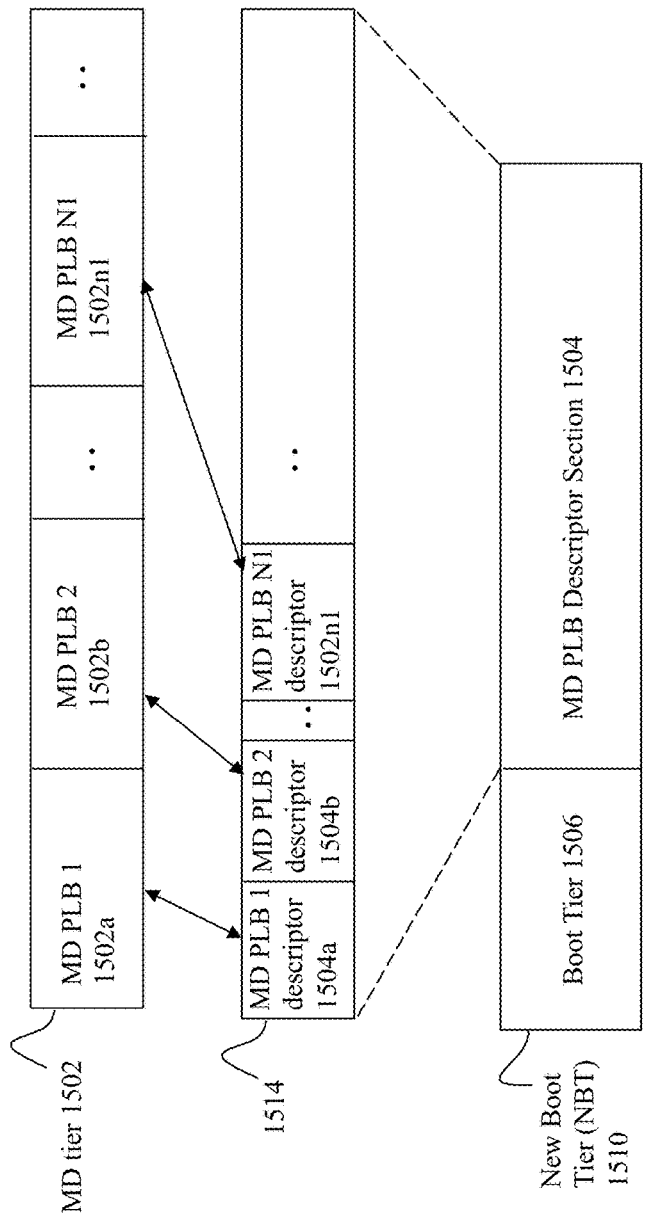

Referring to FIG. 15, shown is an example 1500 illustrating MD PLB descriptors, associated MD PLBs of the MD tier, and the NBT in at least one embodiment in accordance with the techniques of the present disclosure.

The example 1500 includes the MD tier 1502 with MD PLBs 1502a, 1502b, . . . , 1502N1, and so on. Each of the MD PLBs of 1502 can have an associated MD PLB descriptor included in a MD PLB descriptor section 1504. In at least one embodiment, the NBT 1510 of storage can be defined that includes a boot tier 1506 and the MD PLB descriptor section 1504. Element 1514 provides further details regarding the MD PLB descriptor section 1504 that includes MD PLB descriptors 1504a, 1504b, . . . 1504N1, and so on, corresponding respectively to MD PLBs 1502a, 1502b, . . . , 1502N1, and so on, of the MD tier 1502.

The NBT 1510 can be used to manage feature related boot strapping data as well as management of the MD PLB descriptors associated with MD PLBs of the MD tier. The boot tier 1506 can generally include information needed in connection with typical booting and rebooting of the system. For example, the boot tier 1506 can include fixed or well known addresses or locations denoting the starting address from where the boot process loads instructions and/or data to boot the system. The boot tier 1506 can include, for example, a copy of the operating system or otherwise a location of where the operating system can be loaded from at boot time. In at least one embodiment, the boot tier 1506 can identify locations where the TTs and metadata pages of various types are located. For example with reference to FIG. 11, the boot tier 1506 can identify locations of the TTs 906a-b, 926a-b, the MD top, mid and leaf pages 908, and the VLB pages 928 within the MD tier.

In at least one embodiment, the boot tier 1506 and the MD PLB descriptor section 1504 can share their own instance of a log referred to herein as the NBT log used to manage changes to content stored storage areas 1504 and 1506.

In at least one embodiment, the boot tier 1506 can be a fixed size section of storage for boot tier information. For example, space can be allocated for a super block at the start of the boot tier 1506. Afterwards, pages of a specified size, such as 4 KB pages, can be reserved from the boot tier 1506 for features (e.g., services, layered products) to register, where such features can utilize the storage of the pages of the boot tier 1506 as may be needed. In at least one embodiment, the pages of the boot tier can be expected to have relatively few or a small number of changes infrequently.

In at least one embodiment, changes to the boot tier 1506 can be handled using bulk write operations and a staging area described in more detail below.

In at least one embodiment, the MD PLB descriptor section 1504 can increase in size as needed as the size of the MD tier 1502 increases. Thus in at least one embodiment, the section 1506 can be a fixed predefined size that does not change over the lifetime of the system, and the section 1504 can be a variable size section. The size of section 1504 can increase as the number of MD PLBs of the MD tier increases. The size of 1504 can increase over time to store that additional MD PLB descriptors needed to describe MD PLBs added to the MD tier.

As illustrated in the example 1500, there can be a direct physical mapping between the MD PLB descriptors of the MD PLB descriptor section 1504 and the MD PLBs of the MD tier 1502. In at least one embodiment, storage can be allocated as additional storage that is mapped into the MD tier 1502. In at least one embodiment, as storage is removed and replaced in the MD tier, the replacement storage can occupy the same mapping as the original storage.

In at least one embodiment, descriptors of the section 1504 can also be stored in storage units corresponding to PLBs. Thus the PLB can also be the atomic unit of storage or granularity when writing content to the NBT 1510.

In at least one embodiment, storage for the NBT can be RAID-5 or RAID-6 configured storage.

Generally in at least one embodiment and consistent with other discussion herein, performing an update to a MD page stored in a MD PLB of the MD tier can result in a cascade of subsequent events initially summarized below and then followed by more detail in subsequent paragraphs. Updates can be recorded in the MD log. The MD log can be subsequently flushed or destaged resulting in updates recorded in the TT log and NBT log. When the TT log is flushed or destaged, further updates can be recorded in the NBT log. The NBT log can be flushed or destaged to apply updates to PLBs of the NBT tier. When the NBT log is flushed or destaged, no further updates are generated or recorded to thus end the cascade of recording changes in logs and flushing such logs in at least one embodiment.

In further detail in at least one embodiment, if there is an update U1 to a page P1 stored in a first MD PLB1 (e.g., PLB of the MD tier), U1 can be recorded in the MD log. Subsequently, the MD log can be flushed where U1 is applied to an existing version of P1 to generate an updated version of P1, and the updated version of P1 can be written to a new physical storage location in a new second MD PLB2 that is different from the first MD PLB1. As a result of flushing the MD log and storing the new updated version of P1 in the second MD PLB2, the corresponding MD PLB descriptor, DESC2, for MD PLB2 can also be accordingly updated. In at least one embodiment, update(s) to DESC2 can include updating information of DESC2 to: identify a particular location of MD PLB2 where the updated version of P1 is stored; identify a size of the updated version of P1 stored in MD PLB2; identify a date/time when the updated version of P1 is stored in MD PLB2; and increment a reference count tracking the total number of MD pages stored in MD PLB2. In at least one embodiment, the foregoing reference count can be used to track per PLB utilization or consumption of PLB storage for storing valid current content.

In at least one embodiment, each MD PLB descriptor describing a corresponding MD PLB can also include size information regarding the amount of storage of the MD PLB consumed for each page of content stored in the MD PLB. In at least one embodiment supporting compression at a per page level of granularity, such size information for each page stored in the MD PLB can vary and can denote the size of the compressed page stored in the MD PLB. For example, in at least one embodiment, pages of MD can be uniform in size and can be 4K bytes in uncompressed original form. Each of the foregoing pages of MD stored in a MD PLB can be stored in a compressed form where each individual 4K page is compressed and then stored in its corresponding compressed form. The size information of the MD PLB descriptor can include a size of each compressed page stored in the MD PLB. Thus, for example, as pages of content are added to MD PLB, its corresponding MD PLB descriptor's size information can be updated to reflect the size of compressed added pages stored in the MD PLB.

As a result of flushing the MD log and storing the new updated version of P1 in the second MD PLB2, a mapping entry E1 of a TT used to map P1 can be updated by an update U2 to now reference the new physical storage location of the updated version of P1. The update U2 to E1 of the TT (where TT can be either the VLB TT or MD TT depending on the type of MD of P1) can be recorded in the TT log. At a later point in time, the TT log can be flushed resulting in applying U2 to the TT where an updated version of the TT can be stored in a new MD PLB3 of the MD tier and where MD PLB3's corresponding MD PLB descriptor, DESC3, can also be accordingly updated.

As a result of updating E1 of TT such as when recording U2 in the TT log, the MD PLB descriptor DESC1 that is associated with MD PLB1 (storing the prior version of P1 before updating) can be updated to indicate that storage of MD PLB1 is no longer used for storing P1. For example in at least one embodiment, DESC1 can include a reference count that is decremented by 1. The foregoing reference count can track the number of current pages stored in MD PLB1. The reference count can be used, for example, for tracking utilization of portions of MD PLB1 that are consumed storing valid current content.

In at least one embodiment in accordance with the techniques of the present disclosure, updates to pages of MD PLBs can include updates to top, mid and leaf MD pages; updates to VLB pages; updates to the VLB TT; and/or updates to the MD TT. The foregoing updates to pages of the MD PLBs can be recorded in the MD log. Subsequently flushing the MD log results in applying updates to a first set of MD pages that are rewritten to new MD PLBs of the MD tier. Additionally, responsive to rewriting the first set of MD pages to the new MD PLBs of the MD tier, corresponding MD PLB descriptors of the new MD PLBs can also be accordingly updated. Additionally, rewriting the first set of MD pages to the new PLBs of the MD tier can also result in updates to mapping entries of a TT, where such TT updates can be recorded in a TT log. Subsequently, the TT log is flushed with TT updates applied to generate an updated version of the TT stored in a new MD PLB of the MD tier and also resulting in updating a corresponding MD PLB descriptor for the new PLB now storing the updated TT.

In at least one embodiment, updates to MD PLB descriptors can be recorded as entries in the NBT log. In at least one embodiment, as a result of storing updated MD pages and updated TTs in new MD PLBs of the MD tier, MD PLB descriptors that correspond to the new MD PLBs are also accordingly updated. Additionally, other MD PLB descriptors are also accordingly updated, where the other MD PLB descriptors correspond to old MD PLBs storing the prior version of the MD pages before updating. Such other MD PLB descriptors that use a reference count to track the total number of MD pages stored therein can be updated, for example, to decrement the total number of MD pages. In at least one embodiment, the foregoing decrement can be performed as a result of updating an entry of a TT for a MD page to reference a new physical storage address or location of an updated MD page rather than the prior physical storage address or location of a prior version of the MD page.

In at least one embodiment, the NBT log can be generally flushed or destaged in a manner similar to that as described herein, for example, with the TT log. Flushing or destaging the NBT log can include applying updates to MD PLB descriptors and writing the updated MD PLB descriptors to new physical storage locations. Each updated version of a MD PLB descriptor can be determined by applying relevant updates of the NBT log to a most recent persisted version of the MD PLB descriptor. The updated version of the MD PLB descriptor can be written to a new physical storage location or address (e.g., new PLB) of the section 1504 of the NBT 1510 in a log-based manner. Thus the new physical storage location can be different from the existing physical storage location of the most recent persisted version of the MD PLB descriptor in the section 1504. Additionally in at least one embodiment, the updated version of the MD PLB descriptor can be written out in logically sequential and consecutive regions in a manner similar to that as described in connection with the TT logs.

The foregoing description regarding a cascading of events resulting from flushing or destaging the MD log, along with other items, in at least one embodiment is further described in more detail in the following paragraphs.

In at least one embodiment, both an in-memory (e.g., volatile or cache memory) instance and a non-volatile persisted instance of the NBT log can be managed, maintained and used in connection with the techniques of the present disclosure. In at least one embodiment, the non-volatile NBT log can be an RDL as discussed elsewhere herein in a manner similar to the non-volatile persisted instance of the MD log and TT log. As with other logs discussed herein, the changes tracked in the RDL instances of the NBT log can be used primarily for recovery purposes and can mirror the changes or updates tracked in the in-memory instance of the NBT log. In at least one embodiment, the in-memory or volatile instance of the NBT log can track recorded updates in an in-memory table discussed in more detail below.

Figure 16A:
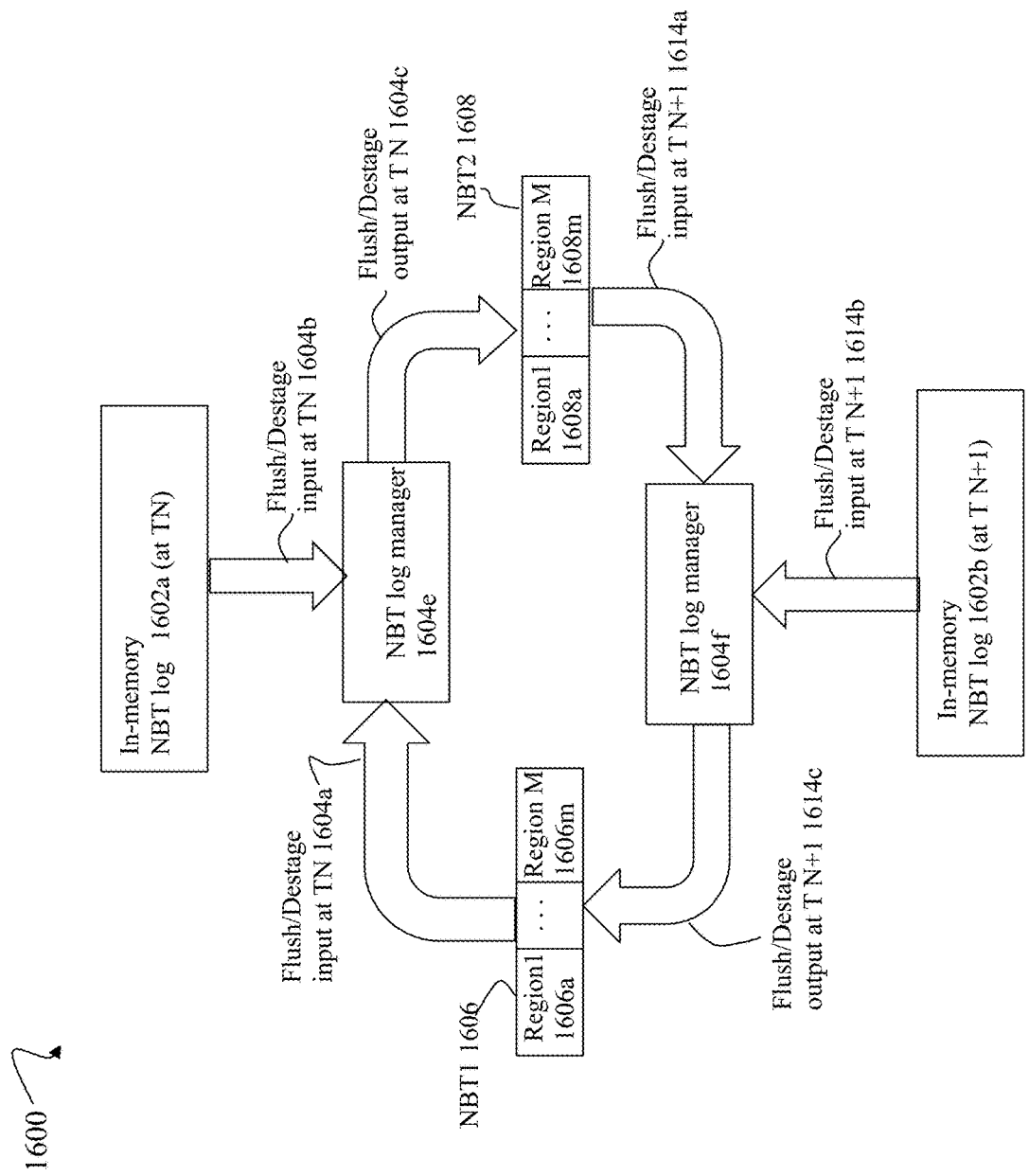

Referring to FIG. 16A, shown is an example 1600 illustrating in more detail management, layout and destaging or flushing in connection with the NBT log in at least one embodiment in accordance with the techniques of the present disclosure.

In at least one embodiment as noted above, corresponding instances of the NBT log can be stored both in-memory (e.g., in a volatile memory) and on persistent non-volatile storage (e.g., NVRAM such as an RDL). The NBTs 1606, 1608 in the example 2200 can generally denote two persisted consecutive versions of the complete NBT 1510.

The example 1600 also includes two persisted instances of two versions of the NBT 1606, 1608. At a point in time N, NBT1 1606 can denote the most recent persisted version with respect to 1606 and 1608, and NBT2 2208 can denote the oldest persisted version with respect to 1606 and 1608.

In the example 1600, NBT log manager 1604e and NBT log manager 1604f can both denote the same instance of the NBT log manager but at two different respective points in time, N and N+1, discussed below. In particular, NBT log manager 1604e can denote the NBT log manager described below in connection with processing performed when flushing the NBT log 1602a at time N; and NBT log manager 1604f can denote the NBT log manager described below in connection with processing performed when flushing the NBT log 1602b at time N+1.

At the point in time N, the NBT log manager 1604e can receive as a first input 1604a the current most recent persisted version NBT1 1606 and as a second input 1604b updates as stored in the NBT log 1602a. Generally, NBT log 1602a can denote the current in-memory NBT log at the point in time N, and NBT log 1602b discussed below can denote the current in-memory NBT log as the next subsequent point in time N+1 when the NBT log is flushed or destaged. As an output 1604c at time N, the NBT log manager 1604c can generate an updated version of the NBT that is stored at the target location 1608. In at least one embodiment, the NBT log manager 1604e can process NBT updates recorded in NBT log 1602a in a sequential consecutive region by region basis. In at least one embodiment, the NBT1 1606 can be partitioned into logically sequentially consecutively stored regions 1-M. Each of the foregoing M regions of 1606 can include a particular sequential consecutively stored portion of mapping entries used for mapping corresponding metadata pages. During flushing or destaging of the NBT log 1602a at time N in at least one embodiment, the NBT log manager 1604e can process updates of the NBT log 1602a related to mapping entries of region 1 1606a by reading the current persistently stored version of region 1 1606a, applying the relevant updates of the NBT log 1602a to mapping entries of region 1 1606a to generate an updated version of region 1, and then outputting or writing the updated version of region I to a corresponding target location 1608a. In a similar manner, subsequently sequential regions of 1606 can be processed consecutively in accordance with their logically consecutive ordering within 1606. In at least one embodiment, the updated regions 1-M can be written out in sequential consecutive logical order to their respective corresponding target regions 1608a-M.

In the example 1600 at the time N+1, the in-memory NBT log 1602b is flushed. At time N+1, the NBT version stored in 1608 is now considered the most recent persisted NBT version with respect to 1606 and 1608; and the NBT version stored in 1606 is now considered the older/oldest version with respect to 1606 and 1608.

At the time N+1, the NBT log manager 1604f can receive as a first input 1614a the current most recent persisted version NBT2 1608 and as a second input 1614b updates as stored in the NBT log 1602b. As an output 1614c at time N+1, the NBT log manager 1604f can generate an updated version of the NBT that is stored at the target location 1606 thereby replacing the current oldest/older persisted 1606 version for time N+1 as stored in NBT1 1606. At time N+1, NBT log 1602b can be flushed or destaged. In at least one embodiment, the NBT log manager 1604f can process NBT updates recorded in 1602b in a sequential consecutive region by region basis as discussed above in connection with time N with respect to the NBT1 1606.

In at least one embodiment, the NBT1 1608 can be partitioned into logically sequentially consecutively stored regions 1-M. Each of the foregoing M regions of 1608 can include a particular sequential consecutively stored portion of mapping entries used for mapping corresponding metadata pages. During flushing or destaging of the NBT log 1602*b* at time N+1 in at least one embodiment, the NBT log manager 1604*f* can process updates of the NBT log 1602*b* related to mapping entries of region 1 by reading the current persistently stored version of region 1 1608*a*, applying the relevant updates of the NBT log 1602*b* to mapping entries of region 1 1608*b* to generate an updated version of region 1, and then outputting or writing the updated version of region 1 to a corresponding target location 1606*a*. In a similar manner, subsequently sequential regions of 1608 can be processed consecutively in accordance with their logically consecutive ordering within the NBT2 1608. In at least one embodiment, the updated regions 1-M can be written out in sequential consecutive logical order to their respective corresponding target regions 1606*a*-M.

In at least one embodiment, when an updated version of the NBT replaces the older/oldest persisted version of the NBT in the MD tier, storage currently allocated for the replaced older/oldest persisted version of the NBT can be unmapped and thus deallocated. When storing the updated version of the NBT in at least one embodiment, storage can be allocated and mapped/remapped. In this manner in at least one embodiment, the updated version of the NBT may not overwrite the exact same mapped physical storage of the replaced older/oldest version of the NBT to thereby avoid continuously overwriting the same underlying physical storage.

Thus in at least one embodiment as illustrated in the example 1600, each time the NBT log is flushed or destaged, recorded updates of the NBT log can be applied to the most recent persisted version of the NBT to generate an updated version of the NBT that is then also persistently stored in a sequential manner by storing logical regions consecutively. The updated version of the NBT can replace the older/oldest of the two currently persisted copies of the NBT. In this manner in at least one embodiment, each flush of the NBT log can result in generating and storing a complete updated version of the NBT.

The example 1600 illustrates an embodiment with aggregated management of updates for both the boot tier 1506 and MD PLB descriptor section (MPDS) 1504 of the NBT 1510 including rewriting the entire NBT. Alternatively in at least one embodiment, the processing described in connection with the example 1600 can be used in connection with separately managing updates of the boot tier 1506 and the MD PLB descriptor section 1504.

Figure 16B:
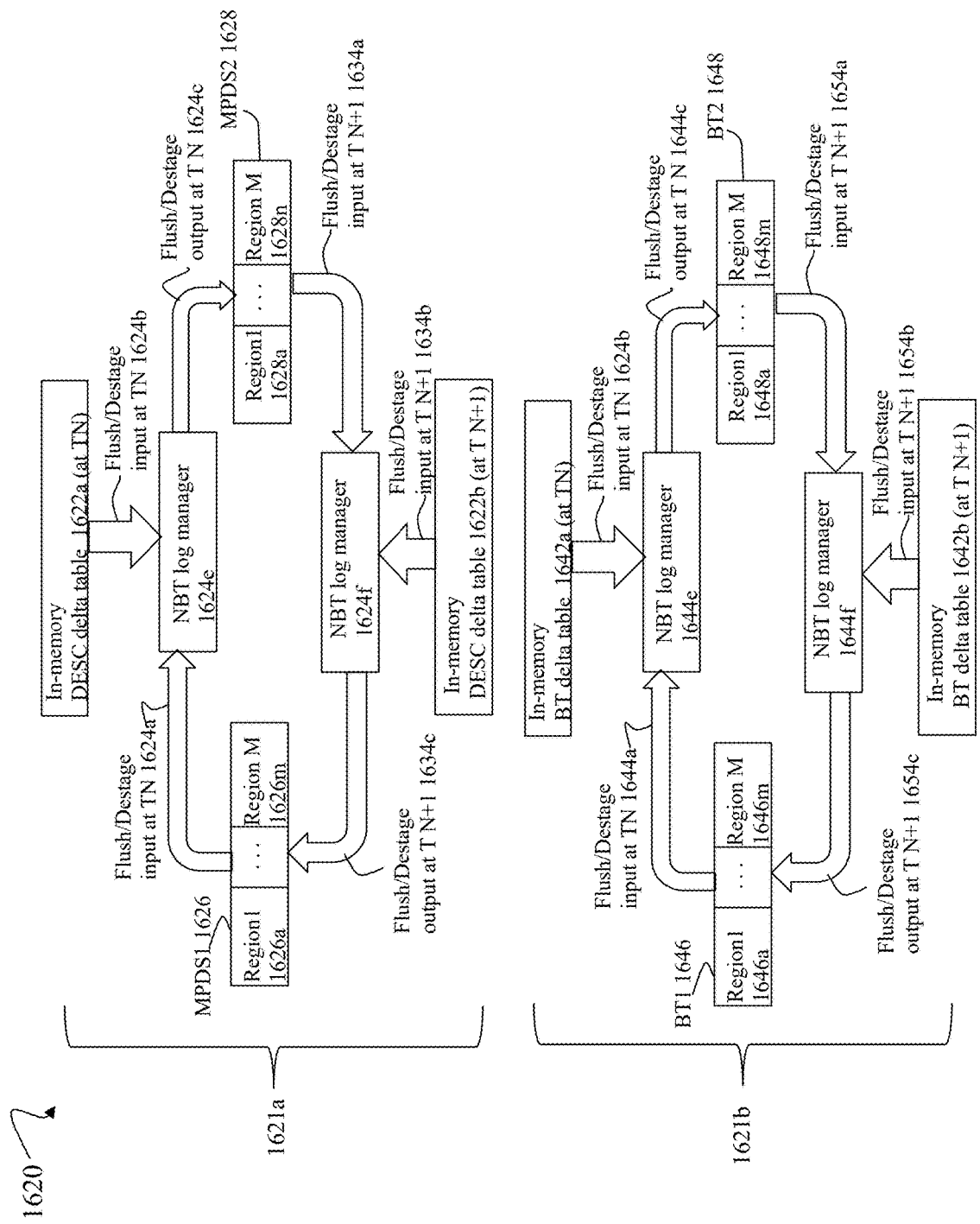

For example, reference is made to the example 1620 of FIG. 16B. The example 1620 includes element 1621*a* illustrating processing and components that can be used in connection with updates to the MD PLB descriptor section 1504 in at least one embodiment; and element 1621*b* illustrating processing and components that can be used in connection with updates to the boot tier 1506 in at least one embodiment.

The example 1621a includes elements 1624*a*-*c*, 1624*e*-*f*, and 1634*a*-*c* that are respectively similar to elements 1604*a*-*c*, 1604*c*-*f*, and 1614*a*-*c* of the example 1600 with the difference that the processing in 1621*a* is performed with respect to the in-memory DESC delta tables 1622*a*-*b* and two persisted versions of the MPDS stored in 1626, 1628 rather than, respectively, the in-memory NBT log 1602*a*-*b* and persisted NBTs 1606, 1608.

The in-memory DESC delta tables 1622*a*-*b* can denote the state of an in-memory DESC delta table, respectively, at times N and N+1 as in the example 1600. In at least one embodiment, changes or updates to the MDPS 1504 can be recorded in the in-memory DESC delta tables 1622*a*-*b* flushed, respectively, at times N and N+1 as described in the example 1600. In at least one embodiment, the tables 1622*a*-*b* can have a format or layout of entries or rows with an update to the MDPS 1504 recorded in each table entry. In at least one embodiment, a persistently stored RDL as discussed elsewhere herein can be used to also persistently store updates to the MDPS 1504 and can be used, for example, primarily for recovery purposes in at least one embodiment. In at least one embodiment, the tables 1622*a*-*b* can have a tabular format or layout that is different, for example, than the HBSB structure as described herein that can be used for the in-memory TT logs and in-memory MD log.

In at least one embodiment, a common RDL can be used to persistently store updates made to both the sections 1504 and 1506 of the NBT 1510. In such an embodiment, the common RDL can be used to recover the contents of the in-memory DESC delta table, for example, in the case of a reboot, failure, or other event in which the system may be rebooted or restarted.

The example 1621b includes elements 1644*a*-*c*, 1644*c*-*f*, and 1654*a*-*c* that are respectively similar to elements 1604*a*-*c*, 1604*c*-*f*, and 1614*a*-*c* of the example 1600 with the difference that the processing in 1621*b* is performed with respect to the in-memory BT (boot tier) delta tables 1642*a*-*b* and two persisted versions of the BT stored in 1646, 1648 rather than, respectively, the in-memory NBT log 1602*a*-*b* and persisted NBTs 1606, 1608.

The in-memory BT delta tables 1642*a*-*b* can denote the state of an in-memory BT delta table, respectively, at times N and N+1 as in the example 1600. In at least one embodiment, changes or updates to the BT 1506 can be recorded in the in-memory BT delta tables 1642*a*-*b* flushed, respectively, at time N and N+1 as described in the example 1600. In at least one embodiment, each of the tables 1642*a*-*b* can be implemented using a reserved portion of memory M1 having a size corresponding to the total size of the two persisted BTs 1646, 1648. In at least one embodiment, pages of the reserved portion of memory M1 can correspond to pages of the BT as stored in 1646 and 1648 where BT updates to a particular page of the BT can be recorded in a full page as stored in M1. Thus M1 in at least one embodiment can be a map with an element for each page in 1646 and 1648 where the map can track the most current persisted version of each page in the map. Flushing or destaging the in-memory BT delta table 1642*a* at time N can including merging content from the most recent persisted version of the BT from 1646 with the updates or changes of the BT delta table 1642*a* to determine an updated version of the BT, where the updated version of the BT can then be written to the target 1648. Flushing or destaging the in-memory BT delta table 1642*b* at time N+1 can including merging content from the most recent persisted version of the BT from 1648 with the updates or changes of the BT delta table 1642*b* to determine an updated version of the BT, where the updated version of the BT can then be written to the target 1646.

In at least one embodiment, changes to BT pages can be stored in the in-memory BT delta table via a bulk operation. With a bulk operation in at least one embodiment, multiple updates to one or more pages of the BT can be committed and stored in the in-memory BT delta table in a single transaction.

In at least one embodiment, the elements 1642*a*-*b* can be implemented using a dedicated section of software-defined persisted memory (SDPM) reserved to manage the current state of each page as collectively stored in 1646, 1648. In such an embodiment using SDPM, use of the RDL can be omitted since the SDPM itself is persistent and can be used as needed to restore the in-memory BT delta table.

Figure 17:
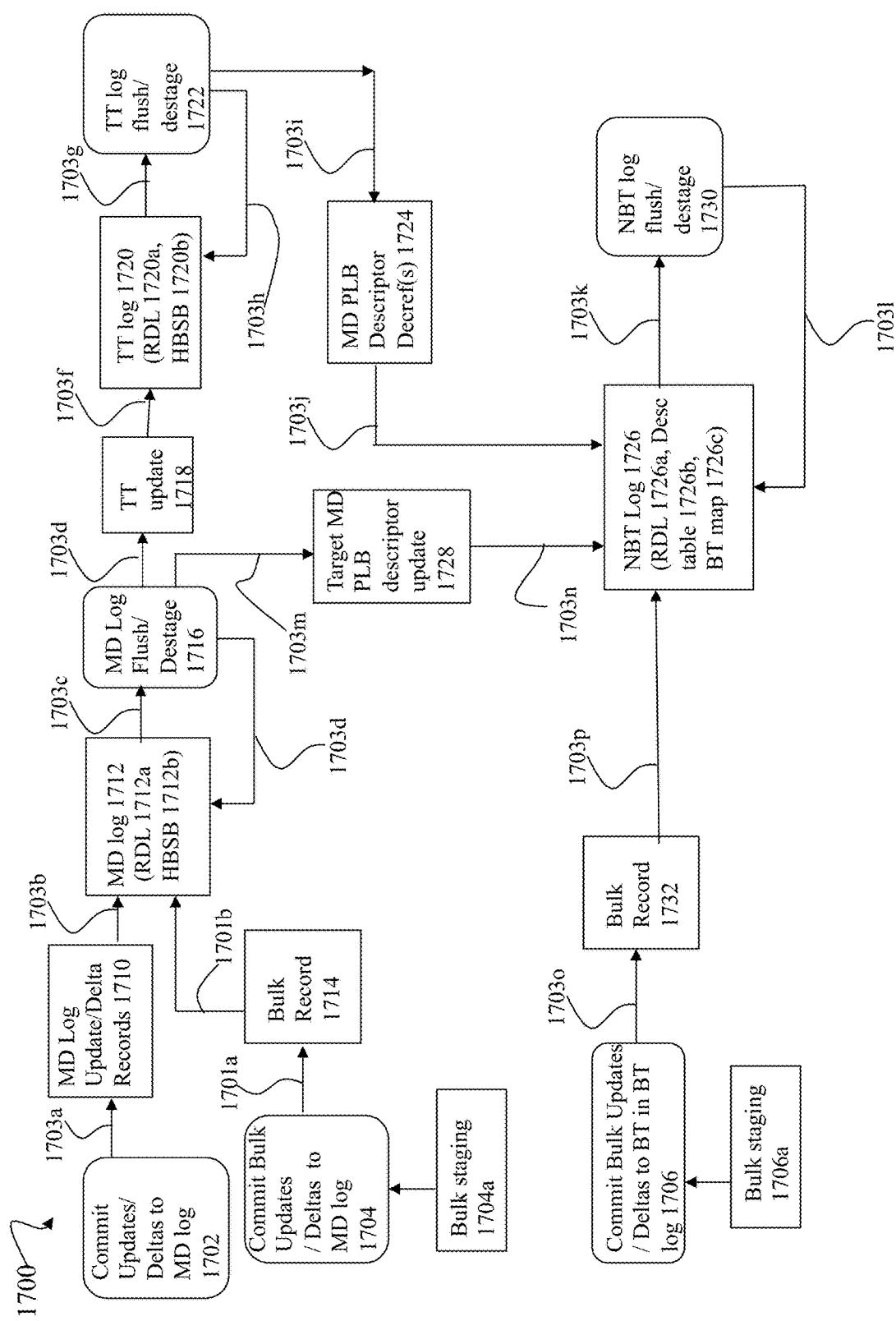

Referring to FIG. 17, shown is an example 1700 illustrating processing flows in at least one embodiment in accordance with the techniques of the present disclosure.

The example 1700 illustrates the cascades of flushing or destaging among the various logs described herein in at least one embodiment in accordance with the techniques of the present disclosure. The example 1700 summarizes processing flows described above in at least one embodiment in accordance with the techniques of the present disclosure.

Processing can be performed to commit updates or deltas to the MD log 1702 of a single transaction to the MD log 1712. As a result, MD log update or delta records 1710 can be generated (1703a) and recorded (1703b) in the MD log 1712. In at least one embodiment, the MD log 1712 can be used for recording updates to top, mid and leaf MD pages and also VLB pages. In at least one embodiment, the MD Log 1712 can include a persisted version RDL 1712a (e.g., stored in non-volatile storage such as NVMRAM) and an in-memory version HBSB 1712b (e.g., storage in volatile memory such as volatile cache memory). Records of updates from the MD log 1712 can be provided as input (1703c) to MD log flush or destage processing 1716. Records of updates flushed or destaged the MD log 1712 can be dropped or removed (1703d) from the MD log 1712.

As a result of flushing or destaging 1716 the MD log, updates can be made to a page P1 where the updated version of page P1 is stored in a new physical address or storage location PA1 of a target MD PLB5 of the MD log structure. The target MD PLB descriptor corresponding to the target MD PLB5 is updated (1728) to reflect the fact that the target MD PLB5 now stores the updated version of page P1, where the target PLB descriptor update 1728 is generated (1703m) as a result of flushing or destaging the MD log 1716. The update 1728 is recorded (1703n) in the NBT log 1726. In at least one embodiment, the NBT log 1726 can include a common RDL 1726a used to persistently store updates to both the BT 1506 and the MPDS 1504. In at least one embodiment, the NBT log 1726 can also store updates to the MPDS 1504 in volatile memory in the Desc (descriptor) table 1726b, and updates to BT 1506 in volatile memory in the BT map 1726c. The BT map 1726c can represent, for example, the in-memory BT delta tables 1642a-b such as described in connection with the example 1621b. The Desc table 1726b can represent, for example, the in-memory DESC delta table 1622a-b such as described in connection with the example 1621b. In at least one embodiment, the target MD PLB descriptor update 1728 can be recorded in the RDL 1726c and the Desc table 1726b.

Also as a result of flushing or destaging 1716 the MD log, a TT update 1718 can be made to a mapping entry E1 of a TT (e.g., the MD TT and/or VLB TT). Consistent with discussion herein, the updated mapping entry E1 can identify the current physical address or storage location PA1 in the target MD PLB storing the updated version of page P1. The TT updated 1718 can be generated (1703d) and recorded (1703f) in the TT log 1720. In at least one embodiment, the TT log 1720 can include a corresponding persisted RDL 1720a (e.g., stored in non-volatile storage such as NVRAM) and an in-memory HBSB 1720b (e.g., stored in volatile memory such as a volatile cache). The TT log 1720 can be flushed or destaged 1722. As records of the TT log 1722 are flushed or destaged, they can be dropped or removed (1703h) from the TT log 1722.

Flushing or destaging the TT log 1722 results in updating the TT and storing the updated version of the TT in a new physical address or storage location PA2 in a MD PLBX. Also as a result of 1722 in at least one embodiment, a MD PLB DESC Y can be updated (1724). The MD PLB DESC Y can correspond to the MD PLB Y that stored the prior version of the page P1 (noted above) prior to updating (e.g., where the mapping entry E1 was updated to indicate that the updated version of P1 is stored at the current physical address or storage location of PA1). In particular, the update 1724 to the MD PLB DESC Y can be a "decref" operation that decrements the reference count of the MD PLB DESC Y to reflect the fact that P1 is no longer stored in the MD PLB Y.

The MD PLB descriptor update 1724 that is a decref can be generated (1703i) as a result of TT log flushing or destaging 1722, where the updated 1724 can be recorded (1703j) in the NBT log 1726.

In at least one embodiment, bulk updates can also be performed in connection with the MD log 1712. Element 1704a denotes the bulk update staging area, for example, where updates to one or more pages of metadata can be collected and then committed in a single transaction 1704. The committed bulk updates 1704 to the MD log result in generating (1701a) the bulk record 1714 that is recorded (1701b) in the MD log 1712.

In at least one embodiment, bulk updates can be performed in connection with updates to the BT 1506. Element 1706a denotes the bulk staging area, for example, where updates to one or more pages of the BT can be collected and then committed in a single transaction 1706. The committed bulk updates 1706 to the BT result in generating (17030) the bulk record 1732 that is recorded (1703p) in the NBT log 1726. In at least one embodiment, the BT updates of 1732 can be recorded in the RDL 1726b and the BT map 1726c).

The NBT log 1726 can be flushed or destaged 1730 resulting in updates to the BT 1506 and/or MPDS 1504. As updates are flushed or destaged from the NBT log 1726, such updates can be dropped or removed (17031) from the NBT log 1726.

In summary, the example 1700 indicates that flushing or destaging the MD log 1712 can result in updates recorded in the TT log as well as the NBT log. Flushing or destaging the TT log can result in updates recorded in the NBT log. When the NBT log is flushed or destaged, no update or delta records are generated.

Systems can include various structures stored in a cache such as a fast volatile memory, where such structures can sometimes also referred to herein as in-memory or volatile memory structures. As discussed herein, a TT or translation table can be used to perform address translations of logical to physical addresses or locations for various metadata pages in a log structured system or LSS. In this context in at least one embodiment, metadata (MD) pages can generally include top, mid and leaf MD pages as well as VLB pages discussed above. A TT can be used to translate a logical address of a MD page to a corresponding physical address or location where the MD page is stored on BE non-volatile storage. As discussed above, an embodiment can generally include one or more TTs that map metadata page logical addresses to corresponding current physical storage locations or addresses where the metadata pages are stored. In at least one embodiment, the general class of MD pages can include top, mid and leaf MD pages and VLB pages. In at least one embodiment, a first TT can be used to map logical addresses of top, mid and leaf MD pages to corresponding physical addresses, and a separate second TT can be used to map logical addresses of VLB pages to corresponding physical addresses. As a variation, an embodiment can use a single TT for mapping logical to physical addresses of all such MD pages including top, mid and leaf MD pages and VLB pages.

To provide fast access to recently read or modified TT entries in at least one embodiment, two separate structures can be used where the two structures are stored in cache or volatile memory. The two structures can include a TT cache (sometimes referred to as a TT address cache) that is an in-memory copy of at least some of the TT entries of the TT; and a TT log (sometimes also referred to as a TT delta log). The TT cache can include in-memory copies of at least some of the TT entries expected to be used again and/or recently use. The TT log can be an in-memory TT log discussed elsewhere herein including an active and frozen TT log pair denoting changes, deltas, or updates to TT entries of top, mid, and leaf MD pages and VLB pages. The active TT log of the pair can be used for storing newly added TT updates. When the active TT is full, it can transition to the frozen state and be destaged. Both the in-memory TT log and in-memory TT cache structures can be indexed by MD page logical addresses that are mapped to corresponding physical addresses or locations on BE non-volatile storage where the respective MD pages are stored. In at least one embodiment using separate structures for the TT log of dirty TT entries (e.g., TT entry updates) and the TT cache of clean TT entries, the TT log can include two instances consistent with discussion herein: an active TT log instance and a frozen TT log instance.

Updates, changes or deltas to a MD page are stored in a MD log in at least one embodiment. The changes to a MD page are subsequently destaged from the MD log and applied to a current version of the MD page to generate a new version of the MD page. The current version of the MD page is stored at a first physical location or address on BE non-volatile storage, and the new version of the MD page is written to a new physical location or address different than the first physical location or address of the prior version. Thus each time updates are applied to a MD page as part of destaging the MD log such that a new version of the MD page is generated and stored at a new physical location or address, the MD page's corresponding TT entry in the TT also requires updating, where the corresponding TT entry update can be recorded in a TT log entry of the active TT log. When a TT entry is updated such that a corresponding TT log entry is recorded in the active TT log instance, the cached copy of the existing TT entry, if any, in the TT cache becomes invalid or stale. If the TT cache includes an existing TT entry for the MD page, the cached existing TT entry indicates that the MD page is stored at the first physical location or address of the prior version of the MD page (e.g., before applying the update of the TT log entry). Thus after destaging a frozen TT log, the new revised version of the MD page is stored at a different location, the new physical address or location, thereby invalidating the information of any cached existing TT entry for the MD page, where the existing cached TT entry incorrectly indicates the prior physical address of the MD page as the current physical address rather than indicate the new physical address or location as the current physical address.

As noted above, at least one embodiment can use separate in-memory TT cache and TT log structures that are managed and accessed independently. The TT cache can include at least some of the TT entries of the TT, and the TT log can include TT entries of updates, changes or deltas made to the TT, in particular to the TT entries of the TT. Assuming the in-memory TT log includes a TT log pair of an active TT log instance and a frozen TT log instance discussed herein, a system can include a total of 3 separate structures such as 3 separate hash tables for the in-memory TT cache and TT log: a first hash table for the in-memory TT cache, a second hash table for the active TT log, and a third hash table for the frozen TT log, where all 3 hash tables can be separate independent structures each requiring a separate query or lookup for access. For example, for a MD page not stored in cache resulting in a read cache miss for the MD page, processing can include performing the following steps to read the MD page's TT entry in order to read and obtain the MD page from its current physical storage location on BE non-volatile storage:

A1. Check the TT cache for the TT entry for the MD page. If the TT entry for the MD page is in the TT cache, return the current physical address or location of the MD page. Otherwise go to A2.

A2. Check the active TT log for the TT entry for the MD page. If the TT entry for the MD page is found in the active TT log, return the current physical address or location of the MD page. Otherwise go to A3

A3. Check the frozen TT log for the TT entry for the MD page. If the TT entry for the MD page is found in the frozen TT log, return the current physical address or location of the MD page. Otherwise go to A4.

A4. Read the TT entry for the MD page as stored in BE non-volatile storage such as the TT tier discussed elsewhere herein. Use the current physical address or location of the MD page of the TT entry to then read the MD page from the physical address or location on non-volatile storage. Add a TT cache entry to the TT cache for MD page, where the TT cache entry corresponds to the TT entry just read. Additionally, the MD page just read can also be added to the MD page cache storing current copies or versions of the MD page.

In at least one embodiment maintaining separate structures for the TT log and TT cache, processing can be performed to ensure coherency between information of such structures. For example in at least one embodiment, when an update is made to a TT entry resulting in recording a corresponding updated in the TT log, any cached value of the TT entry can be invalidated since it is now stale or invalid and indicates the mapping of the TT entry prior to the update.

Alternatively in at least one embodiment, the techniques of the present disclosure provide for combining the in-memory TT cache and the in-memory TT log such that a single structure can be used and queried to access entries in both the in-memory TT cache and the in-memory TT log when determining a current physical address or location of a MD page having a corresponding logical address.

In at least one embodiment, entries of both the in-memory TT cache and the in-memory TT log can be combined into a single access structure that is a hash table referred to herein as a unified hash table or UHT. The UHT can be indexed or organized by MD page logical addresses such that a logical address LA1 of the MD page P1 is mapped using a hash function UHThash to a particular index I of the unified hash table UHT, where UHT (I) is associated with the entry E1 including the current physical address or location PA1 of where the MD page P1 is persistently stored, and where UHThash (LA1)=I. In at least one embodiment, the entry E1 of the UHT mapped to LA1 of the MD page P1 can be either a TT cache entry or a TT log entry.

In at least one embodiment, a single hash table, the UHT, is used to track entries of both the TT cache and TT log as stored in cache or volatile memory. In at least one embodiment, any entry found or accessed via lookup in the single hash table UHT for a MD page logical address will always be the current value of the physical address or location of the MD page, where the entry and thus MD page physical address of the UHT entry can be characterized as either dirty or otherwise clean (or persisted).

In at least one embodiment, the single hash table, UHT, can include an entry with a physical address PA1 for a MD page where the UHT entry and the PA1 for the MD page can be characterized as dirty if the UHT entry corresponds to a TT log entry that denotes an update or delta to the TT entry for the MD page that has not yet been destaged or flushed from the TT log to the persistently stored TT on BE non-volatile storage. In at least one embodiment, a UHT entry can represent a TT log entry of either the active TT log instance or the frozen TT log instance.

In at least one embodiment, the single hash table, UHT, can include an entry with a physical address PA1 for a MD page where the UHT entry and the PA1 for the MD page can be characterized as clean or persisted if the UHT entry corresponds to a TT cache entry, rather than a TT log entry, where the TT cache entry denotes the current physical location or address of the MD page as persistently stored on BE non-volatile storage.

Thus, when querying the single hash table UHT for a MD page logical address LA1, any entry E1 of UHT found corresponding to LA1 includes the current physical location or address PA1 where the MD page is stored. In at least one embodiment, querying the UHT for LA1 can return nothing or null thereby indicating that neither the TT cache nor the TT log includes an entry with the current physical address PA1 of the MD page with the logical address LA1. Alternatively querying the UHT for LA1 can return PA1 thereby indicating that the UHT includes a UHT entry representing either a TT cache entry or a TT log entry corresponding to the logical address LA1 of the MD page, where the UHT entry includes the current physical address PA1 of the MD page with the logical address LA1.

When storing in the UHT a UHT entry for a MD page having a logical address LA1, the UHT may or may not already include a corresponding UHT entry for LA1. If the UHT does not already include a UHT entry for LA1, a UHT entry for LA1 can be added. The UHT entry added for LA1 can denote either a TT log entry or a TT cache entry depending on the particular workflow adding the UHT entry. For example, the UHT entry added can denote a TT cache entry if the UHT entry is added as part of read cache miss processing for a MD page not found in cache, where the MD page's corresponding TT entry is then subsequently read from non-volatile storage (such as in step A4 noted above) and the TT cache entry added corresponds to the TT entry just read from non-volatile storage (as in step A4 noted above). As another example, the UHT entry added can denote a TT log entry of the active TT log instance if the UHT entry is added as part of destaging the MD log after MD log updates are applied to a current version of a MD page to generate an updated version of the MD page that is written to a new physical location or address PA1 on non-volatile storage. The UHT entry that is added and represents the TT log entry can denote the new or updated physical address PA1 of the MD page having logical address LA1.

In at least one embodiment in some workflow processing scenarios discussed in the following paragraphs, if the UHT does include an existing UHT entry for a MD page having logical address LA1, the existing UHT entry can be displaced or replaced with the new updated UHT entry for LA1. The existing UHT entry can denote either a TT log entry or TT cache entry depending on the particular workflow.

In at least one embodiment consistent with other discussion herein, the TT log manager (sometimes referred to as the TT delta log manager) can add UHT entries representing TT log entries of in-memory active TT log. In at least one embodiment consistent with other discussion herein, the TT log manager can maintain two instances of the in-memory TT log, the in-memory active TT log and the in-memory frozen TT log. Each instance of the TT log includes a list of UHT entries denoting TT log entries added while the corresponding TT log had the active role (even though a current role or state of the TT log can be frozen).

In at least one embodiment using the UHT rather than separate structures for the TT logs and TT caches as noted above, the techniques of the present disclosure can provide for a revised workflow in connection with read cache miss processing for a MD page. For example, for a MD page not stored in cache, such as a MD page cache, resulting in a read cache miss for the MD page, processing can include performing the following to read the MD page's TT entry in order to read the MD page from its current physical storage location on BE non-volatile storage:

B1. Check the UHT for a UHT entry for the MD page having the logical address LA1. If the UHT entry for the MD page is in the UHT, return the current physical address or location PA1 of the MD page, where PA1 is stored in the UHT entry corresponding to LA1. Otherwise go to B2.

B2. Read the TT entry for the MD page from the TT as stored in BE non-volatile storage such as the TT tier discussed elsewhere herein. Use the physical address or location of the TT entry to then read the MD page from the physical address or location on non-volatile storage. To the UHT, add a UHT entry denoting a TT cache entry of the TT cache for MD page, where the TT cache entry corresponds to the TT entry just read. Additionally if desired, the MD page just read to the MD page cache.

In the foregoing revised read cache miss processing workflow for a MD page using the single UHT in at least one embodiment in accordance with the techniques of the present disclosure, the prior steps A1-A3 can now be replaced with the single lookup in the step B1, and the prior step A4 replaced with the step B2. Thus in at least one embodiment, the read cache miss processing for a MD page not stored in cache can be simplified and made more efficient with the single lookup in the single unified HT, the UHT.

In at least one embodiment, a single global memory pool can be used to allocate UHT entries or objects used for both the in-memory TT cache, the in-memory TT log instances as well as predecessor type entries denoting converted prior TT log entries. Use of a single global memory pool provides for easier memory management rather than, for example, having separate independent memory pools for the in-memory TT cache entries and the in-memory TT log entries. In at least one embodiment, the portion of the global memory pool for UHT entries corresponding to TT cache entries and the TT log entries can automatically adjust and vary depending on the particular workload of the system. For example, in at least one embodiment, the in-memory TT cache can be characterized as a read cache used in connection with processing read requests to read MD pages; and the in-memory TT log can be characterized as a write cache used in connection with recording or logging updates or changes to TT entries. If the current workload of the system is read heavy, a larger portion of the single global memory pool can be used as TT cache entries of the TT cache. If the current workload of the system changes and transitions from read heavy to write heavy, additional MD page updates can be expected and thus an increase in TT entry updates for MD pages can also be expected. In this latter scenario, the portion of the global memory pool used for TT cache entries of the TT cache automatically adjusts and decreases in order to increase the amount of memory consumed as TT log entries of the in-memory TT log. If there is no free memory in the global memory pool and a new UHT entry is needed, for example, to store a new TT log entry, processing can evict an existing TT cache entry and use the freed memory to configure the new UHT entry as the new TT log entry. With a read heavy workload in at least one embodiment, the size of the TT cache can be expected to increase and be larger than in scenarios with a write heavy workload such that more TT entries can remain in the TT cache. In contrast with a write heavy workload, the size of the TT cache can be expected to decrease (in comparison to the size of the in-memory active TT log) such that fewer TT entries can remain in the TT cache.

In at least one embodiment, the UHT can be characterized as a single access structure of UHT entries, where each UHT entry can be one of a number of defined types of objects or entries. In at least one embodiment, the defined types of unified cache entries can include a cache entry or cache type, a delta entry or delta type and a predecessor entry or predecessor type. The cache entry type can denote a UHT entry corresponding to a TT cache entry. The delta entry can denote an UHT entry corresponding to a TT log entry of either an active or frozen TT log instance. In at least one embodiment, the predecessor entry type may not be directly addressable or accessible through a query or lookup of the UHT based on a MD page logical address. The predecessor entry can denote an extended or converted delta entry for a logical address LA1 of a MD page that has been overwritten prior to destaging the TT log associated with the predecessor entry. Put another way, the same MD page with logical address LA1 may be written out multiple times to multiple different physical locations. Each time the MD page is written out to a new physical location, a separate corresponding UHT entry denoting a new TT log entry type can be added to the UHT. In at least one embodiment, the most recent or current UHT entry for the current physical location of the MD page with LA1 can be accessed directly when querying the UHT in accordance with LA1. In at least one embodiment, the most recent or current delta entry can be associated with one or more other entries of the predecessor type where each such entry of the predecessor type can denote a converted prior delta entry type for LA1 corresponding to a prior physical location or address of the MD page. Thus, for example, if the MD page for LA1 is written to N=2 different physical locations prior to destaging the current UHT delta entry denoting the current physical address of the MD page with logical address LA1, the UHT can include N-1 or a single predecessor type entry associated with the current UHT delta entry for LA1.

In at least one embodiment, the in-memory active TT log, the in-memory frozen TT log, and the TT cache can be maintained as individual lists of entries. Put another way, the UHT can be a single unified access structure including entries of the in-memory active TT log, the in-memory frozen TT log, and/or the TT cache. In at least one embodiment, selected UHT entries can then be logically included and linked into the in-memory active TT log, the in-memory frozen TT log, and the TT cache depending on the types of the UHT entries. Additionally in at least one embodiment, entries of the in-memory frozen TT log can also include other TT log entries of not associated with the UHT.

In at least one embodiment, UHT entries of the cache entry type denoting TT cache entries are pre-emptable and can be evicted from the UHT, and thus from cache and in particular evicted from the TT cache and thus the unified cache. In at least one embodiment, UHT entries of the delta entry type denoting TT log entries are not pre-emptable and remain in cache until flushed or destaged. Put another way in at least one embodiment, UHT entries or more generally delta type entries corresponding to TT log entries cannot be evicted, freed or reclaimed for reuse until the TT log entries transition to the frozen state and have been destaged as part of destaging the TT log as discussed elsewhere herein. In at least one embodiment in some workflow scenarios, a UHT entry of the delta type can be included in the in-memory frozen TT log and can be subsequently disassociated or unlinked from the UHT but remain allocated and retained in cache and in the in-memory frozen TT log until the in-memory frozen TT log is destaged or flushed.

The following paragraphs provide an initial discussion of the UHT that can be utilized in at least one embodiment in accordance with the techniques of the present disclosure.

Figure 18:
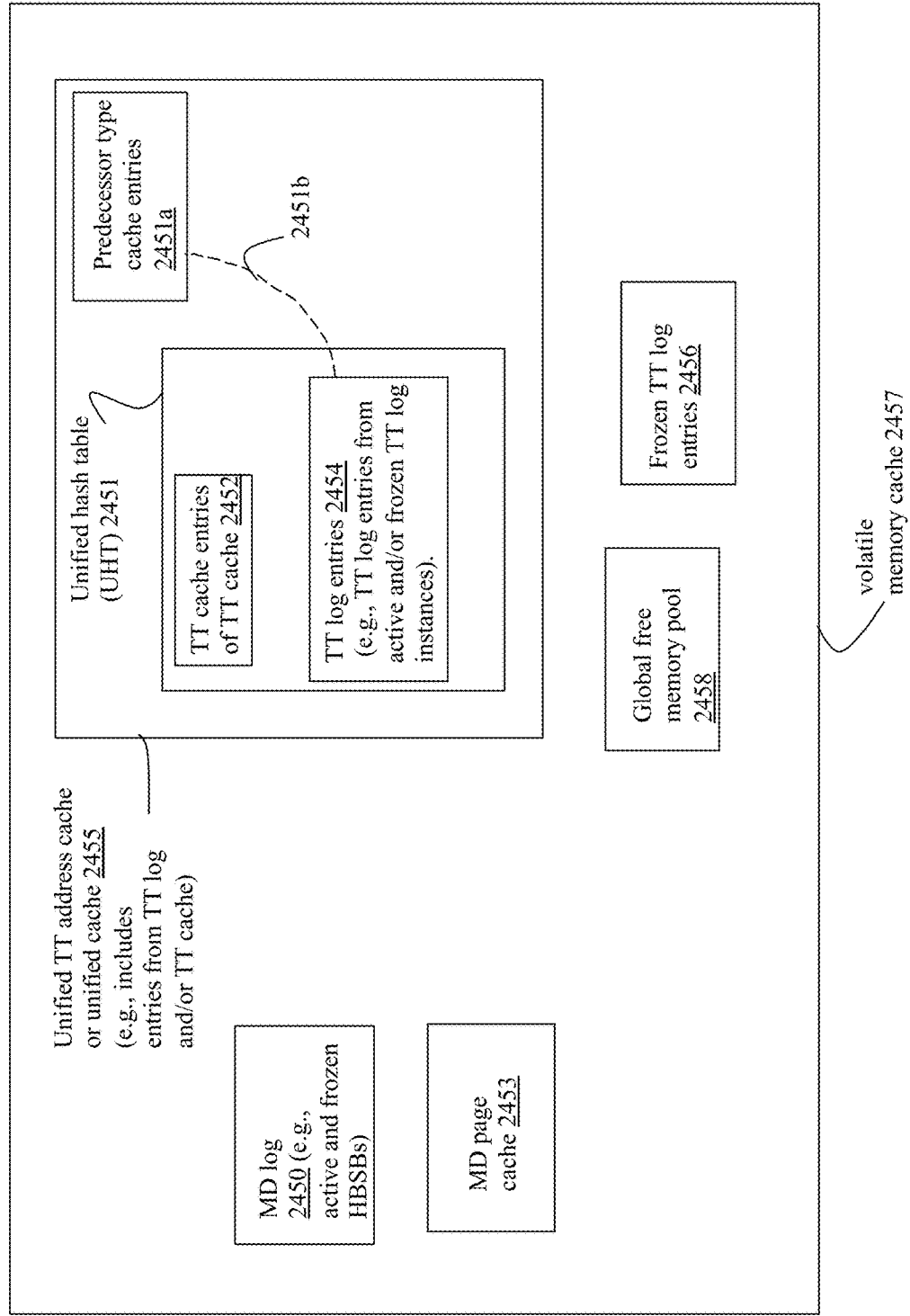

Referring to FIG. 18, shown is an example 2450 of some of the components and structures that can be included in a volatile memory cache 2457 in at least one embodiment in accordance with the techniques of the present disclosure.

The volatile memory cache 2457 can be, for example, included in the volatile memory of a system such as of a single node in at least one embodiment. The volatile memory cache 2457, or more generally, volatile memory of a system or node can include other structures and components such as those discussed elsewhere herein. The volatile memory cache 2457 can include a MD log 2450 denoting the in-memory MD log such as the active and frozen HBSBs (e.g., as in FIG. 6), a MD page cache 2453 for caching copies of MD pages such as VLB pages and top, mid and leaf MD pages, a unified TT address cache or unified cache 2455, and a global free memory pool 2458 of free memory available for allocating new UHT entries. The unified cache 2455 can include entries that are accessible and indexed using a unified hash table or UHT 2451.

The MD page cache 2453 can include cached copies of metadata pages including top, mid and leaf MD pages and VLB pages. In at least one embodiment, the MD page cache 2453 can be indexed or accessed using the logical addresses of MD pages. The MD page cache can be queried with respect to a MD page logical address to determine whether the MD page cache includes a corresponding MD page. If a MD page having an associated logical address is in the MD page cache, a MD page cache hit results and the MD page cache can return the MD page in response to the query. Otherwise, a MD page cache miss results and the MD page cache can return null or nothing. In at least one embodiment, not all VLB and MD pages can be stored in the MD page cache. As a result in at least one embodiment, the MD page cache content can be managed based on a caching policy such as an LRU or least recently used-based policy where the most recently used MD pages are stored in the MD page cache. Put another way, if there is no room in the MD page cache to cache a new MD page, the LRU policy can select a MD page for eviction from the MD page cache, where the selected evicted MD page is the least recently used MD page of the MD page cache.

The unified cache 2455 can generally include a cache of TT entries 2452 and a cache of TT log entries 2454 of active and/or frozen TT log instances. In at least one embodiment, not all TT entries of the TT tables (including a VLB TT and MD TT) can be cached in the TT cache 2452. Thus in at least one embodiment, the TT cache 2452 can store selected TT entries mapping MD page logical addresses to corresponding physical address or locations based, at least in part, on one or more TT cache management policies. In at least one embodiment, TT cache entries of the TT cache 2452 can be managed in accordance with a least recently used or LRU caching policy. With an LRU policy, the most recently used TT entries for top, mid, leaf and VLB pages can be maintained and remain in the TT cache 2452. The LRU policy can identify or order cached entries of the TT cache for eviction based on last or most recent time of access such that when it is necessary to evict an entry from the TT cache 2452, the LRU entry can be evicted, for example, to make room for storing a new TT entry in the TT cache 2452. In at least one embodiment, the unified cache 2455 can include TT cache entries of the TT cache 2452 and TT log entries of active and/or frozen instances of the TT log where such entries of the unified cache 2455 can include those directly accessible by querying the UHT 2451 to determine whether there is a unified cache or UHT hit or miss with respect to a particular MD page logical address, and where the unified cache or UHT hit indicates there is a UHT entry of the unified cache that includes the current physical address for the particular MD page, and where the unified cache or UHT miss indicates there is no existing UHT entry of the unified cache that includes the current physical address for the particular MD page. In at least one embodiment, predecessor type entries 2451a can be included in the unified cache 2455 but not directly accessible via querying the UHT in accordance with a MD page logical address. As such, the predecessor type entries 2451a in at least one embodiment may not be considered as directly included in the UHT 2451 but may be considered as included in the unified cache since predecessor type entries 2451a are associated with corresponding TT log entries 2454 as denoted by the dashed line 2451b

The volatile memory cache 2457 can also include frozen TT log entries 2456 that are not included in the UHT or unified cache but are included in the frozen TT log. Generally in at least one embodiment, the in-memory frozen TT log can include TT log entries 2454 that are included in and associated with the UHT and unified cache and/or TT log entries 2456 that are not included in and not associated with the UHT and unified cache. In at least one embodiment, the in-memory active TT log can include TT log entries 2454 that are included in the UHT and unified cache. In at least one embodiment, the in-memory active TT log can only include TT log entries of the UHT and unified cache.

The volatile memory cache 2457 can include a global free memory pool 2458 (sometime referred to as the free memory pool) denoting a pool of free memory available for allocating new UHT entries, or more generally, new cache entries used in connection with the TT-related types of entries such as may be included in any of 2451a, 2452, 2454, and 2456. Consistent with other discussion herein, delta type entries denoting frozen TT log entries 2456 may have been previously allocated from the pool 2458 prior to becoming frozen (e.g., prior to the TT log instance including such delta entries becoming frozen). In at least one embodiment, if the free memory pool 2458 has no free memory available for allocating a new UHT entry, an existing UHT entry included in the TT cache 2452 can be evicted thereby making memory of the evicted existing UHT entry free or available for reuse. Subsequently, the freed memory of the existing UHT entry can be reallocated for use as the new UHT entry. In at least one embodiment, TT log entries 2454, 2456 are not preemptable and cannot be evicted from the volatile memory cache 2457. In contrast in at least one embodiment, TT cache entries of the TT cache 2452 are preemptable via LRU semantics and can be evicted from the TT cache and generally from the volatile memory cache 2457 when needed, such as when memory is needed for new TT log entries 2454.

In at least one embodiment, the size of the TT cache 2452 can vary over time depending on I/O workload characteristics of the system. The size of the TT cache 2453 can be vary depending on the memory demands needed for caching TT log entries 2454, 2456. In at least one embodiment, the memory demand for TT log entries 2454, 2456 can increase as the write I/O workload increases and as the read I/O workload decreases. In at least one embodiment, the memory demand for TT log entries 2454, 2456 can decrease and the memory demand for TT cache entries 2452 can increase as the read I/O workload increases and the write I/O workload decreases.

In at least one embodiment, processing can query the UHT 2451 using the LA of a MD page as a key to locate and access a UHT entry, if any, that includes the current physical address or location PA of the MD page as stored on BE non-volatile storage.

Figure 19:
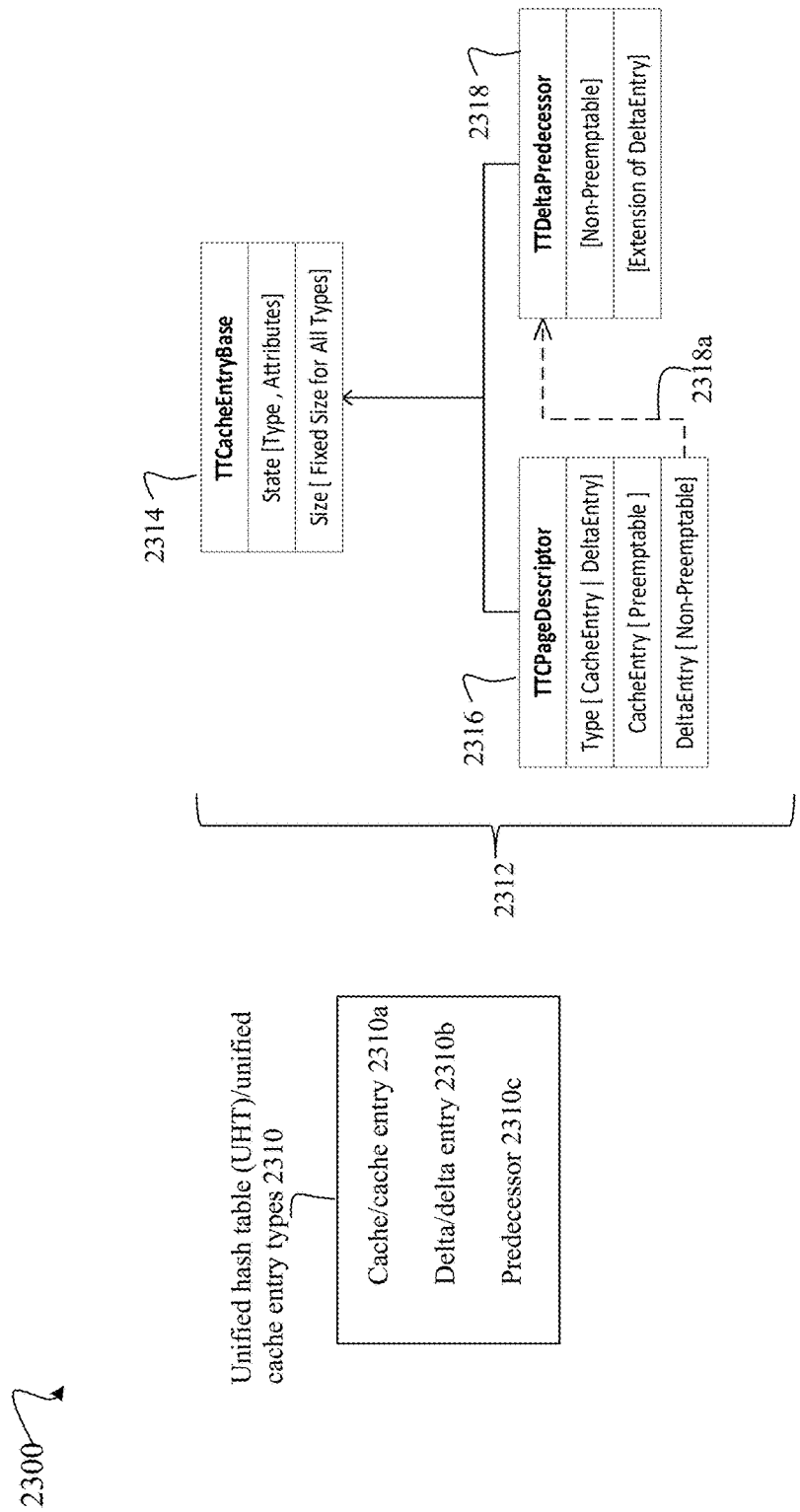

Referring to FIG. 19, shown is an example 2300 illustrating the various type of objects or types of entries that can be represented and described by an entry of the unified cache 2455 or UHT 2451 and/or frozen TT log entries 2456 in at least one embodiment in accordance with the techniques of the present disclosure.

The example 2310 indicates that in at least one embodiment, unified cache or UHT entry types (or more generally TT-related cache entries of 2457) can be one of the following types: a cache or cache entry type 2310a denoting a TT cache entry; a delta or delta entry type 2310b denoting a TT log entry included in either the in-memory active TT log or the in-memory frozen TT log; and a predecessor type 2310c denoting an extended or converted TT log entry/delta entry. In at least one embodiment, a UHT entry directly accessible in the UHT can be of the cache type or the delta type. In at least one embodiment, a UHT entry of the predecessor type may not be directly accessible in the UHT via a UHT query based on a MD page logical address. Rather in at least one embodiment, a predecessor type entry can generally be associated with another UHT entry of the delta type (denoting a TT log entry of an active or frozen TT log instance). In at least one embodiment, the frozen TT log entries 2456 that are not included in the UHT are the delta type and denote TT log entries that have become disassociated and removed from the UHT and unified cache but are not yet deallocated, freed or reclaimed for reuse from the cache 2457 since such frozen TT log entries 2456 have not yet been flushed or destaged as part of flushing or destaging the in-memory frozen TT log. In at least one embodiment, the in-memory frozen TT log can include TT log/delta entries of the UHT 2451 and thus unified cache 2455; and can also include TT log/delta entries of the frozen TT log entries 2456 which are not included in or associated with the UHT 2451 or unified cache.

In at least one embodiment, a UHT entry of the cache type can be a descriptor that represents a read-only value for the physical storage address or location of a corresponding MD page logical address. A UHT entry of the cache type can be included in the list of UHT entries denoting the TT cache entries of the TT cache 2452. In at least one embodiment, UHT entries denoting TT cache entries are preemptable.

In at least one embodiment, a UHT entry of the delta type can be descriptor representing a dirty value for the physical storage address or location or a corresponding MD page logical address. A UHT of the delta type can be non-preemptable (prior to destaging or flushing the TT log). A UHT of the delta type can be associated with one or more predecessor type entries, and can be associated with the in-memory active TT log or the in-memory frozen TT log.

In at least one embodiment, a UHT entry of the predecessor type may not be directly accessible or addressable by querying the UHT. Rather the predecessor type UHT entry can be characterized as extended or prior (in time) delta entries associated with a later in time delta type UHT entry of the TT log. Each predecessor type UHT entry associated with a delta type UHT entry (TT log entry) of the TT log can denote a prior TT log entry of an old, stale or prior MD page physical address for a MD page that was subsequently overwritten prior to destaging or flushing the TT log including the TT log entry.

The element 2312 can denote object or UHT entry types, relationships and classes in at least one embodiment in accordance with the techniques of the present disclosure. In 2312, element 2314 can denote the base object class for a UHT entry that can be instantiated with a state and size, where the state can include a UHT type as one of: a cache or cache entry, a delta or delta entry, or a predecessor (consistent with element 2310). In at least one embodiment, the size of a UHT entry or object of any allowable type can be fixed. As denoted by 2316, for the cache entry type, the object is preemptable; and for the delta entry type, the object is non-preemptable. As denoted by 2318, for the predecessor type, the object is non-preemptable and is an extension of an associated delta entry type, where the association with another delta type entry or object is denoted by the dashed arrow 2318a.

Consistent with other discussion herein, the in-memory TT log as stored in the volatile memory cache 2457 can include two instances—an active TT log instance and a frozen TT log instance—where active and frozen roles can be continually swapped therebetween, for example, in response to the active TT log instance becoming full and/or other suitable trigger condition occurring.

In at least one embodiment, each single instance of a delta entry type of UHT entry can be associated with a single instance of an active or frozen TT log.

In at least one embodiment, only a single instance of a cache entry type or delta entry type of UHT entry is directly accessible in the UHT or unified cache per MD page logical to physical address mapping. Put another way, each MD page logical address is uniquely mapped by the UHT to a single corresponding MD page physical address, where no other MD page logical address is mapped by the UHT to the same MD page physical address. Thus, querying the UHT to return a MD page physical address or location for a given MD page logical address results in locating at most a single UHT entry that maps the MD page logical address to the corresponding MD page physical address.

In at least one embodiment, cache entry type UHT entries are included in the TT cache list and are preemptable via LRU semantics based on the TT cache LRU eviction policy.

In at least one embodiment, each delta entry type UHT entry is not associated with or included on the TT cache list. Rather each delta entry type UHT entry is associated with a single instance of either an active or frozen TT log.

In at least one embodiment, the free memory pool 2458 is reduced by an amount of memory associated with each allocated UHT delta type entry until such entries are processed and returned to the free memory pool 2458. In at least one embodiment, when memory for a new UHT entry is allocated, processing can first look to the free memory pool 2458 for free memory. If the free memory pool 2458 has sufficient memory, the new UHT entry can be allocated from the free memory pool 2458. Otherwise, an existing UHT entry of type cache can be evicted from the TT cache 2452 where the memory of the evicted existing UHT can be freed and reallocated as the new UHT entry.

In at least one embodiment, a frozen UHT delta type entry included in the frozen TT log instance can be removed from the UHT 2451 if replaced by another active UHT delta type entry associated with the active TT log instance as a result of rewriting the TT entry and thus the MD page corresponding to the frozen and active UHT delta type entries.

In at least one embodiment, one or more predecessor type UHT entries can be associated with a UHT delta type entry (e.g., TT log entry) if a same MD page is rewritten multiple times to multiple different physical storage locations or addresses prior to the active TT log associated with the UHT delta type entry being frozen. In at least one embodiment, the UHT predecessor type entries can be used to track and identify the prior physical storage locations on BE non-volatile storage of MD and VLB pages that are subsequently rewritten to new physical storage locations. As discussed elsewhere herein in at least one embodiment, MD and VLB pages can be persistently stored on BE non-volatile storage in PLBs or physical large blocks. Each time a particular MD page is rewritten to a new physical location, storage of the old prior copy of the MD page can be reclaimed and reused. The predecessor type UHT entries provide a mechanism in at least one embodiment to track such prior storage locations of old stale copies of MD pages where the MD pages have been rewritten multiple times prior to the active TT log associated with such predecessor type entries being frozen. In at least one embodiment, the physical storage of old, stale or prior copies of MD pages can be reclaimed for reuse such as by garbage collection processing. For example, in at least one embodiment where MD pages are stored persistently in PLBs of BE non-volatile storage, multiple MD pages can be stored in each single PLB. As MD pages are updated and then rewritten repeatedly to the PLBs, PLBs including the old stale or prior version of the MD pages can be marked as invalid and can result in creating "holes" of both valid content (e.g., current versions of MD pages) and invalid, stale or outdated content (e.g., old, prior stale versions of MD pages) within the same PLBs. As discussed elsewhere, garbage collection processing can include a compaction or copying process whereby valid content from multiple partially filled source PLBs can be copied to a single target PLB to thereby free the multiple source PLBs. The predecessor type UHT entries can be used in at least one embodiment to facilitate tracking the storage locations of the PLBs that contain invalid content and thus can be reclaimed for reuse such as described, for example, in connection with TT log flushing or destaging 1722, 1703i, 1724 in connection with FIG. 17.

In at least one embodiment, while delta entry type UHT entries may be present on a frozen TT log instances, such entries are never directly added to a TT log once frozen.

In at least one embodiment, processing can add UHT entries to the TT cache 2452 corresponding to promoted TT cache entries.

In at least one embodiment, since processing can only add TT log entries to the in-memory active TT log but not the in-memory frozen TT log, processing can add UHT entries of the delta type corresponding to TT log entries of the in-memory active TT log but not the in-memory frozen TT log. At a later point in time, the active TT log transitions or converts to the frozen state and thus becomes the frozen TT log of frozen TT log entries.

Figure 20:
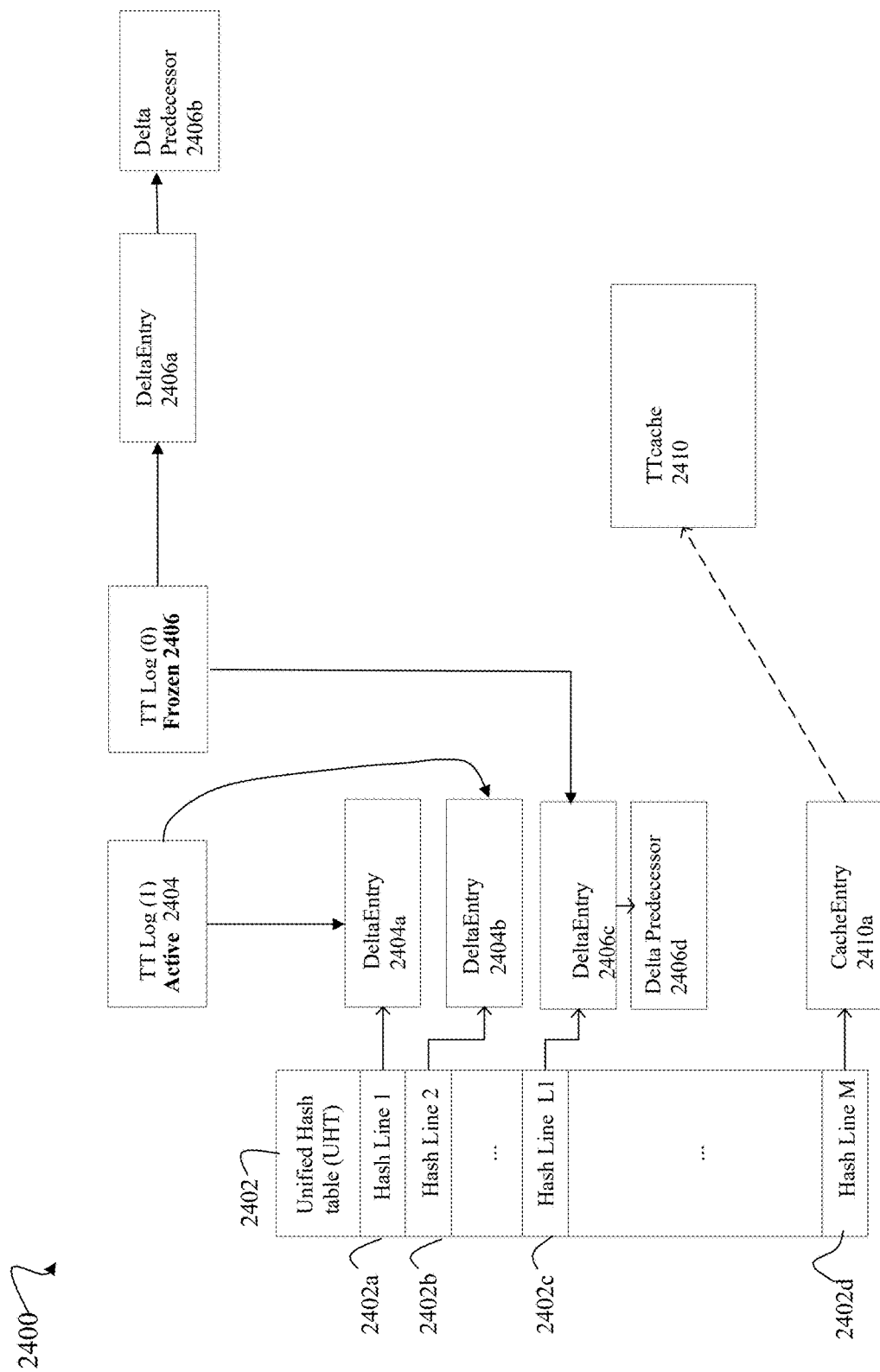

Referring to FIG. 20, shown is an example 2400 of various structures that can be included in the volatile memory cache 2457 in at least one embodiment in accordance with the techniques of the present disclosure at a point in time.

The example 2400 can denote a state of various structures of the TT cache, in-memory active TT log and in-memory frozen TT log as included in the volatile memory cache 2457 at a point in time.

The example 2400 includes the UHT 2402 with M hash lines or indices; the active TT log 2404, the frozen TT log 2406 and TT cache 2410.

Hash line 1 2402a is associated with UHT delta entry type 2404a denoting that entry 2404a represents a TT log entry of a MD page logical address LA1 that maps to UHT index 1, where the entry 2404a is a delta type entry including the physical address or location of the MD page having logical address LA1.

Hash line 2 2402b is associated with UHT delta entry type 2404b denoting that entry 2404b represents a TT log entry of a MD page logical address LA2 that maps to UHT index 2, where the entry 2404b is a delta type entry including the physical address or location of the MD page having logical address LA2.

Hash line L1 2402c is associated with UHT delta entry type 2406c denoting that entry 2406c represents a TT log entry of a MD page logical address LA3 that maps to UHT index L1, where the entry 2406c a is a delta type entry including the physical address or location of the MD page having logical address LA3. The UHT predecessor type entry type 2406d is associated with the TT log entry represented by 2406c thereby indicating that the MD page with logical address LA3, and thus corresponding TT entry, was rewritten prior to the active TT log 2404 that includes 2406c being frozen.

Hash line M 2402d is associated with UHT cache entry type 2410a denoting that entry 2410a represents a TT cache entry of a MD page logical address LA4 that maps to UHT index M, where the entry 2410a is a cache type entry including the physical address or location of the MD page having logical address LA4.

Element 2404 represents the head of the in-memory active TT log list, where 2404 is associated with UHT delta entries 2404a-2404b thereby indicating that entries 2404a-b are included in the active TT log 2404.

Element 2406 represents the head of the in-memory frozen TT log list, where 2406 is associated with UHT delta entry 2406c thereby indicating that entry 2406c is included in the frozen TT log 2406. Additionally, the frozen TT log 2406 includes delta type UHT entries 2406a-b that have been displaced or removed from the UHT. Thus, for example, elements 2406a-b can be included in the frozen TT log entries 2456 that may not be accessible using the UHT but that remain in the volatile memory cache 2457 until flushed or destaged.

Element 2410 represents the head of the TT cache list and includes UHT cache entry type 2410a. Generally, if the free memory pool 2458 has insufficient memory to fulfill a new UHT entry allocation request, processing can evict or remove a UHT cache type entry, such as 2410a, from the TT cache list 2410. Such eviction of the UHT cache type entry from the TT cache 2410 thereby frees a UHT entry that can now be reused to fulfill the new UHT entry allocation request. Generally, the element 2410 can be associated with a list of UHT cache type entries, such as 2410a, included in the TT cache 2452.

In at least one embodiment, to access a corresponding UHT entry, if any, for a MD page logical address where the UHT entry is either a TT cache entry (having the cache entry type) or a TT log entry (having the delta entry type), a single lookup or query routine can be used to query the UHT. In response, the UHT can return either the corresponding MD page physical address for the MD page logical address (if there is a unified cache or UHT hit and there exists a corresponding UHT entry); or otherwise can return nothing or null (e.g., if there is a unified cache or UHT miss and no such corresponding UHT entry directly accessible in the UHT).

In at least one embodiment, the TT log manager can maintain two instances (e.g., active and frozen instances) of the TT log, where each TT log instance includes a list of UHT delta type entries added to the UHT and unified cache while the TT log instance had the active role (e.g., since in such an embodiment UHT delta type entries can only be added to a TT log when it has the active role). In at least one embodiment, the TT log list can directly include a TT entry denoting a physical address or location of a MD page having a MD page logical address mapped by the TT entry. As needed, one or more predecessor type UHT entries can be associated with a TT log entry denoted by a UHT delta type entry of a TT log, where such predecessor type UHT entries track the history of changes made to the TT entry prior to the corresponding TT log being frozen and flushed or destaged (e.g., the same MD page can be rewritten multiple times to BE non-volatile storage resulting in multiple TT log entries for the same MD page's TT entry being added to the currently active TT log prior to the currently active TT log being frozen and flushed. The most recent TT log entry can be included in the TT log as a delta type entry and each prior (in time) TT log entry can be a predecessor type entry associated with the most recent TT log entry).

In at least one embodiment, both the active and frozen instances of the TT log can be tracking instances of the same TT entry for the same MD page logical address. In this case a frozen TT entry instance was overwritten by an active TT entry instance for the same MD page logical address where the TT entry instance associated with the frozen TT Log will have been removed from the UHT and unified cache 2455.

In at least one embodiment, upon the occurrence of a trigger condition, the roles of the active and frozen TT logs can switch. For example, one such trigger condition can be when the currently active TT log is deemed full or reaches a specified size, number of entries, and the like, whereby the currently active TT log becomes frozen and can be destaged or flushed, and whereby the currently frozen TT log (that has already been destaged or flushed) now becomes active. In at least one embodiment using the UHT, transitioning roles or states of the two TT log instances from active to frozen and frozen to active can be represented by changing a corresponding attribute of the particular TT log instance. For example with reference to the example 2400, if the active TT log 2404 becomes full and transitions to frozen, an attribute at the list-level of the element 2404 can be updated to denote that the TT log 2404 is frozen whereby all entries of the TT log 2404 list are also now frozen. In a similar manner with reference to the example 2400, if the currently frozen TT log 2406 transitions to active, an attribute at the list-level of the element 2406 can be updated to denote that the TT log 2406 is active and, subsequent to TT log 2406 becoming active, new UHT delta type entries are then added to the currently active TT log 2406. It should be noted that while a TT log instance such as 2406 is frozen, the entries of the TT log list 2406 can be destaged or flushed. Subsequently in at least one embodiment, the flushed UHT delta type entries of the frozen TT log 2406 can be converted to TT cache entries, where such converting can include: removing the flushed UHT delta type entries from the frozen TT log list; reformatting or updating the flushed UHT delta type entries as TT cache entries; and then adding the newly reformatted TT cache entries to the TT cache list of 2410. Additionally, any predecessor type entries of the frozen TT log can be reclaimed and added to the free memory pool 2458 once such predecessor entries are processed in connection with TT log destaging or flushing. For example, in at least one embodiment, such predecessor entries can be processed as part of destaging or flushing such entries from the frozen TT log for storage or space accounting and storage reclamation of old copies or prior non-current versions of MD pages persistently stored on BE non-volatile storage. Consistent with discussion herein, each prior non-current version of a MD page can be stored at a physical storage location on BE non-volatile storage identified by a corresponding predecessor type entry of a TT log instance. When the TT log instance is frozen and its entries flushed or destaged, any predecessor type entries of the frozen TT log instance can be used to identify a physical storage location or area of BE non-volatile storage containing stale or invalid content and can be reclaimed for subsequent reuse and, for example, further processed by garbage collection such as discussed elsewhere herein.

What will now be described are flowcharts of processing steps that can be performed in at least one embodiment in accordance with the techniques of the present disclosure in connection with the UHT and unified cache.

Figure 21:
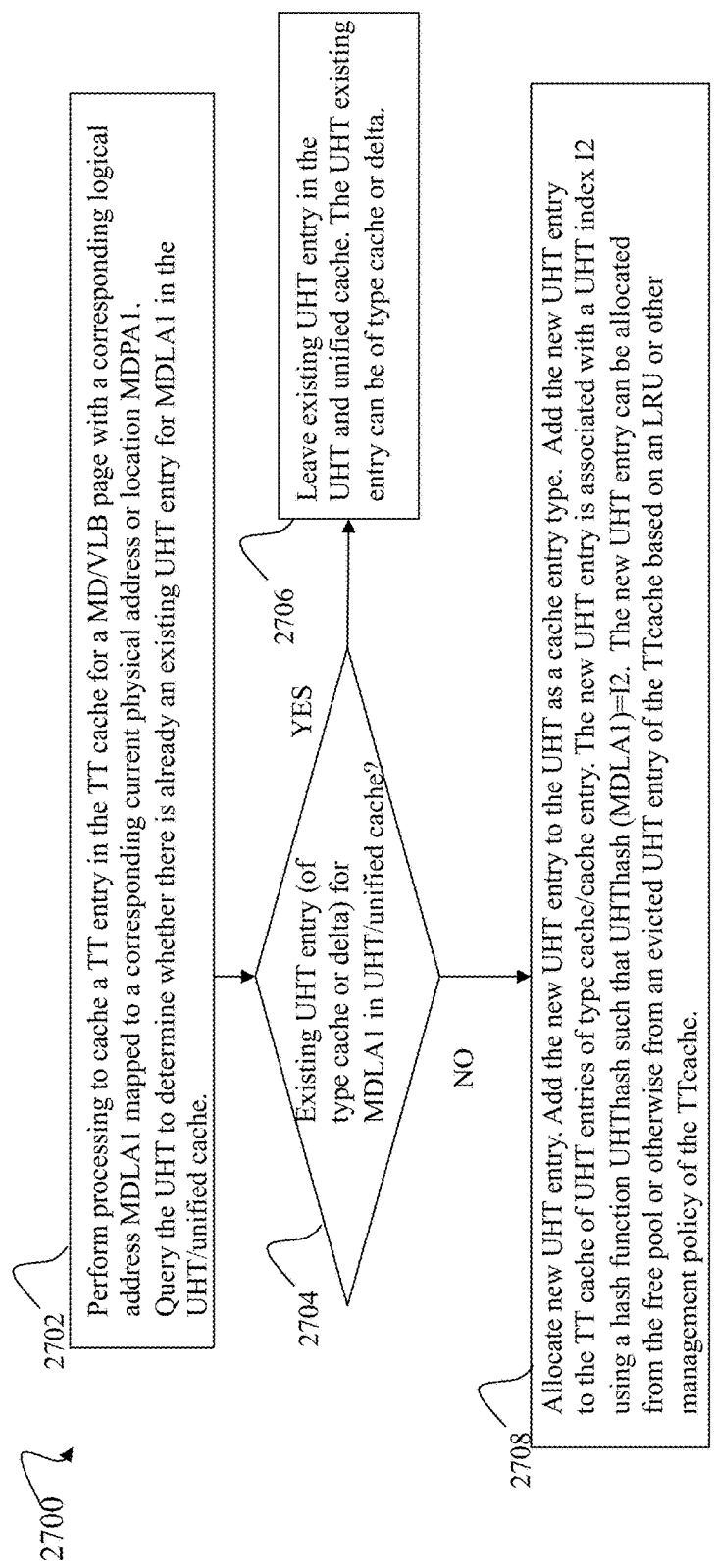

Referring to FIG. 21, shown is a flowchart 2700 of processing steps that can be performed in connection with adding a cache type entry to the UHT in at least one embodiment in accordance with the techniques of the present disclosure.

At the step 2702, a workflow can include performing processing to cache a TT entry in the TT cache for a MD or VLB page with a corresponding logical address MDLA1 mapped to a corresponding current physical address or location MDPA1. The UHT can be queried to determine whether there is already an existing UHT entry for MDLA1 in the UHT and unified cache. From the step 2702, control proceeds to the step 2704.

At the step 2704, in accordance with the UHT query of step 2702, a determination is made as to whether there is an existing UHT entry of type cache or delta for MDLA1 in the UHT and thus unified cache. If the step 2704 evaluates to yes, control proceeds to the step 2706. At the step 2706, the existing UHT entry can remain as is in the UHT and unified cache. The existing UHT entry mapped to MDLA1 can be of type cache or delta. If the step 1706 evaluates to no, control proceeds to the step 2708. At the step 2708, a new UHT entry can be allocated. The new UHT entry can be added to the UHT as a cache entry type. The new UHT entry can be added to the TT cache of UHT entries of type cache. The new UHT entry is associated with UHT index 12 using a hash function UHThash such that UHThash (MDLA1)=I2. The new UHT entry can be allocated from the free pool 2458 or otherwise from an evicted UHT entry of the TTcache based on an LRU or other management policy of the TTcache. The new UHT entry mapped to MDLA1 is updated to indicate that the current physical address or location of the MD/VLB page with MDLA1 is MDPA1.

Figure 22:
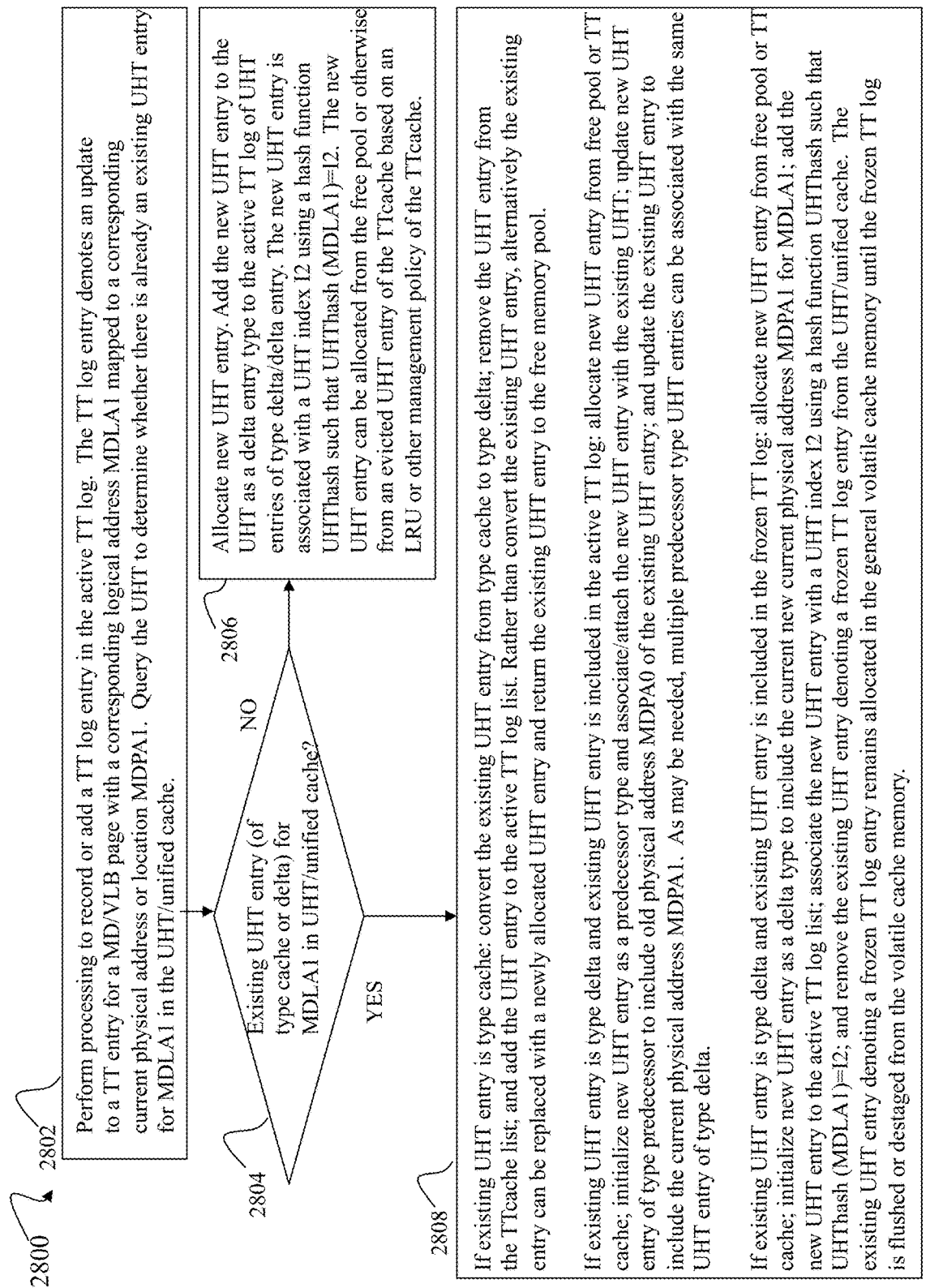

Referring to FIG. 22, shown is a flowchart 2800 of processing steps that can be performed in connection with adding an active TT log entry to the active TT log instance, where such TT log entry is also added to the UHT and unified cache in at least one embodiment.

At the step 2802, a workflow can include performing processing to add or record a TT log entry in the active TT log. The TT log entry denotes an update to a TT entry for a MD/VLB page with a corresponding logical address MDLA1 mapped to a corresponding current physical address or location MDPA1. Processing can include querying the UHT to determine whether there is already an existing UHT entry for MDLA1 in the UHT/unified cache. From the step 2802, control proceeds to the step 2804.

At the step 2804 in accordance with the UHT query of the step 2802, a determination is made as to whether there is an existing UHT entry (of type cache or delta) for MDLA1 in the UHT and thus in the unified cache. If the step 2804 evaluates to no, control proceeds to the step 2806. At the step 2806, processing can include allocating a new UHT entry. The new UHT entry can be added to the UHT as a delta entry type and added to the active TT log of UHT entries of type delta. The new UHT entry is associated with a UHT index 12 using a hash function UHThash such that UHThash (MDLA1)=I2. The new UHT entry can be allocated from the free pool or otherwise from an evicted UHT entry of the TTcache based on an LRU or other management policy of the TTcache.

If the step 2804 evaluates to yes, control proceeds to the step 2808. In the step 2808, if the existing UHT entry is type cache: convert the existing UHT entry from type cache to type delta; remove the UHT entry from the TTcache list; and add the UHT entry to the active TT log list. The existing UHT entry mapped to MDLA1 is updated to indicate that the current physical address or location of the MD/VLB page with MDLA1 is MDPA1. Rather than convert the existing UHT entry, alternatively the existing entry can be replaced with a newly allocated UHT entry and return the existing UHT entry to the free memory pool. The newly allocated UHT entry can be processed in a manner similar to the existing UHT entry (e.g., the newly allocated UHT entry mapped to MDLA1 can be initialized as a delta type entry and updated to indicate that the current physical address or location of the MD/VLB page with MDLA1 is MDPA1.

In the step 2808, if the existing UHT entry is type delta and the existing UHT entry is included in the active TT log: allocate a new UHT entry from the free memory pool or TT cache; initialize the new UHT entry as a predecessor type and associate or attach the new UHT entry with the existing UHT entry (located in response to the query); update the new UHT of type predecessor to include the old physical address MDPA0 of the existing UHT entry; and update the existing UHT entry to include the current physical address MDPA1. As may be needed, multiple predecessor type UHT entries can be associated with the same UHT entry of type delta.

In the step 2808, if the existing UHT entry is type delta and the existing UHT entry is included in the frozen TT log: allocate a new UHT entry from free pool or TT cache; initialize the new UHT entry as a delta type to include the current new current physical address MDPA1 for MDLA1; add the new UHT entry to the active TT log list; associate the new UHT entry with a UHT index 12 using a hash function UHThash such that UHThash (MDLA1)=I2; and remove the existing UHT entry denoting a frozen TT log entry from the UHT/unified cache. The existing UHT entry denoting a frozen TT log entry remains allocated in the general volatile cache memory until the frozen TT log is flushed or destaged from the volatile cache memory.

In at least one embodiment, a TT log entry can be added to the active TT log in one or more workflows that result in storing a current version of a MD page in a new physical location or address on BE non-volatile storage. For example, as discussed herein, a MD page can be written or moved to a new physical storage location as a result of flushing the MD log and applying MD log updates to the MD page and then storing an updated version of the MD page at a new physical location. As another example, the MD page can be moved or relocated on BE physical storage as part of garbage collection including consolidating valid content from multiple source PLBs into a single target PLB as discussed elsewhere herein.

In at least one embodiment, the TT log manager can be a component that maintains the two instances of the TT log, where as discussed herein, the roles of the instances can alternate or switch between active and frozen. The TT log manager can process the frozen TT log instance such as for destaging the TT log entries of the frozen TT log instances, while new TT log entries are added into the active TT log instance.

Each TT log instance can generally maintain a list of TT log entries added while the TT log instance is in the active state. In at least one embodiment, a TT log instance can include the list of TT log entries, where the list can be further subdivided into sub-lists where each sub-list corresponds to a different contiguous region or portion of the TT as persistently stored on physical non-volatile storage.

Figure 23:
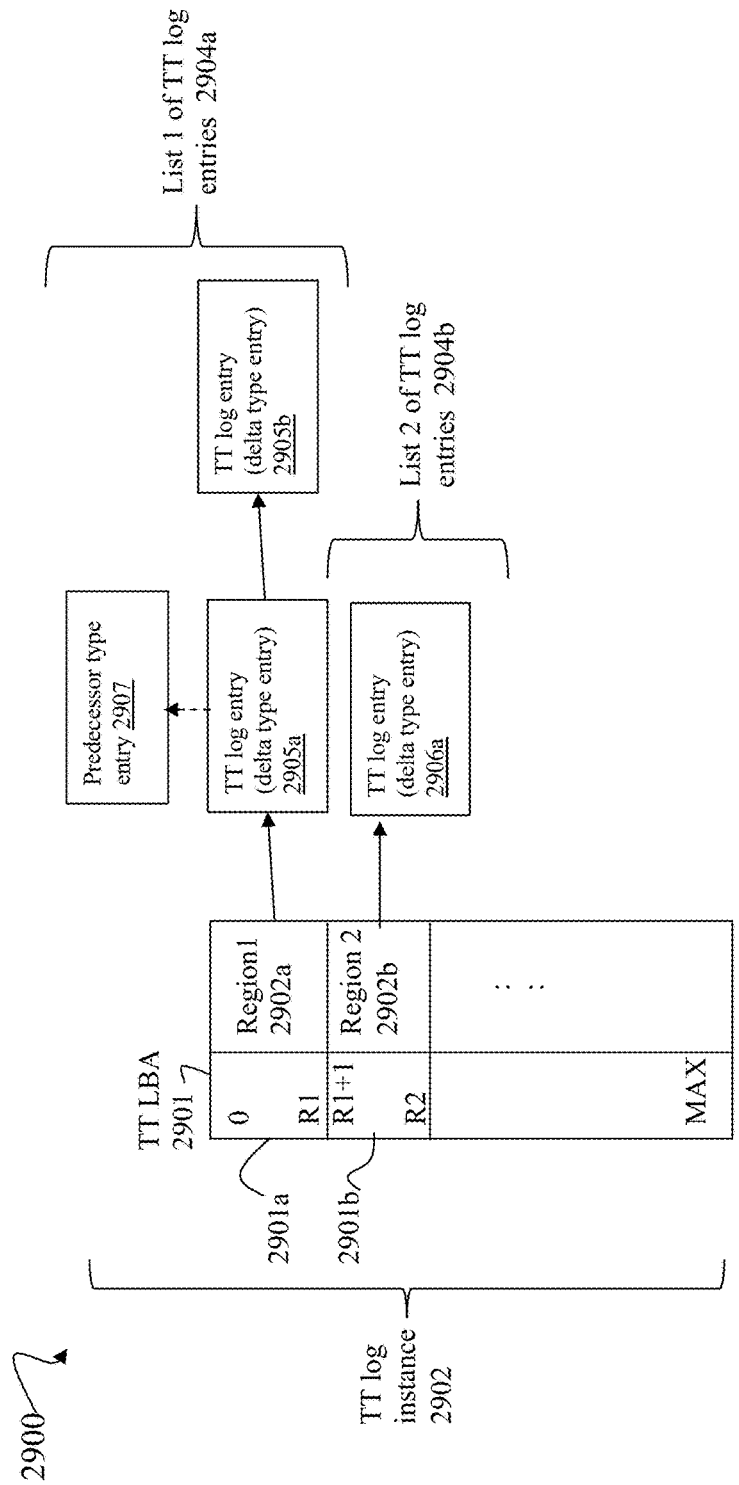

Referring to the example 2900 of FIG. 23, shown is an example illustrating further detail regarding a TT log instance 2802 in at least one embodiment in accordance with the techniques of the present disclosure.

The example 2900 includes a representation of a TT log instance 2902 having its TT log entries partitioned on a region by region basis. Element 2901 can denote the contiguous address range of the TT from a starting LBA or offset 0 to an ending LBA or offset MAX. The LBA or offset range denoted by 2901 can correspond to the address or offset range of the TT as stored on BE non-volatile storage. As discussed herein (e.g., FIG. 14), the TT address range can be partitioned into consecutive regions where each region denotes a contiguous subrange of the TT address range. In at least one embodiment, the TT address range can denote a contiguous physical address range where the TT is stored on BE non-volatile storage, where each subrange of a single region can also denote a contiguous physical address range, and where the regions can have an associated consecutive contiguous order corresponding to the collective TT address range such that if the regions are traversed in the order, the entire TT address range is thereby traversed in sequential consecutive order. For example, region 1 2902a can correspond to the subrange 2901a from LBA 0 to LBA R1, region 2 2902b can correspond to the subrange 2902b from LBR1+1 to R2, and so on. Each of the regions Rn can have an associated sublist of TT log entries denoting updates or modifications to TT entries having associated addresses or locations in corresponding region Rn, where Rn denotes a region of the TT as stored on BE non-volatile storage. For example, element 2904a can be a list1 of TT log entries denoting updates made to addresses or locations of TT entries included in region 1 2902a; element 2904b can be a list2 of TT log entries denoting updates made to addresses or locations of TT entries included in region 2 2902b; and so on.

In at least one embodiment, each of the lists or sublists of TT log entries associated with a corresponding TT region can include UHT delta type entries in a linked list. Each of the delta type entries of a list 2904a-b can be further associated with one or more UHT predecessor type entries denoting the history of repeated rewrites of a MD page corresponding to the delta type entry. For example, the list 2904a can include TT log entries 2905a-b, where the TT log entry 2905a can be further associated with a predecessor type entry 2907. The list 2904b can include TT log entry 2906a. In such an embodiment, when a TT log entry that updates a TT entry E44 of the TT is added to the TT log instance 2902 while active, the TT log entry can be added to the corresponding per region list or sublist of TT log entries based on the particular region including the entry E44 (e.g., the particular region including the location or address of E44 within the range from 0 to MAX). For example, TT log entry 2905a can represent an update to the TT entry E44 if E44 has a corresponding address, location or offset O1 in the TT address range, where O1 falls within the particular subrange from 0 to R1 associated with region 1 2902a.

In at least one embodiment using multiple cores assigned to process particular ones of the TT log entries, each of the sublists or lists per region can be further subdivided by core. More generally, the collective list of TT log entries of a single TT log instance can be partitioned into various sublists based, at least in part, in one or more of the number of regions, and the number of cores processing TT log entries.

In at least one embodiment, prior to destaging a region, the list(s) or sublist(s) of TT log entries associated with the particular region can be sorted based in LBA or location order within the TT log address space (e.g., 0 through MAX).

In at least one embodiment, TT regions can be defined by the size of the staging memory buffer used to store the version of the TT region as read from non-volatile storage to which updates of TT log entries are applied to generate a new updated version of the TT region of TT entries.

In at least one embodiment, regions can be determined when the instance of a TT log becomes active. In at least one embodiment, different TT log instances can have varying numbers of regions and can vary in size.

In at least one embodiment, TTs can include a MD TT and a VLB TT, where the MD TT is used for translating logical addresses of MD pages including top, mid and leaf pages to corresponding physical addresses or locations, and where the VLB TT is used for translating logical addresses of VLBs to corresponding physical addresses or locations. In at least one embodiment, top, mid and leaf MD pages can be stored in a MD TT Tier of BE non-volatile storage, and VLB pages can be stored in a VLB TT Tier of non-volatile storage. In at least one embodiment, a TT log can be used that includes collective updates to TT entries of both the VLB TT and the MD TT. Alternatively in at least one embodiment, separate TT logs can be managed and maintained including a VLB TT log of recorded VLB updates and a MD TT log of recorded updates to top, mid and leaf MD pages. Thus although some examples and discussion of the techniques described herein may generally reference a TT log including a frozen TT log instance and an active TT log instance, and the like, more generally the techniques can be applied for use in embodiments with a separate VLB TT log (including frozen and active instances) and a separate MD TT log (including frozen and active instances) as well as a single TT log (including frozen and active instances). Similarly although discussion herein can segregate BE nonvolatile storage used for the VLB TT log and MD TT log into separate respective TT tiers, an embodiment can alternatively collectively store both TTs in a same tier on non-volatile storage. In any case in at least one embodiment, when destaging a frozen TT log including TT entry updates to both the VLB TT and MD TT, such updates can be sorted such that relevant VLB TT updates are applied to the VLB TT on non-volatile storage (e.g., VLB TT tier) and relevant MD TT updates are applied to the MD TT on non-volatile storage (e.g., MD TT Tier).

Examples in the following discussion may generally refer to a TT log, frozen TT log or active TT log such as in connection with an embodiment that collective stored VLB TT updates and MD TT updates in the same TT log. In embodiments having separate VLB and MD TT logs, the techniques described with reference to the general TT log can also be applied individually to each of the VLB TT log and MD TT log.

Figure 24:
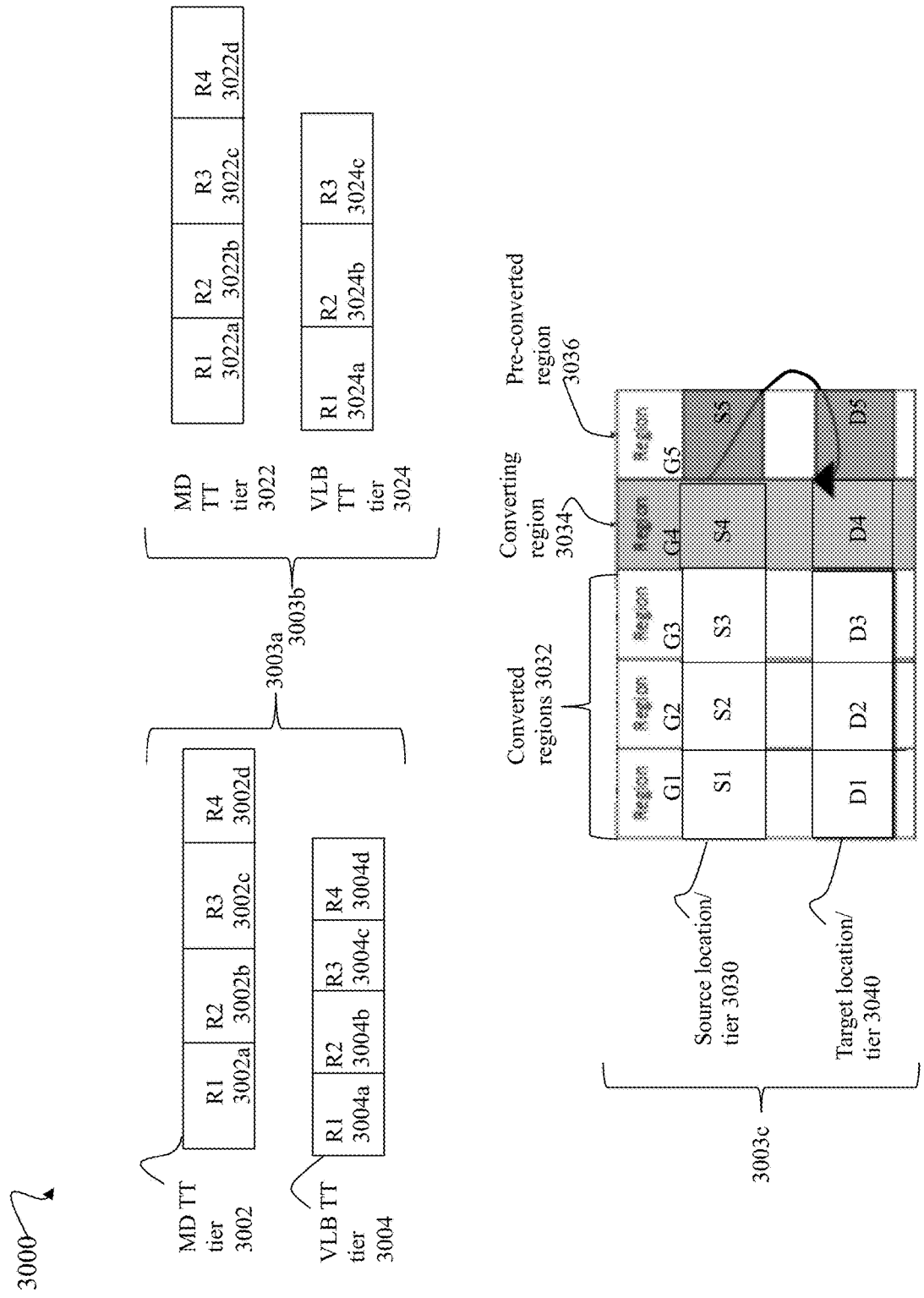

Referring to FIG. 24, shown is an example 3000 illustrating how TTs can be partitioned into regions and processed in at least one embodiment in accordance with the techniques of the present disclosure.

As illustrated by element 3003a, at least one embodiment can specify that each of the VLB and MD TTs as stored on non-volatile storage have the same number of regions N, such as N=4 regions. In this case, the MD TT tier 3002 storing the MD TT can be partitioned into 4 regions 3002a-d and the VLB TT tier 3004 storing the VLB TT can be partitioned into 4 regions 3004a-d. In at least one embodiment, within the VLB TT tier or for a single VLB TT, each region can be the same size. In at least one embodiment, within the MD TT tier for a single MD TT, each region can be the same size. As illustrated by 3003a in this example, the respective sizes of the MD TT and VLB TT stored respectively in the MD TT tier 3002 and the VLB TT tier 3004 can vary. For example as in 3003a, the size of the MD TT can be larger than the size of the VLB TT. In the scenario 3003a where both the MD TT and the VLB TT have the same number of regions but vary in respective sizes, the size of each region of the MD TT in the MD TT tier 3002 can be larger than the size of each region of the VLB TT in the VLB tier 3004.

As a variation to partitioning both the VLB TT of the VLB TT tier 3004 and the MD TT of the MD tier 3002 into the same number of N regions, an embodiment can alternatively choose to specify a fixed region size SIZE1. In this latter scenario as illustrated by 3003b, each of the VLB and MD TTs can be partitioned into varying numbers of regions each of the same size, SZ1. In the example 3003b where the total size of the MD TT of the MD TT tier 3022 is larger than the total size of the VLB TT of the VLB TT tier 3024, the MD TT can be partitioned into 4 regions 3022a-d each of the same size SZ1; and the VLB TT can be partitioned into 3 regions 3024a-c each of the same size SZ1.

Consistent with discussion herein in at least one embodiment, destaging or flushing of the TT log can include swapping the roles of active and frozen between the two in-memory TT log instances to start a new active TT log used for recording subsequent TT entry updates while the frozen TT log of TT entries is destaged or flushed. In at least one embodiment, the destaging of the frozen TT log entries can be performed on a per region basis such as described, for example, in connection with FIG. 14, where regions of the TT are processed in consecutive contiguous sequential order based on their relative locations, such as physical storage locations, in the persisted source location. Destaging TT log entries for a region can include: reading the current version of the region from a source location or region of non-volatile storage into a buffer; applying relevant updates of the TT log to TT log entries as stored in the buffer to generate a revised version of the region; and storing or writing out the revised version of the region from the buffer to a target location or region on non-volatile storage.

In at least one embodiment, each region can be a physically contiguous portion of the TT as stored on non-volatile storage (e.g., as in one of the TT tiers). Thus in such an embodiment, the sequential ordering and processing of the regions of a persisted TT of the TT tier during TT log destage can correspond to sequentially processing consecutive physically contiguous regions in order based on either increasing or decreasing physical storage locations. For example with reference back to FIG. 14 and discussion above, at a point in time Tn when destaging a frozen TT log instance, TT1 2206 is the source location and TT2 2208 is the target location where regions can be processed in increasing region number of ID (identifier) corresponding to increasing contiguous physical storage locations of the source and target locations. At a next consecutive subsequent point in time Tn+1 when destaging another frozen TT log instance, TT2 2208 is the source location and TT1 2206 is the target location where regions can be processed in increasing region number of ID (identifier) corresponding to increasing contiguous physical storage locations of the source and target locations; or alternatively where regions can be processed in decreasing region number of ID (identifier) corresponding to decreasing contiguous physical storage locations of the source and target locations.

During TT log destage, each region of the TT can be characterized as being in 1 of the following 3 states: converted, pre-converted or converting.

In at least one embodiment, a region Ri in the converted state has had all relevant frozen deltas or TT entry updates of the frozen TT log (being destaged) applied to a corresponding existing version of Ri as read from a source location. In at least one embodiment, a region Ri is in the converted state if: an existing version of Ri has been read from a source location or region into a buffer or cache location; relevant TT entry updates have been applied to the existing version in the buffer to generate a revised version of region Ri; and the complete revised version of region Ri has been written out to a target location or region. In at least one embodiment, if a region Ri is in the converted state and there is a read request to read the current version of a TT entry from the persisted region Ri from BE non-volatile storage, the read request can read the TT entry from the target location or region. The foregoing read request can be, for example, due to a read cache miss of the MD page where the MD page and its corresponding TT entry are generally not located in cache. As a result, the corresponding TT entry for the MD page can be read from the target location or region of non-volatile storage; the physical address or location PA1 of the MD page can be obtained from the corresponding TT entry; the MD page can be read from PA1 and returned in response to the read request.

In at least one embodiment, a region Ri in the pre-converted state is one in which no relevant frozen deltas or TT entry updates of the frozen TT log have yet been applied to region Ri. Put another for a region Ri in the pre-converted stage, no relevant frozen deltas or TT entry updates of the TT log have yet been flushed or destaged from the frozen TT log. In at least one embodiment, if a region Ri is in the pre-converted state and there is a read request to read the current version of a TT entry from the persisted region Ri from BE non-volatile storage, the read request can read the TT entry from the source location or region including the current version of the region Ri before any frozen TT log updates have been applied the region Ri.

In at least one embodiment, a region Ri in the converting state is one that is currently in the process of being converted such that processing has commenced, but not completed, for applying relevant frozen deltas or TT entry updates of the frozen TT log to the region Ri and for writing out a revised version of the region Ri to the target location. Put another region Ri is converting if some but not all relevant frozen deltas or TT entry updates of the frozen TT log have been flushed/destaged from the frozen TT log and applied to the region Ri. Thus if a complete revised version of the region Ri with all relevant frozen TT log entries/updates applied has not yet been written out to the target location, but at least some relevant frozen TT log entries have been flushed and applied to the source version of the region Ri, the region Ri can be in the converting state. In at least one embodiment, if a region Ri is in the converting state and there is a read request to read the current version of a TT entry from the persisted region Ri from BE non-volatile storage, the read request can read the TT entry from the source location or region including the current version of the region Ri as before any frozen TT log updates have been applied the region Ri. Since conversion of the region Ri is active and ongoing, the target location for region Ri can be in the process of being updated or written to. As a result in at least one embodiment to avoid contention, the source location of the current version of region Ri (as before any TT log updates of the currently frozen TT log are applied) can be used to service any read requests to read TT entries of the region Ri in the converting state. In at least one embodiment, once the revised version of region Ri has been fully copied to the target location and the region transitions from the converting state to the converted state, read misses are directed to the target location consistent with discussion above regarding the converted state.

With reference to element 3003c of FIG. 24, shown is an example illustrating the states of various regions at a point in time during TT log destaging of a frozen TT log instance in at least one embodiment in accordance with the techniques of the present disclosure.

The example 3003c illustrates an example of a frozen TT log destage where the TT includes 5 physically contiguous regions G1-G5 of a TT. In 3003c, regions G1, G2 and G3 are in the converted state 3032; region G4 is in the converting state 3034; and region G5 is in the pre-converted state 4046. Generally, in the example 3003c, TT log destaging for each of the regions G1-G5 includes reading a current version of the respective region from a source location of the source tier 3030 into a buffer; applying the relevant TT entry updates from the frozen TT log to the current version of the region in the buffer to generate an updated version of the region; and then storing the updated version of the region from the buffer to a corresponding target location in the target tier 3040. For example, S1 and D1 respectively denote the source location and target location of region G1; S2 and D2 respectively denote the source location and target location of region G2; S3 and D3 respectively denote the source location and target location of region G3; S4 and D4 respectively denote the source location and target location of region G4; and S5 and D5 respectively denote the source location and target location of region G5. If a read request to read a TT entry included in the physical location ranges of any of regions G1-G3 occurs when the TT log destage is in the state as in the example 3003c, the respective region's target location in the target tier 3040. If a read request to read a TT entry included in the physical location ranges of any of regions G4 and G5 occurs when the TT log destage is in the state as in the example 3003c, the respective region's source location in the source tier 3030.

In at least one embodiment, when destaging the next frozen TT log instance subsequent to destaging a current frozen TT log instances as in 3003c, the role or designation of locations/tiers 3030, 3040 as source and target can be swapped such that, for example, each of the target locations Di of 3040 for a corresponding region now serve as the source to which TT log updates are applied, and where each of the source location Si of 3030 now serve as the target where the revised versions of regions are stored. In at least one embodiment, the foregoing roles or designation of locations in 3030 and 3040 alternating as source and target locations can be performed in an ongoing manner as each next frozen TT log instance is destaged.

Figure 25:
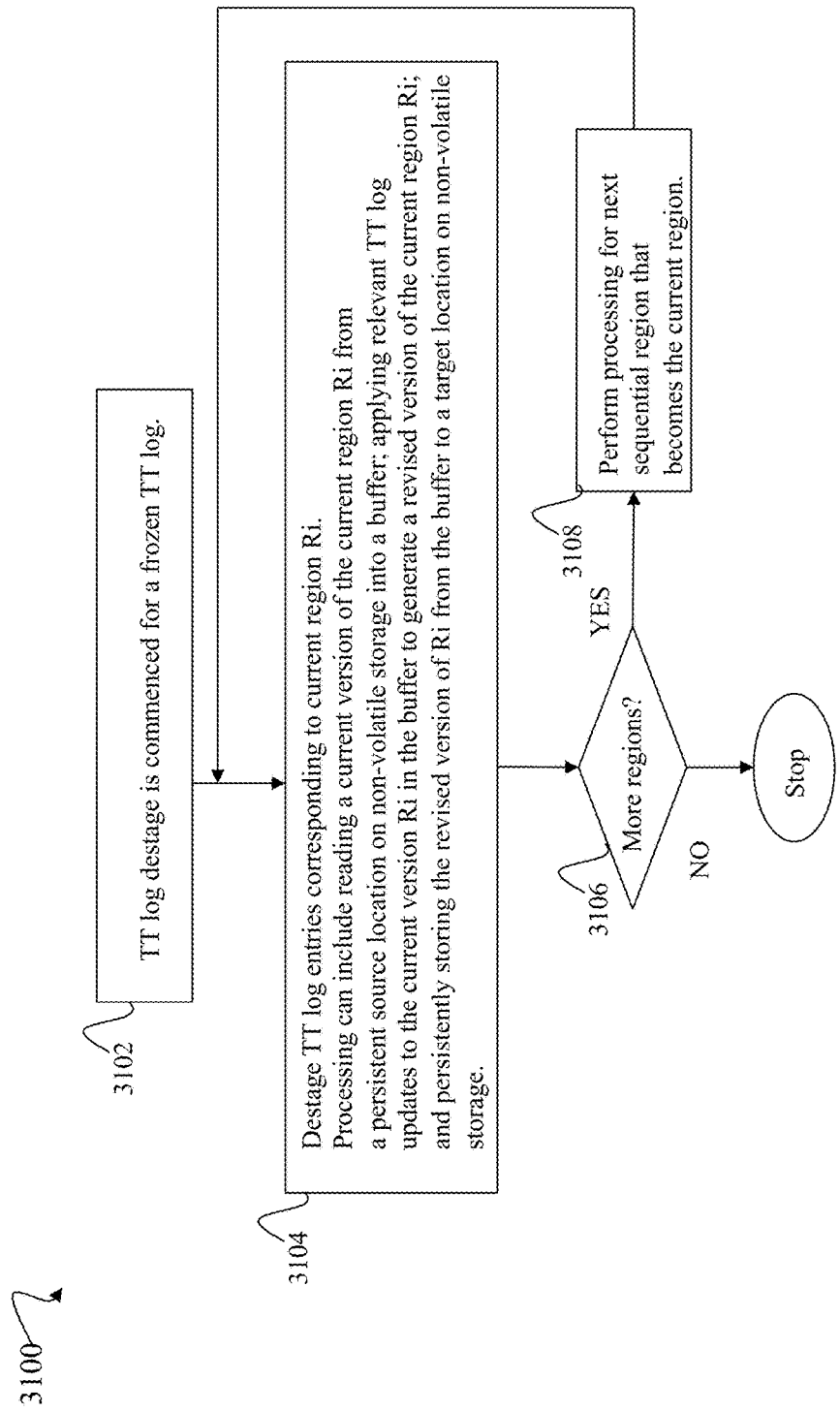

Referring to FIG. 25, shown is a flowchart 3100 of high level processing that can be performed in connection with destaging a frozen TT log in at least one embodiment.

At the step 3102, the TT log destage is commenced for a frozen TT log. From the step 3102 control proceeds to the step 3104.

At the step 3104, TT log entries can be destaged from the frozen TT log for a current region Ri. At the commencement of destaging, "i" can denote the index or ID of the first region for which TT log destaging is performed. Processing of the step 3104 can include reading a current version of the current region Ri from a persistent source location on non-volatile storage into a buffer; applying relevant TT log updates to the current version Ri in the buffer to generate a revised version of the current region Ri; and persistently storing the revised version of Ri from the buffer to a corresponding target location on non-volatile storage. Once processing of the current region is complete, control proceeds from the step 3104 to the step 3106.

At the step 3106, a determination is made as to whether there are more regions of the TT to process. If step 3106 evaluates no, processing can stop. Otherwise if the step 3106 evaluates to yes, control proceeds to the step 3108 where processing commences for the next consecutive sequential region that now becomes the current region. For example, if "i" denotes the current region for which destaging has just completed, the next region "i+1" can now become the current region to be processed. From the step 3108, control proceeds to the step 3104.

Figure 26:
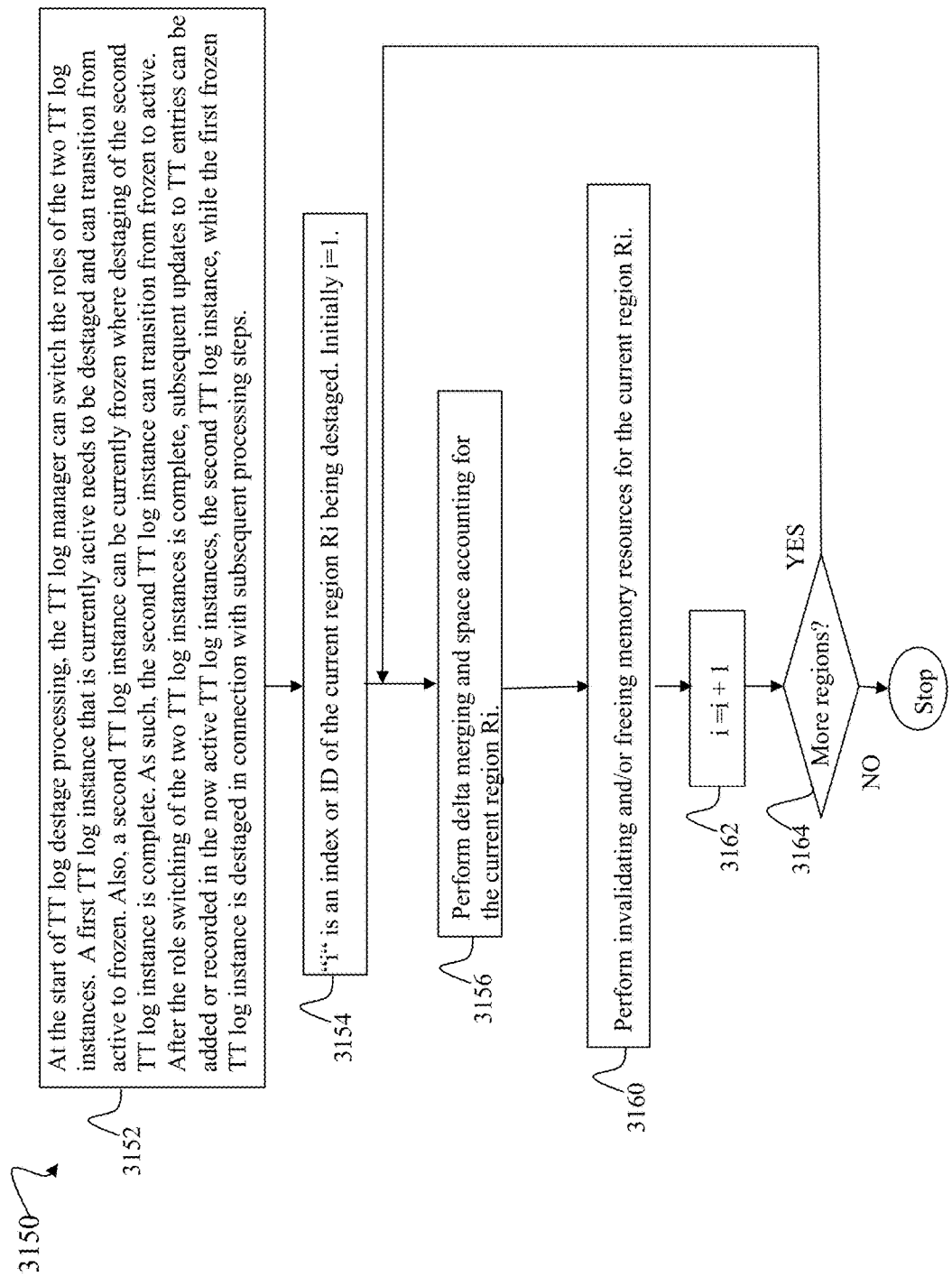

Referring to FIG. 27, shown is a flowchart 3150 of processing steps that can be performed in at least one embodiment in accordance with the techniques of the present disclosure. The steps of 3150 provide further detail regarding the frozen TT log destaging of FIG. 26.

At the step 3152, at the start of TT log destage processing, the TT log manager can switch the roles of the two TT log instances. A first TT log instance that is currently active needs to be destaged and can transition from active to frozen. Also, a second TT log instance can be currently frozen where destaging of the second TT log instance is complete. As such, the second TT log instance can transition from frozen to active. After the role switching of the two TT log instances is complete, subsequent updates to TT entries can be added or recorded in the now active TT log instances, the second TT log instance, while the first frozen TT log instance is destaged in connection with subsequent processing steps. Destaging the now frozen TT log instance can be performed per region or on a region by region basis, where regions are sequentially and consecutively processed based on increasing or decreasing LBA or offset ordering within the TT address range from 0 to MAX. In at least one embodiment, destaging TT log entries of a single TT log region can further include 3 phases or operations: delta merging, space accounting, and invalidating and/or freeing memory resources. From the step 3152, control proceeds to the step 3154.

At the step 3154, the index or ID "i" can denote the current region Ri being destaged. Initially i=1. From the step 3154, control proceeds to the step 3156.

At the step 3156, delta merging and space accounting can be performed for the current region Ri. Consistent with other discussion herein (e.g., in connection with FIGS. 14 and 24), in the phase of delta merging for a region, a source version of the region can be read from a source tier or location in the BE non-volatile storage into a staging buffer; updates or changes denoted by frozen TT log entries for the region applied to the staging buffer; and then the staging buffer (now including the updated version of the region) can be written to the same region (e.g., same LBA or offset sub-range corresponding to the region) in a target tier or location. In at least one embodiment, a bookmark indicating that delta merging has commenced for a region can be persisted to denote a state of destage processing with respect to a region and/or a bookmark for a region can be persisted to denote that delta merging has completed for the region. For recovery processing, bookmarks can be read from the persistent storage to denote the state of destage processing and where, if the system failed or went offline prior to successfully completing commenced delta merging for a region as determined in accordance with persisted bookmarks, recovery processing can restart delta merging for the region at the beginning of a region. Thus, for example, if the system fails or goes offline when delta merging for region K has commenced but not completed, subsequent recovery processing performed in subsequent rebooting can restart delta merging for region K based on the persisted bookmarks.

In at least one embodiment during the delta merging phase of step 3156 for the region, processing can be performed to invalidate or mark as free BE non-volatile storage locations storing old or stale prior versions of MD pages that have been rewritten to new physical storage locations in BE non-volatile storage. In at least one embodiment, such BE non-volatile physical storage locations of old or stale prior versions of MD pages can be determined by examining the predecessor entries, if any, associated with TT log entries (e.g., delta entries) of the region. For example, BE non-volatile physical storage denoted by the predecessor entry 2406*d* of the example 2400 of FIG. 20 can be marked as invalid, free and can be reclaimed for reuse such as, for example, in connection with garbage collection.

In at least one embodiment where TT log entries are processed in increasing LBA or offset order within the TT address space, a bookmark can be persisted identifying LBAs or offsets for which space accounting has been successfully completed. If the system fails or goes offline when performing space accounting for a region, subsequent recovery processing can resume space account for the region at the LBA or offset subsequent to the last successfully processed LBA or offset for which space accounting was successfully performed based on the persisted bookmarks. In at least one embodiment, space accounting of the step 3156 can include updating MD PLB descriptors such as described in connection with element 1724 with decref processing of FIG. 17. Use of the bookmarks in at least one embodiment can prevent recovery processing from performing a second decref for a single predecessor entry for which a first decref was already performed prior to a system failing or going offline in order to avoid improper space accounting.

In at least one embodiment, delta merging for a region can include identifying or marking those BE non-volatile storage locations of old, stale prior versions of MD pages. During space accounting, processing can include performing decref processing as denoted by 1724 of FIG. 17 to update reference counters, and possibly other information, associated with PLBs of BE non-volatile storage, where such a reference counter can identify a number of valid instances (e.g., valid MD pages) stored within a corresponding PLB.

From the step 3156, control proceeds to the step 3160 where processing can be performed to invalidate and/or free memory resources for the current region Ri.

In at least one embodiment using the unified cache and UHT, invalidating and/or freeing memory resources can include returning any predecessor entries of the frozen TT log associated with the current region Ri to the free memory pool 2458. Invalidating and/or freeing memory resources can include converting delta type entries denoting TT log entries of the region that are currently included in the UHT or unified cache 2455 (e.g., include the current physical address or location of a corresponding MD page) into TT cache entries of the TT cache that are now pre-emptable or can be evicted from TT cache. Invalidating and/or freeing memory resources can include returning to the free memory pool 2458 delta type entries denoting TT log entries of 2456 that are not included in the UHT and unified cache 2455.

In at least one embodiment maintaining separate structures for the TT cache and TT log rather than use the UHT, invalidating and/or freeing memory resources can include freeing or making available for reuse the memory of the frozen TT log entries just destaged for the current region Ri. In at least one embodiment maintaining separate structures for the TT cache and TT log rather than use the UHT, invalidating and/or freeing memory resources can include converting those frozen TT log entries that denote the current valid physical addresses of MD pages into TT cache entries of the TT cache that are now pre-emptable. In at least one embodiment, a TT entry updated by a frozen TT log entry can denote the current valid physical address of a MD page if there is no more recent update to the same TT entry in the active TT log; otherwise the frozen TT log entry is invalid. Thus if the same TT entry has a corresponding update or TT log entry on both the frozen TT log and the active TT log, the update or TT log entry of the frozen TT log just destaged can be freed and reused.

From the step 3160, control proceeds to the step 3162 where the index "i" is incremented to denote TT log destage progression to the next consecutive region. From the step 3162, control proceeds to the step 3164.

At the step 3164, a determination is made as to whether there are more TT regions to process/destage. If the step 3164 evaluates to no, processing stops. Otherwise, control proceeds to the step 3156 to perform processing for the next region.

In at least one embodiment in which TT log entries are processed sequentially on a region by region basis, once delta merging and space account for region N is complete, the phase of invalidating and/or freeing memory resources for region N can be performed in parallel or concurrently with the delta merging and space accounting phases of region N+1. More generally in at least one embodiment, destaging or flushing the TT log with respect to multiple regions of the TT cache can be performed in parallel.

During TT log destaging in at least one embodiment, TT source regions or locations are read and combined with associated updates or deltas only from the frozen TT log instance into a buffer or staging area. In at least one embodiment, access to the source regions or locations can be read only thereby allowing for access to TT entries of the source regions or locations to service read requests to read TT entries.

In at least one embodiment, disassociation between the active and frozen TT log instances allows for storing or recording TT updates in the active TT log instance while the frozen TT log is detaged.

In at least one embodiment, throughout the TT log destage process, access to TT entries as stored on BE non-volatile storage is not blocked. In at least one embodiment, TT log destaging has minimal contention with the TT cache such as, for example, when converting any desired valid frozen TT log entries to TT cache entries.

In at least one embodiment, the techniques of the present disclosure provide for leveraging a MD page lock for use in locking the MD page's corresponding TT entry. For example, a MD page can have a logical address LA1 mapped by TT entry E1 to a current physical address PA1. In at least one embodiment when a request is made to acquire a lock on the MD page, the MD page lock can be leveraged to automatically lock and protect the MD page's corresponding TT entry E1. In this manner in at least one embodiment no additional request to lock the corresponding TT entry E1 is needed since TT entry E1 is automatically and/or implicitly locked when the corresponding MD page is locked/lock is acquired by the requester.

In at least one embodiment, when performing MD log destaging and applying relevant updates of the MD log to a particular MD page P1, the MD page P1 can be locked and resident in the volatile memory cache 2457 (e.g., MD page cache 2453). In at least one embodiment, the MD page can be locked for write or exclusive access. When the revised version of the MD page is generated after applying relevant MD log updates, the revised version of the MD page is stored at a new physical location; and an update to the MD page's corresponding TT entry is recorded in the TT log where the update maps the MD page's logical address LA1 to the new physical location PA2. Using the techniques of the present disclosure, the exclusive or write lock taken on the MD page can also automatically take an exclusive or write lock on the MD page's corresponding TT entry. In at least one embodiment, recording the TT log update for the MD page's corresponding TT entry does not require locating any associated TT data.

In at least one embodiment, for a MD page that is a VLB page or any of a top mid or lead MD page, types of locks can include: a shared lock or read lock of the MD page and; an exclusive lock or write lock of the MD page. The shared or read lock of a MD page allows the holder of the shared lock read access only but not write access to the MD page. There can be multiple simultaneous shared locks on the same MD page held by different threads, processes or transactions such that all such shared lock holders can simultaneously have read access, but not write access, to the MD page. The write or exclusive lock of a MD page allows the holder of the exclusive lock exclusive access to the MD page providing the exclusive lock holder exclusive read and write access to the MD page. While a reader holds a shared or read lock on a MD page, no writer can acquire or hold the exclusive or write lock on the same MD page but other readers can acquire a read or shared lock on the same MD page. While a writer holds the exclusive or write lock on the MD page, no other writer can acquire the write lock and no reader can acquire a read lock on the same MD page.

In at least one embodiment, requesting and acquiring a lock of a particular type on a MD page can automatically include requesting and acquiring a lock of the particular type on a corresponding TT entry mapping the logical address of the MD page to a physical address or location of the MD page on BE non-volatile storage. In at least one embodiment, the defined lock types each providing a particular level of access can include a shared or read lock; and an exclusive or write lock.

In at least one embodiment, a requester (e.g., client thread or process) can request and acquire a shared or read lock on a MD page in connection with workflows that need to read the MD page from BE non-volatile storage. For example in at least one embodiment, one such workflow is in connection with I/O processing and establishing or otherwise using mapping information mapping a user logical address ULA to a physical address containing content stored at ULA. The mapping information can include a chain of MD pages where a MD page of the chain is read. In connection with reading the MD page, a request can be issued to acquire a read or shared lock on the MD page that also automatically requests to acquire a read or shared lock on the TT entry identifying the physical address or location of the MD page. The I/O processing workflow can result in a read cache hit with respect to the MD page itself and/or the corresponding TT entry mapping the MD page's logical address to physical address of location. If the MD page is in cache, the cached MD page can be used. If the corresponding TT entry is in cache (e.g., either in TT cache or TT log), the MD page's current physical address or location of the cached TT entry can be used to read the MD page from BE non-volatile storage. If the I/O processing workflow to read the MD page results in a MD page cache miss (e.g., the MD page is not in the MD page cache or volatile memory cache) and a cache miss with respect to the TT entry identifying the physical address or location of the MD page (e.g., MD page's TT entry is not in the TT cache or TT log/not in the unified cache accessible via the UHT), the MD page can be read from the BE non-volatile storage.

Thus in at least one embodiment, an acquired lock on a MD page locks or protects both the MD page and its corresponding TT entry. In such an embodiment, a read or shared lock taken on the MD page and thus the corresponding TT entry prevents an exclusive or write lock being taken on the MD page and/or the corresponding TT entry. In such an embodiment, taking a write or exclusive lock on the MD page and thus the corresponding TT entry prevents all other readers and/or writers from accessing the MD page and/or the corresponding TT entry.

Referring to FIG. 27, shown is a flowchart 3180 of processing steps that can be performed in at least one embodiment in accordance with the techniques of the present disclosure.

At the step 3182, a client or requester (e.g., thread or process) issues a request to access a MD page with a desired level of access. The requester is requesting that a copy of the MD page be returned so that the requester can subsequently perform any desired processing in the requester's workflow. The request can include a lock type denoting the particular level of access to the MD page that is being requested. The lock type can be one of a defined number of lock types including; a read or shared lock, and a write or exclusive lock. The request can be issued to a caching layer providing access to the MD page through the MD page cache. From the step 3182, control proceeds to the step 3184.

At the step 3184, the MD page access request is serviced by the caching layer. Processing is performed to lock the MD page and additionally lock the MD page's corresponding TT entry E11 (mapping the logical address LA1 of the MD page to a physical address PA1 of the MD page) in accordance with a level of access and lock type as specified in the request.

In at least one embodiment, the requested level of access or protection of the MD page and the corresponding TT entry E11 can be implemented using a single lock that is acquired in connection with both resources—the MD page and the TT entry E11. In such an embodiment, the single lock can be acquired when both of the resources are available with the requested level of accessor lock type. As a variation in at least one embodiment, the requested level of access or protection of the MD page and corresponding TT entry E11 can be implemented using two locks. A first lock with the requested level of access can be acquired in connection with the MD page. A second lock with the requested level of access can be acquired in connection with the TT entry E11. After locking the MD page and the TT entry E11 in accordance with the requested lock type and level of access, the MD page is obtained and returned to the client or requester. If the MD page is not already in the MD page cache, servicing the request can include processing to obtain and load the MD page into the MD page cache. From the step 3184, control proceeds to the step 3186.

At the step 3186, the client or requester receives the MD page and performs any desired processing using the MD page and/or its corresponding TT entry E11. From the step 3186, control proceeds to the step 3188.

At the step 3188, the MD page and the corresponding TT entry E11 are unlocked or released. The one or more locks previously acquired on the MD page and TT entry E11 are released.

Figure 28A:
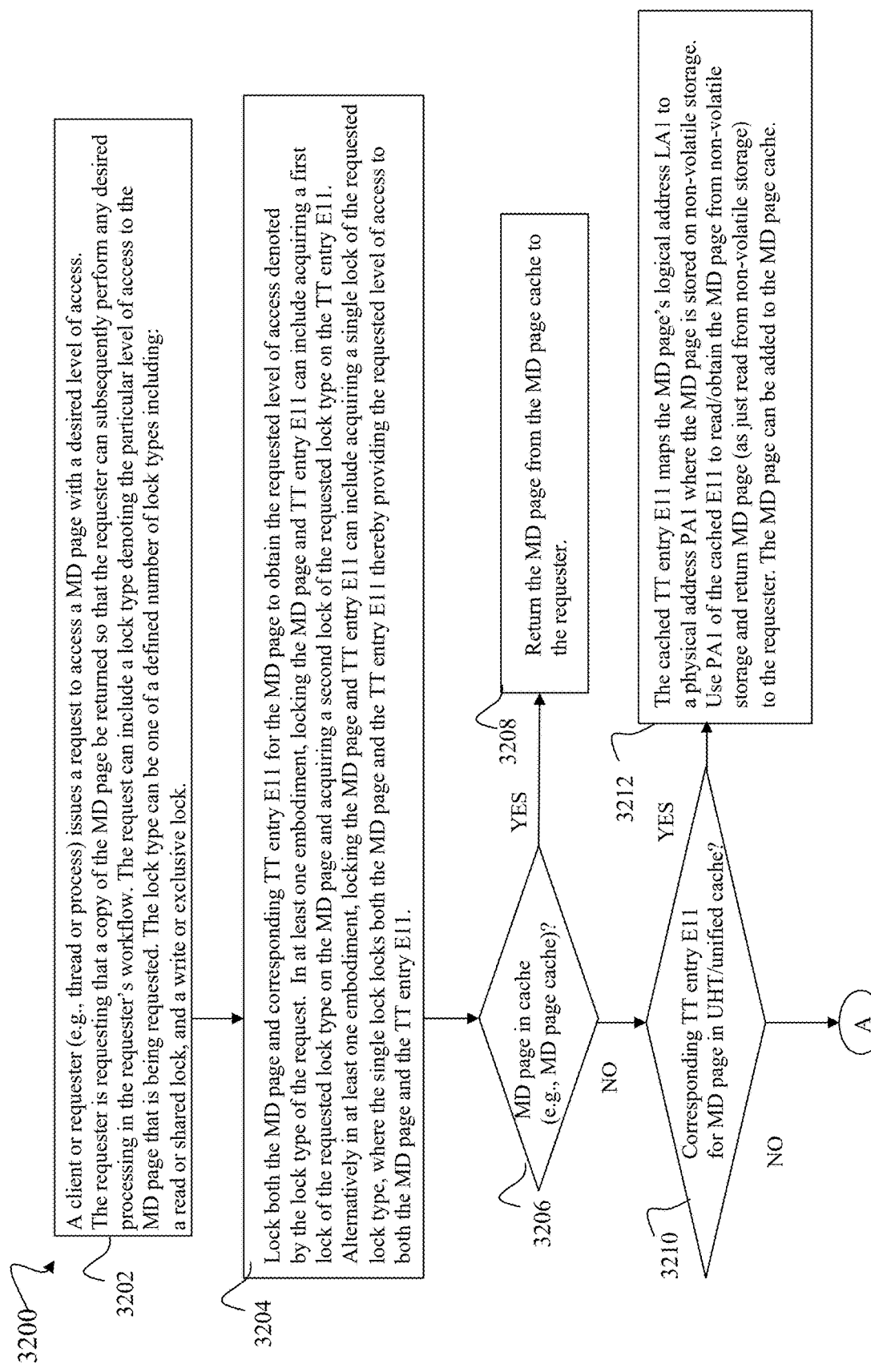
Figure 28B:
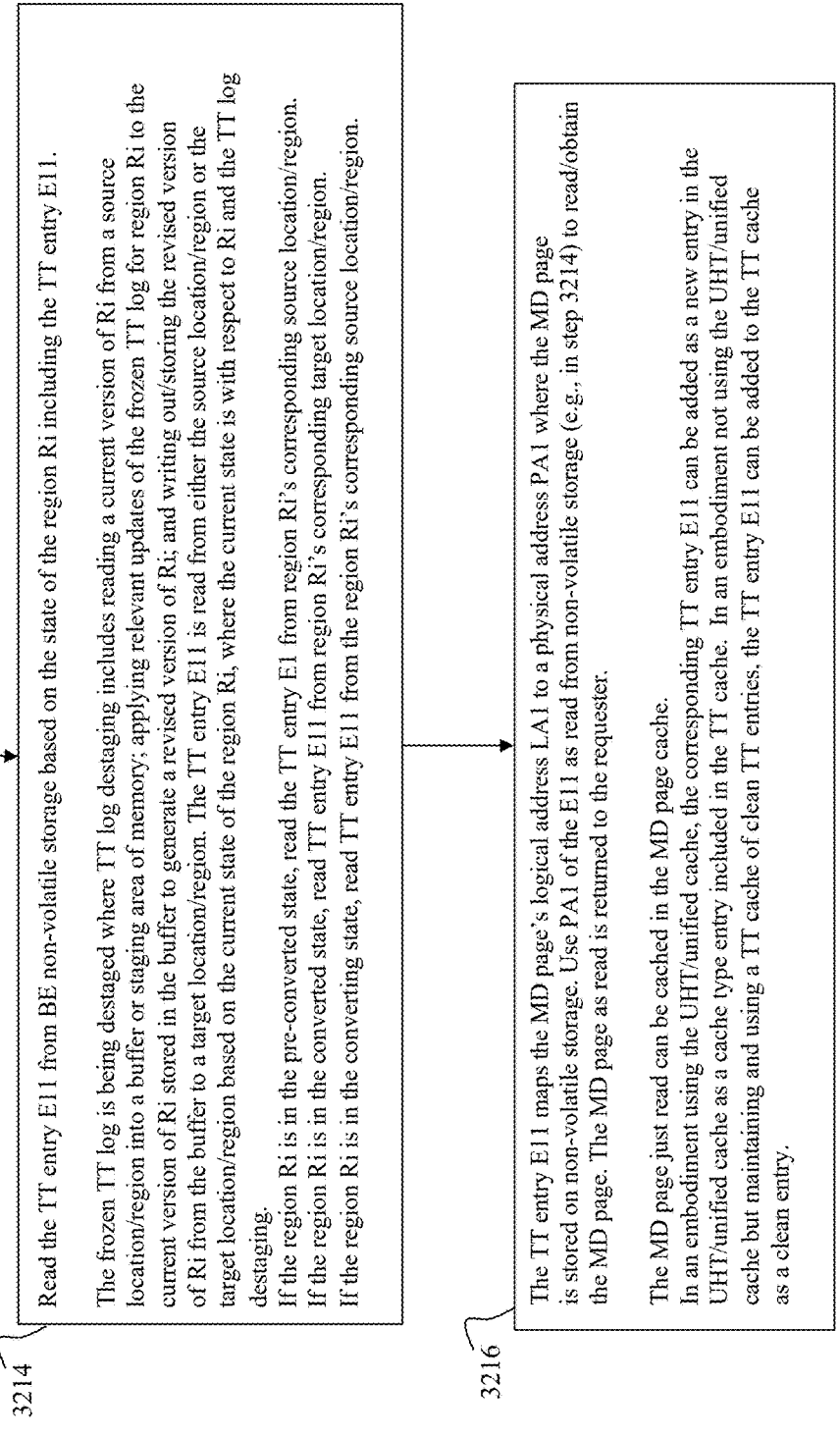

Referring to FIGS. 28A and 28B, shown is a flowchart 3200, 3201 of processing steps that can be performed in at least one embodiment in accordance with the techniques of the present disclosure. The flowchart 3200, 3201 provides further detail regarding processing of step 3182 and 3184 of FIG. 27.

At the step 3202, a client or requester (e.g., thread or process) issues a request to access a MD page with a desired level of access. The requester is requesting that a copy of the MD page be returned so that the requester can subsequently perform any desired processing in the requester's workflow. The request can include a lock type denoting the particular level of access to the MD page that is being requested. The lock type can be one of a defined number of lock types including: a read or shared lock, and a write or exclusive lock. Control proceeds from the step 3202 to the step 3204.

At the step 3204, processing is performed to lock both the MD page and corresponding TT entry E11 for the MD page to obtain the requested level of access denoted by the lock type of the request. In at least one embodiment, locking the MD page and TT entry E11 can include acquiring a first lock of the requested lock type on the MD page and also acquiring a second lock of the requested lock type on the TT entry E11. Alternatively in at least one embodiment, locking the MD page and TT entry E11 can include acquiring a single lock of the requested lock type, where the single lock locks both the MD page and the TT entry E11 thereby providing the requested level of access to both the MD page and the TT entry E11. From the step 3204, control proceeds to the step 3206.

At the step 3206, a determination is made as to whether the requested MD page is in the MD page cache, or more generally in cache (e.g., volatile memory cache). If the step 3206 evaluates to yes denoting a MD page cache hit for the requested MD page, control proceeds to the step 3208. At the step 3208, processing can return the MD page from the MD page cache to the requester.

If the step 3206 evaluates to no denoting a MD page cache miss for the requested MD page, control proceeds to the step 3210. At the step 3210, a determination is made as to whether the corresponding TT entry E11 for the requested MD page is in the UHT or unified cache. If the step 3210 evaluates to yes denoting a UHT or unified cache hit with respect to the TT entry E11, control proceeds to the step 3212. At the step 3212, the UHT or unified cache can return a cached copy of the TT entry E11 mapping the MD page's logical address LA1 to a physical address PA1 where the MD page is stored on non-volatile storage. The step 3212 can use PA1 of the cached TT entry E11 to read or obtain the MD page from non-volatile storage, where the MD page (as just read from non-volatile storage) can be returned to the requester. The MD page can be added to the MD page cache.

The step 3210 makes a determination with respect to the UHT and unified cache as can be included in at least one embodiment. Alternatively, if the UHT and unified cache is not used, an embodiment can have separate structures maintained and queried for the TT cache of clean TT entries and the TT log of dirty TT entries. In this latter embodiment, the TT cache and the TT log can both be queried for a current TT entry, such as a current instances of the TT entry E11, rather than query the UHT.

If the step 3210 evaluates to no denoting a UHT or unified cache miss with respect to the TT entry E11, control proceeds to the step 3214. At the step 3214, processing can be performed to read the TT entry E11 from BE non-volatile storage based on the state of the region Ri including the TT entry E11. In at least one embodiment, the frozen TT log is being destaged where TT log destaging includes reading a current version of Ri from a source location/region into a buffer or staging area of memory; applying relevant updates of the frozen TT log for region Ri to the current version of Ri stored in the buffer to generate a revised version of Ri; and writing out/storing the revised version of Ri from the buffer to a target location/region. The TT entry E11 is read from either the source location/region or the target location/region based on the current state of the region Ri, where the current state is with respect to Ri and the TT log destaging. If the region Ri is in the pre-converted state, read the TT entry E1 from region Ri's corresponding source location/region. If the region Ri is in the converted state, read TT entry E11 from region Ri's corresponding target location/region. If the region Ri is in the converting state, read TT entry E11 from the region Ri's corresponding source location/region. From the step 3214, control proceeds to the step 3216. At the step 3216, the TT entry E11 maps the MD page's logical address LA1 to a physical address PA1 where the MD page is stored on non-volatile storage. Use PA1 of the E11 as read from non-volatile storage (e.g., in step 3214) to read/obtain the MD page. The MD page as read is returned to the requester. The MD page just read can be cached in the MD page cache. In an embodiment using the UHT/unified cache, the corresponding TT entry E11 can be added as a new entry in the UHT/unified cache as a cache type entry included in the TT cache. In an embodiment not using the UHT/unified cache but rather maintaining and using a separate TT cache of clean TT entries, the TT entry E11 can be added to the TT cache as a clean entry.

In at least one embodiment, MD log destage can include destaging MD log updates applied to a first MD page MD1. Processing can include issuing a request to lock MDI for exclusive or write access and return MD1 for use in the MD log destage processing. The request can be issued and processed as described above, for example, in connection with FIGS. 27, 28A and 28B. During MD log destage, after the MD updates are applied to MD1 and a revised version of MD1 is written to a new physical address or location PA2 on non-volatile storage, a TT log entry G1 can be recorded in the active TT log to update a corresponding TT entry E11 that maps the logical address LA of MD1 to its new current physical address or location PA2. Subsequent to recording the TT log entry G1, the one or more locks acquired to lock the MD page MD1 and the corresponding TT entry E11 can be released. Thus in at least one embodiment in accordance with the techniques of the present disclosure, an exclusive or write lock on the MD page MD1 can be taken during MD log destage such that read access to the MD page and its corresponding TT entry E11 is blocked while the MD page is updated and also while E11 is updated via the recorded TT log entry G1.

In at least one embodiment, processing an I/O operation that reads content C1 from or write content C1 to a user logical address ULA can include reading a MD page MD2. The MD page MD2 can be a top, mid or leaf MD page or a VLB page included in a chain of MD pages of mapping information that map ULA to a corresponding physical location or address PA1 storing C1. Processing can include issuing a request to lock MD2 for shared or read access and return MD2 for use in the I/O processing workflow. The request can be issued and processed as described above, for example, in connection with FIGS. 27, 28A and 28B. During the I/O workflow, the MD page MD2 can be read as needed. Subsequently, when the I/O workflow has completed, the one or more locks acquired to lock the MD page MD2 and the corresponding TT entry (that maps the logical address of MD2 to its corresponding physical storage location) can be released. Thus in at least one embodiment in accordance with the techniques of the present disclosure, a shared or read lock on the MD page MD2 can be taken during the I/O processing workflow such that read access to the MD page and its corresponding TT entry E11 is blocked while the MD page is updated and also while E11 is updated via the recorded TT log entry G1.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
receiving, from a client, a request to access a metadata (MD) page, wherein the request specifies a lock type denoting a particular level of access to the MD page that is being requested by the request; and
responsive to receiving the request, performing first processing including:
locking the MD page and a corresponding translation table (TT) entry E1 for the MD page in accordance with the lock type denoting a particular level of access being requested, wherein E1 maps a logical address LA1 of the MD page to a physical storage or location PA1 on non-volatile storage where the MD page is stored; and
subsequent to said locking, returning a response including the MD page to the client;
determining whether the MD page is stored in a cache;
responsive to determining the MD page is stored in the cache, performing said returning the MD page to the client, wherein the MD page returned is a copy of the MD page obtained from the cache; and
responsive to determining that the MD page is not stored in the cache, performing second processing including:
determining whether E1 is stored in the cache;
responsive to determining that E1 is stored in the cache, performing third processing including:
using PA1 of E1, as read from the cache, to read the MD page from non-volatile storage;
storing the MD page as read from non-volatile storage in the cache; and
performing said returning the MD page to the client, wherein the MD page is as read from non-volatile storage; and
responsive to determining that E1 is not stored in cache, performing fourth processing including:
reading E1 from non-volatile storage;
using PA1 of E1, as read from non-volatile storage, to read the MD page from non-volatile storage;
performing said returning the MD page to the client, wherein the MD page is as read from non-volatile storage; and
storing E1, as read from non-volatile storage, in the cache.

2. The computer-implemented method of claim 1, wherein said determining whether E1 is stored in the cache includes:
determining whether E1 is stored in a TT cache of clean TT entries; and
determining whether E1 is stored in a TT log of dirty TT entries that have not yet been flushed or destaged to a persisted TT stored on non-volatile storage.

3. The computer-implemented method of claim 1, wherein said determining whether E1 is stored in the cache comprises:
determining whether E1 is stored in a unified cache accessed using a unified hash table (UHT), including querying a unified hash table (UHT) in accordance with a logical address LA1 of the MD page to determine whether the UHT includes an existing UHT entry mapping LA1 to PA1 of where the MD page is stored on non-volatile storage.

4. The computer-implemented method of claim 1, wherein the TT entry E1 is included in a first region of a TT as stored on non-volatile storage, wherein the method includes destaging a frozen TT log of updates to TT entries comprising:
reading a source version of the first region from a source location into a buffer;
applying relevant updates of the frozen TT log to the first region as stored in the buffer to generate a revised version of the first region; and
storing the revised version of the first region from the buffer to a target location.

5. The computer-implemented method of claim 4, wherein said reading E1 from non-volatile storage in said fourth processing further includes:
 determining a current state of the first region with respect to said destaging the frozen log; and
 reading E1 from one of the source location and the target location based on the current state of the first region with respect to said destaging the frozen log.

6. The computer-implemented method of claim 5, wherein the current state of the first region is one of: a pre-converted state, a converting state, or a converted state.

7. The computer-implemented method of claim 6, wherein if the first region is in the pre-converted state, no corresponding updates from the frozen TT log have been destaged for the first region.

8. The computer-implemented method of claim 6, wherein if the first region is in the converting state, destaging corresponding updates from the frozen TT log has commenced but not completed for the first region.

9. The computer-implemented method of claim 6, wherein if the first region is in the converted state, destaging corresponding updates from the frozen TT log has completed for the first region such that the revised version of the first region is stored at the target location.

10. The computer-implemented method of claim 6, wherein if the first region is in the pre-converted state or the converting state, E1 is read from the source location.

11. The computer-implemented method of claim 6, wherein if the first region is in the converted state, E1 is read from the target location.

12. The computer-implemented method of claim 4, wherein the TT log is partitioned into a plurality of regions including the first region, wherein each of the plurality of regions has a corresponding source location on a source tier and a corresponding target location on a target tier.

13. The computer-implemented method of claim 12, wherein the updates of the TT log are destaged on a region by region basis in accordance with contiguous physical locations of the plurality of regions in the source tier and target tier.

14. The computer-implemented method of claim 1, wherein said lock type is one of a defined set of lock types including: a shared or read lock; and an exclusive or write lock.

15. The computer-implemented method of claim 14, wherein said request is issued as part of MD log destaging of updates to the MD page, wherein the lock type of the request is the exclusive or write lock, and wherein E1 is automatically locked for exclusive or write access in connection with the request to access the MD page for exclusive or write access.

16. The computer-implemented method of claim 14, wherein the lock type of the request is the shared or read lock, and wherein E1 is automatically locked for shared or read access in connection with the request to access the MD page for shared or read access.

17. The computer-implemented method of claim 14, wherein the shared or read lock allows multiple clients to simultaneously read the MD page and/or E1, wherein any client holding the shared or read lock blocks another client from acquiring the write or exclusive lock on the MD page and/or E1, and wherein the write or exclusive lock excludes others from accessing the MD page and/or E1.

18. A system comprising:
 one or more processors; and
 a memory comprising code stored thereon that, when executed, performs a method comprising:
  receiving, from a client, a request to access a metadata (MD) page, wherein the request specifies a lock type denoting a particular level of access to the MD page that is being requested by the request; and
  responsive to receiving the request, performing first processing including:
   locking the MD page and a corresponding translation table (TT) entry E1 for the MD page in accordance with the lock type denoting a particular level of access being requested, wherein E1 maps a logical address LA1 of the MD page to a physical storage or location PA1 on non-volatile storage where the MD page is stored; and
   subsequent to said locking, returning a response including the MD page to the client;
   determining whether the MD page is stored in a cache;
   responsive to determining the MD page is stored in the cache, performing said returning the MD page to the client, wherein the MD page returned is a copy of the MD page obtained from the cache; and
   responsive to determining that the MD page is not stored in the cache, performing second processing including:
    determining whether E1 is stored in the cache;
    responsive to determining that E1 is stored in the cache, performing third processing including:
     using PA1 of E1, as read from the cache, to read the MD page from non-volatile storage;
     storing the MD page as read from non-volatile storage in the cache; and
     performing said returning the MD page to the client, wherein the MD page is as read from non-volatile storage; and
    responsive to determining that E1 is not stored in cache, performing fourth processing including:
     reading E1 from non-volatile storage;
     using PA1 of E1, as read from non-volatile storage, to read the MD page from non-volatile storage;
     performing said returning the MD page to the client, wherein the MD page is as read from non-volatile storage; and
     storing E1, as read from non-volatile storage, in the cache.

19. One or more non-transitory computer readable media comprising code stored thereon that, when executed, performs a method comprising:
 receiving, from a client, a request to access a metadata (MD) page, wherein the request specifies a lock type denoting a particular level of access to the MD page that is being requested by the request; and
 responsive to receiving the request, performing first processing including:
  locking the MD page and a corresponding translation table (TT) entry E1 for the MD page in accordance with the lock type denoting a particular level of access being requested, wherein E1 maps a logical address LA1 of the MD page to a physical storage or location PA1 on non-volatile storage where the MD page is stored; and
  subsequent to said locking, returning a response including the MD page to the client;
  determining whether the MD page is stored in a cache;
  responsive to determining the MD page is stored in the cache, performing said returning the MD page to the client, wherein the MD page returned is a copy of the MD page obtained from the cache; and responsive to determining that the MD page is not stored in the cache, performing second processing including:

determining whether E1 is stored in the cache;

responsive to determining that E1 is stored in the cache, performing third processing including:
using PA1 of E1, as read from the cache, to read the MD page from non-volatile storage;
storing the MD page as read from non-volatile storage in the cache; and
performing said returning the MD page to the client, wherein the MD page is as read from non-volatile storage; and responsive to determining that E1 is not stored in cache, performing fourth processing including:
reading E1 from non-volatile storage;
using PA1 of E1, as read from non-volatile storage, to read the MD page from non-volatile storage;
performing said returning the MD page to the client, wherein the MD page is as read from non-volatile storage; and
storing E1, as read from non-volatile storage, in the cache.

\* \* \* \* \*